United States Patent
Jung et al.

(10) Patent No.: US 12,133,130 B2
(45) Date of Patent: *Oct. 29, 2024

(54) METHOD AND APPARATUS FOR RELAXING RRM MEASUREMENT IN WIRELESS COMMUNICATION SYSTEM

(71) Applicant: Samsung Electronics Co., Ltd., Suwon-si (KR)

(72) Inventors: Sangyeob Jung, Suwon-si (KR); Soenghun Kim, Suwon-si (KR); Anil Agiwal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/362,416

(22) Filed: Jul. 31, 2023

(65) Prior Publication Data

US 2024/0031894 A1 Jan. 25, 2024

Related U.S. Application Data

(63) Continuation of application No. 17/155,765, filed on Jan. 22, 2021, now Pat. No. 11,716,660.

(30) Foreign Application Priority Data

| Jan. 23, 2020 | (KR) | 10-2020-0009314 |
| Feb. 10, 2020 | (KR) | 10-2020-0015841 |
| May 18, 2020 | (KR) | 10-2020-0059326 |

(51) Int. Cl.
*H04W 4/00* (2018.01)
*H04W 8/08* (2009.01)
(Continued)

(52) U.S. Cl.
CPC ............ *H04W 36/08* (2013.01); *H04W 8/08* (2013.01); *H04W 24/10* (2013.01);
(Continued)

(58) Field of Classification Search
CPC ....... H04W 36/08; H04W 8/08; H04W 24/10; H04W 36/0088; H04W 36/30;
(Continued)

(56) References Cited

U.S. PATENT DOCUMENTS

| 10,560,869 B2 | 2/2020 | Ku et al. |
| 11,246,042 B2 | 2/2022 | Tsui et al. |

(Continued)

FOREIGN PATENT DOCUMENTS

| CN | 108029049 A | 5/2018 |
| CN | 114514769 A | 5/2022 |
| EP | 04011115 A1 | 4/2021 |

OTHER PUBLICATIONS

US 11,432,181 B2, 08/2022, Li et al. (withdrawn)
(Continued)

*Primary Examiner* — Amancio Gonzalez
(74) *Attorney, Agent, or Firm* — Jefferson IP Law, LLP

(57) ABSTRACT

A method of relaxing frequency measurement by a terminal in a wireless communication system is provided. The method includes receiving, from a base station, system information comprising first configuration information associated with frequency measurement and second configuration information associated with relaxed frequency measurement, the second configuration information comprising at least one of first information associated with a criterion for the terminal with low mobility (low mobility criterion) or second information associated with a criterion for the terminal not at cell edge (not at cell edge criterion), identifying whether at least one of the low mobility criterion or the not (Continued)

at cell edge criterion is fulfilled, and determining whether to perform frequency measurement based on the identifying.

13 Claims, 21 Drawing Sheets

(51) Int. Cl.

| | | |
|---|---|---|
| H04W 24/10 | (2009.01) | |
| H04W 36/00 | (2009.01) | |
| H04W 36/08 | (2009.01) | |
| H04W 36/30 | (2009.01) | |
| H04W 36/32 | (2009.01) | |
| H04W 48/16 | (2009.01) | |
| H04W 48/20 | (2009.01) | |
| H04W 72/542 | (2023.01) | |

(52) U.S. Cl.
CPC ....... *H04W 36/0088* (2013.01); *H04W 36/30* (2013.01); *H04W 36/32* (2013.01); *H04W 48/16* (2013.01); *H04W 48/20* (2013.01); *H04W 72/542* (2023.01)

(58) Field of Classification Search
CPC ..... H04W 36/32; H04W 48/16; H04W 48/20; H04W 72/085; H04W 48/12
USPC .......................................................... 370/331
See application file for complete search history.

(56) References Cited

U.S. PATENT DOCUMENTS

| | | | |
|---|---|---|---|
| 11,516,691 B2* | 11/2022 | Li | H04W 48/12 |
| 11,706,646 B2 | 7/2023 | Kim et al. | |
| 11,716,660 B2* | 8/2023 | Jung | H04W 36/32 370/331 |
| 2017/0150384 A1 | 5/2017 | Rune et al. | |
| 2019/0320490 A1* | 10/2019 | Liu | H04W 52/0229 |
| 2019/0364469 A1 | 11/2019 | Siomina | |
| 2020/0314868 A1* | 10/2020 | Tseng | H04B 17/318 |
| 2021/0007025 A1* | 1/2021 | Kumar | H04W 48/20 |
| 2021/0068027 A1* | 3/2021 | Lee | H04W 48/20 |
| 2021/0076275 A1* | 3/2021 | Yiu | H04W 36/0088 |
| 2021/0105649 A1* | 4/2021 | Lee | H04W 24/10 |
| 2022/0007225 A1* | 1/2022 | Li | H04W 52/0245 |
| 2022/0030455 A1* | 1/2022 | Koskela | H04W 52/0216 |
| 2022/0095134 A1* | 3/2022 | Shi | H04W 48/16 |
| 2022/0232471 A1* | 7/2022 | Laselva | H04W 36/00 |
| 2022/0353763 A1 | 11/2022 | Li et al. | |
| 2022/0394532 A1 | 12/2022 | Thangarasa et al. | |

OTHER PUBLICATIONS

Sony, 'Details of Relaxed monitoring for NR UE power saving', R2-1915234, 3GPP TSG RAN WG2 Meeting# 108, Nov. 7, 2019, sections 1-2.
Oppo,'RRM relaxation for power saving', R2-1914397, 3GPP TSG-RAN WG2 Meeting #108, Nov. 8, 2019, p. 2.
Samsung,'On Triggering RRM Measurement Relaxation', R2-1916089, 3GPP TSG-RAN WG2 Meeting #108, Nov. 8, 2019, p. 2.
Huawei et al., 'On SrxlevRef adaptation in relaxed monitoring', R2-1915529, 3GPP TSG-RAN WG2 Meeting 108, Nov. 8, 2019, section 5.
International Search Report dated Apr. 14, 2021, issued in International Patent Application No. PCT/KR2021/000937.
LTE; Evolved Universal Terrestrial Radio Access (E-UTRA); User Equipment (UE) procedures in idle mode (3GPP TS 36.304 version 15.5.0 Release 15), XP014360445, Jan. 21, 2020.
European Search Report dated Apr. 18, 2023, issued in European Application No. 21744831.5.
Mediatek Inc.; Report of email discussion [107bis#68][PowerSaving] RRM measurement relaxation (Mediatek); 3GPP TSG-RAN WG2 Meeting #108; R2-19xxxxx (R2-1914890); Reno, NV, USA; Nov. 18-22, 2019.
LG Electronics Inc.; Considerations on criteria and ways of performing measurement relaxation; 3GPP TSG-RAN WG2 Meeting #107bis; R2-1913340; Chongqing, China; Oct. 14-18, 2019.
Samsung; On Triggering Relaxed RRM measurement in RRCJDLE and RRCJNACTIVE; 3GPP TSG-RAN WG2 Meeting #107; R2-1909172; Prague, Czech Republic, Aug. 26-30, 2019.
Chinese Office Action with English translation dated Jul. 10, 2024; Chinese Appln. No. 202180010919.7.
European Communication under Rule 71(3) EPC dated Jun. 12, 2024; European Appln. No. 21 744 831.5-1218.

* cited by examiner

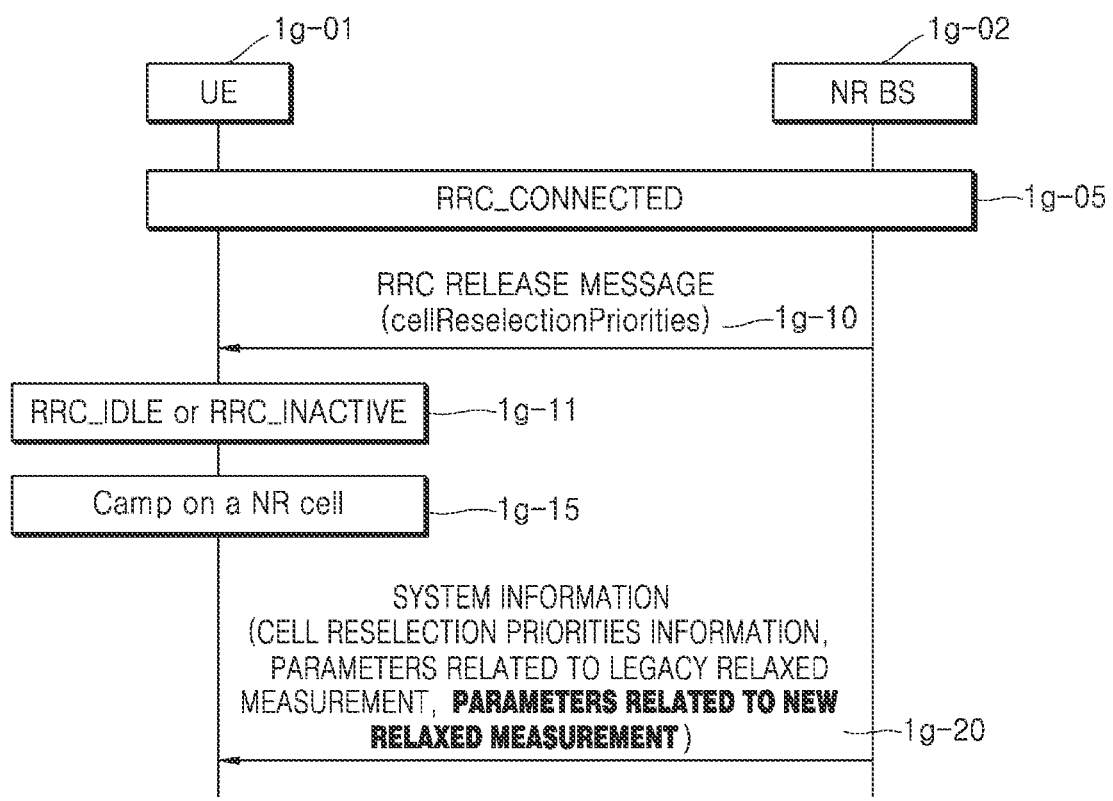

METHOD AND APPARATUS FOR RELAXING RRM MEASUREMENT IN WIRELESS COMMUNICATION SYSTEM

CROSS-REFERENCE TO RELATED APPLICATION(S)

This application is a continuation application of prior application Ser. No. 17/155,765 filed on Jan. 22, 2021, which has issued as U.S. Pat. No. 11,716,660 on Aug. 1, 2023; and which is based on and claims priority under 35 U.S.C. § 119(a) of a Korean patent application number 10-2020-0009314 filed on Jan. 23, 2020 in the Korean Intellectual Property Office, and of a Korean patent application number 10-2020-0015841 filed on Feb. 10, 2020 in the Korean Intellectual Property Office, and of a Korean patent application number 10-2020-0059326 filed on May 18, 2020 in the Korean Intellectual Property Office, the disclosure of each of which is incorporated by reference herein in its entirety.

BACKGROUND

1. Field

The disclosure relates to a method and an apparatus for relaxing radio resource management (RRM) measurement in a wireless communication system. More particularly, the disclosure relates to a method of relaxing frequency measurement by a terminal in a wireless communication system by effectively providing a service in a mobile communication system.

2. Description of Related Art

To meet significantly increasing demand with respect to wireless data traffic due to the commercialization of $4^{th}$ generation (4G) communication systems and the increase in multimedia services, evolved $5^{th}$ generation (5G) system or pre-5G communication system are developed. For this reason, 5G or pre-5G communication systems are called 'beyond 4G network' communication systems or 'post long term evolution (post-LTE)' systems.

To increase a data rate, implementation of 5G communication systems in an ultra-high frequency or millimeter-wave (mmWave) band (e.g., a 60 GHz band) is being considered. To reduce path loss of radio waves and increase a transmission distance of radio waves in the ultra-high frequency band for 5G communication systems, various technologies, such as beamforming, massive multiple-input and multiple-output (massive MIMO), full-dimension MIMO (FD-MIMO), array antennas, analog beamforming, and large-scale antennas are being studied.

Furthermore, to improve network functions for 5G communication systems, various technologies, such as evolved small cells, advanced small cells, cloud radio access networks (Cloud-RAN), ultra-dense networks, device-to-device communication (D2D), wireless backhaul, moving networks, cooperative communication, coordinated multi-Points (CoMP), interference cancellation, or the like have been developed. In addition, for 5G communication systems, advanced coding modulation (ACM) technologies, such as hybrid frequency-shift keying (FSK) and quadrature amplitude modulation (QAM) (FQAM) and sliding window superposition coding (SWSC), and advanced access technologies, such as filter bank multi-carrier (FBMC), non-orthogonal multiple access (NOMA), sparse code multiple access (SCMA), or the like have been developed.

The Internet has evolved from a human-based connection network, where humans create and consume information, to the Internet of things (IoT), where distributed elements, such as objects exchange information with each other to process the information. Internet of everything (IoE) technology has emerged, in which the IoT technology is combined with, for example, technology for processing big data through connection with a cloud server. To implement the IoT, various technological elements, such as sensing technology, wired/wireless communication and network infrastructures, service interface technology, and security technology are required, such that, in recent years, technologies related to sensor networks for connecting objects, machine-to-machine (M2M) communication, and machine-type communication (MTC) have been studied. In the IoT environment, intelligent internet technology (IT) services may be provided to collect and analyze data obtained from connected objects to create new value in human life. As existing information technology (IT) and various industries converge and combine with each other, the IoT may be applied to various fields, such as smart homes, smart buildings, smart cities, smart cars or connected cars, smart grids, health care, smart home appliances, and advanced medical services.

Various attempts are being made to apply 5G communication systems to the IoT network. For example, 5G communication technologies, such as sensor networks, M2M communication, MTC, or the like are being implemented by using techniques including beamforming, MIMO, array antennas, or the like. Application of Cloud-RAN as the above-described big data processing technology may be an example of convergence of 5G communication technology and IoT technology.

Because various services may be provided due to the aforementioned technical features and the development of wireless communication systems, in particular, methods for smoothly supporting a service related to radio resource management (RRM) measurement are required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and a method for effectively providing a service in a mobile communication system.

Additional aspects will be set forth in part in the description which follows and, in part, will be apparent from the description, or may be learned by practice of the presented embodiments of the disclosure.

In accordance with an aspect of the disclosure, a method of relaxing frequency measurement by a terminal in a wireless communication system is provided. The method includes receiving, from a base station, system information comprising first configuration information associated with frequency measurement and second configuration information associated with relaxed frequency measurement, the second configuration information comprising at least one of first information associated with a criterion for the terminal with low mobility (low mobility criterion) or second information associated with a criterion for the terminal not at cell edge (not at cell edge criterion), identifying whether at least one of the low mobility criterion or the not at cell edge criterion is fulfilled, and determining whether to perform frequency measurement based on the identifying. The first configuration information may comprise at least one of a threshold value SIntraSearchP for a cell selection receive level value (Srxlev) for an intra-frequency, a threshold value SIntraSearchQ for a cell selection quality value (Squal) for the intra-frequency, a threshold value SnonIntraSearchP for the Srxlev for an inter-frequency or an inter-radio access technology (inter-RAT) frequency, or a threshold value SnonIntraSearchQ for the Squal for the inter-frequency or the inter-RAT frequency. The first information associated with the low mobility criterion may comprise a threshold value SsearchDeltaP for variation of the Srxlev and information of an evaluation time period TSearchDeltaP.

In an embodiment of the disclosure, the second information associated with the not at cell edge criterion may comprise at least one of a threshold value SsearchThresholdP for the Srxlev for relaxed frequency measurement or a threshold value SsearchThresholdQ for the Squal for relaxed frequency measurement. The SsearchThresholdP may be less than or equal to the SIntraSearchP and the SnonIntraSearchP. The SsearchThresholdQ may be less than or equal to the SIntraSearchQ and the SnonIntraSearchQ.

In an embodiment of the disclosure, the terminal may determine not to perform frequency measurement for measurements of intra-frequency, new radio (NR) inter-frequencies configured with equal or lower priority than a frequency of a serving cell of the terminal, and inter-RAT frequency cells configured with equal or lower priority than the frequency of a serving cell of the terminal, in case that the low mobility criterion is fulfilled for the time period TSearchDeltaP and the not cell edge criterion is fulfilled.

In an embodiment of the disclosure, the terminal may determine not to perform frequency measurement for measurements of new radio (NR) inter-frequencies and inter-RAT frequency cells configured with higher priority than a frequency of a serving cell of the terminal, in case that the low mobility criterion is fulfilled for the time period TSearchDeltaP, the not cell edge criterion is fulfilled, and an indicator (highPriorityMeasRelax) indicating whether a measurement for a high priority frequency can be relaxed is configured by the second configuration information.

In an embodiment of the disclosure, the terminal may determine not to perform frequency measurement for measurements of new radio (NR) inter-frequencies and inter-RAT frequency cells configured with higher priority than a frequency of a serving cell of the terminal, in case that the following conditions are satisfied (i) the first information associated with the low mobility criterion is included and the second information associated with the not at cell edge criterion is not included in the second configuration information, (ii) an Srxlev of the serving cell of the terminal is greater than the SnonIntraSearchP and an Squal of the serving cell is greater than the SnonIntraSearchQ, (iii) the low mobility criterion is fulfilled, and (iv) an indicator (highPriorityMeasRelax) indicating whether a measurement for a high priority frequency can be relaxed is configured by the second configuration information.

In an embodiment of the disclosure, the low mobility criterion may be that a value obtained by subtracting an Srxlev of a serving cell of the terminal from a reference Srxlev (SrxlevRef) of the serving cell is less than the SsearchDeltaP. A current Srxlev of the serving cell may be determined as the SrxlevRef of the serving cell in case that the terminal selects or reselects a new cell, the current Srxlev of the serving cell is greater than a current reference SrxlevRef of the serving cell, or at least one criterion of the low mobility criterion or the not cell edge criterion is not fulfilled for the time period TSearchDeltaP.

In an embodiment of the disclosure, the not at cell edge criterion may be that an Srxlev of a serving cell of the terminal is greater than the SsearchThresholdP and that in case that the SsearchThresholdQ is included in the second configuration associated with the not at cell edge criterion, an Squal of the serving cell is greater than the SsearchThresholdQ.

In accordance with another aspect of the disclosure, a terminal relaxing frequency measurement in a wireless communication system is provided. The terminal includes a transceiver, and at least one processor operably coupled with the transceiver and configured to receive, from a base station, system information comprising first configuration information associated with frequency measurement and second configuration information associated with relaxed frequency measurement, the second configuration information comprising at least one of first information associated with a criterion for the terminal with low mobility (low mobility criterion) or second information associated with a criterion for the terminal not at cell edge (not at cell edge criterion), identify whether at least one of the low mobility criterion or the not at cell edge criterion is fulfilled, and determine whether to perform frequency measurement based on the identifying. The first configuration information comprises at least one of a threshold value SIntraSearchP for a cell selection receive level value (Srxlev) for an intra-frequency, a threshold value SIntraSearchQ for a cell selection quality value (Squal) for the intra-frequency, a threshold value SnonIntraSearchP for the Srxlev for an inter-frequency or an inter-radio access technology (inter-RAT) frequency, or a threshold value SnonIntraSearchQ for the Squal for the inter-frequency or the inter-RAT frequency. The first information associated with the low mobility criterion comprises a threshold value SsearchDeltaP for variation of the Srxlev and information of an evaluation time period TSearchDeltaP.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 7 is a diagram for describing a procedure in which a NR BS releases connection to a UE, and thus the UE switches from an RRC_CONNECTED mode to an RRC_IDLE mode or an RRC_INACTIVE mode, and a procedure in which the NR BS broadcasts system information including cell reselection information according to an embodiment of the disclosure;

The same reference numerals are used to represent the same elements throughout the drawings.

DETAILED DESCRIPTION

Figure 1:
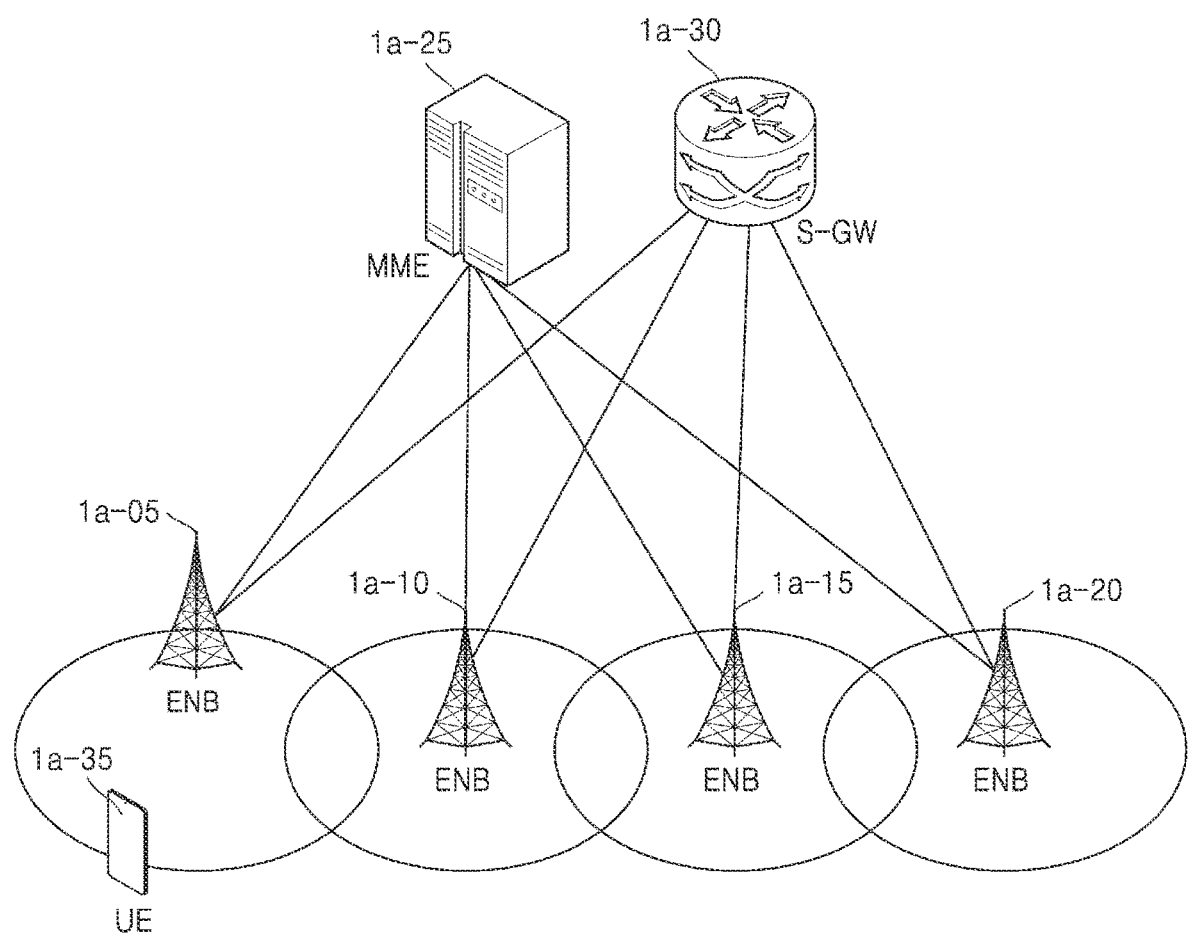
FIG. 1 is a diagram illustrating a configuration of a long term evolution (LTE) system according to an embodiment of the disclosure.

The following description with reference to accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, some elements in the drawings are exaggerated, omitted, or schematically illustrated. In addition, the size of each element does not entirely reflect the actual size. In the drawings, the same or corresponding elements are denoted by the same reference numerals.

The advantages and features of the disclosure and methods of achieving them will become apparent with reference to embodiments described below with reference to the accompanying drawings. The disclosure may, however, be embodied in many different forms and should not be construed as limited to embodiments set forth herein; rather these embodiments of the disclosure are provided so that this disclosure will be thorough and complete, and will fully convey the scope of the disclosure only defined by the claims to one of ordinary skill in the art. Throughout the specification, like reference numerals refer to like elements.

It will be understood that each block of flowchart illustrations, and combinations of blocks in the flowchart illustrations, may be implemented by computer program instructions. The computer program instructions may be provided to a processor of a general-purpose computer, special purpose computer, or other programmable data processing apparatus, such that the instructions, which are executed via the processor of the computer or other programmable data processing apparatus, generate means for performing functions specified in the flowchart block or blocks. The computer program instructions may also be stored in a computer-executable or computer-readable memory that may direct the computer or other programmable data processing apparatus to function in a particular manner, such that the instructions stored in the computer-executable or computer-readable memory produce an article of manufacture including instruction means that perform the functions specified in the flowchart block(s). The computer program instructions may also be loaded onto the computer or other programmable data processing apparatus to cause a series of operations to be performed on the computer or other programmable apparatus to produce a computer implemented process such that the instructions that are executed on the computer or other programmable apparatus provide operations for implementing the functions specified in the flowchart block(s).

In addition, each block of the flowchart illustrations may represent a module, segment, or portion of code, which includes one or more executable instructions for performing specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used in the embodiment of the disclosure refers to a software or hardware component, such as field-programmable gate array (FPGA) or application-specific integrated circuit (ASIC), which performs certain tasks. However, the term "unit" does not mean to be limited to software or hardware. A "unit" may be configured to be in an addressable storage medium or configured to operate one or more processors. Thus, a "unit" may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in the components and "units" may be combined into fewer components and "units" or may be further separated into additional components and "units". Further, the components and "units" may be implemented to operate one or more central processing units (CPUs) in a device or a secure multimedia card. In addition, a "unit" may include one or more processors in embodiments of the disclosure.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

In the following descriptions of the disclosure, well-known functions or configurations are not described because they would obscure the disclosure with unnecessary details.

Hereinafter, terms identifying an access node, terms indicating network entities, terms indicating messages, terms indicating an interface between network entities, and terms indicating various pieces of identification information, as used in the following description, are exemplified for convenience of explanation. Accordingly, the disclosure is not limited to terms to be described below, and other terms indicating objects having equal technical meanings may be used.

For convenience of descriptions, the disclosure uses terms and names defined in the $3^{rd}$ generation partnership project (3GPP) long term evolution (LTE) standards. However, the disclosure is not limited to these terms and names, and may be equally applied to communication systems conforming to other standards. In the disclosure, an evolved node B (eNB) may be interchangeably used with a next-generation node B (gNB) for convenience of explanation. For example, a base station described by an eNB may represent a gNB. Post-LTE systems, that is, 5G systems need to simultaneously support services capable of reflecting and satisfying various requirements of users, service providers, or the like. Services considered for the 5G systems include enhanced mobile broadband (eMBB), massive machine-type communication (mMTC), ultra-reliability low-latency communication (URLLC) services or the like.

According to some embodiments of the disclosure, the eMBB service may be aimed to provide a more enhanced data rate compared to a data rate supported by LTE, LTE Advanced (LTE-A), or LTE-Pro. For example, the eMBB service in the 5G communication systems needs to provide a maximum data rate of 20 gigabits per second (Gbps) for a DL and provide a maximum data rate of 10 Gbps for a UL in view of a single BS. At the same time, the 5G communication systems may simultaneously provide a maximum data rate and provide an increased user perceived data rate. To satisfy these requirements, the 5G communication systems may require various enhanced transmission/reception technologies including enhanced multiple-input and multiple-output (MIMO). The data rate required for the 5G communication systems may be satisfied by using a frequency bandwidth wider than 20 megahertz (MHz) in a frequency band of 3 to 6 GHz or over 6 GHz compared to LTE systems currently using a transmission bandwidth of up to 20 MHz in a 2 GHz band.

At the same time, the mMTC service is considered for the 5G communication systems to support application services, such as IoT. The mMTC service may be required to, for example, support massive user access within a cell, enhance UE coverage, increase battery time, and reduce user charges, to efficiently provide the IoT service. The IoT service provides a communication function by using a variety of sensors attached to various devices, and thus needs to support a large number of UEs within a cell (e.g., 1,000,000 UEs/km2. In addition, because UEs supporting mMTC may be located in a shadow zone, e.g., a basement of a building, due to service characteristics, the mMTC service may require a wider coverage compared to other services provided by the 5G communication systems. The UEs supporting mMTC need to be low-priced, and are not able to frequently replace batteries and thus require a very long battery life time, e.g., 10 to 15 years.

Lastly, the URLLC service is a mission-critical cellular-based wireless communication service and may be used for remote control of robots or machinery, industrial automation, unmanned aerial vehicles, remote healthcare, emergency alert, or the like. Thus, URLLC communication may have to provide a very low latency (e.g., ultra-low latency) and a very high reliability (e.g., ultra-reliability). For example, the URLLC service needs to satisfy an air interface latency smaller than 0.5 millisecond (ms) and, at the same time, may require a packet error rate equal to or smaller than $10^{-5}$. Therefore, for the URLLC service, the 5G communication systems need to provide a smaller transmit time interval (TTI) compared to other services and, at the same time, may be required to broadly allocate resources in a frequency band to ensure reliability of a communication link.

The above-described three services considered for the 5G communication systems, i.e., the eMBB, URLLC, and mMTC services, may be multiplexed and provided by a single system. In this case, the services may use different transmission/reception schemes and different transmission/reception parameters to satisfy different requirements for the services. The above-described mMTC, URLLC, and eMBB services are merely examples and the types of services to which the disclosure is applicable are not limited thereto.

Although LTE, LTE-A, LTE Pro, or 5G (or new radio (NR)) systems are mentioned as examples in the following description, embodiments of the disclosure may also be applied to other communication systems having similar technical backgrounds or channel types. Furthermore, the embodiments of the disclosure may also be applied to other communication systems through partial modification without greatly departing from the scope of the disclosure based on determination by one of ordinary skill in the art.

Hereinafter, embodiments of the disclosure will be described with reference to accompanying drawings.

FIG. 1 is a diagram illustrating a configuration of an LTE system according to an embodiment of the disclosure.

Referring to FIG. 1, a radio access network (RAN) of the LTE system includes a plurality of eNBs (or nodes B or BSs) 1a-05, 1a-10, 1a-15, and 1a-20, a mobility management entity (MME) 1a-25, and a serving-gateway (S-GW) 1a-30. A UE (or a terminal) 1a-35 may access an external network via the eNB 1a-05, 1a-10, 1a-15, or 1a-20 and the S-GW 1a-30.

In FIG. 1, the eNB 1a-05, 1a-10, 1a-15, or 1a-20 may correspond to an existing node B of a universal mobile telecommunications system (UMTS). The eNB may be connected to the UE 1a-35 through wireless channels and may perform complex functions compared to the existing node B. All user traffic data including real-time services, such as voice over Internet protocol (VoIP) may be serviced through shared channels in the LTE system, and thus an entity for collating status information, e.g., buffer status information, available transmission power status information, and channel state information, of UEs and performing scheduling may be required and the eNB 1a-05, 1a-10, 1a-15, or 1a-20 may operate as such an entity. One eNB generally controls a plurality of cells. For example, the LTE system may use radio access technology, such as orthogonal frequency division multiplexing (OFDM) at a bandwidth of 20 MHz to achieve a data rate of 100 Mbps. Furthermore, the eNB may also use adaptive modulation & coding (AMC) to determine a modulation scheme and a channel coding rate in accordance with a channel state of the UE. The S-GW 1a-30 is an entity for providing data bearers and may establish and release the data bearers by the control of the MME 1a-25. The MME 1a-25 is an entity for performing a mobility management function and various control functions on the UE and is connected to the plurality of eNBs.

Figure 2:
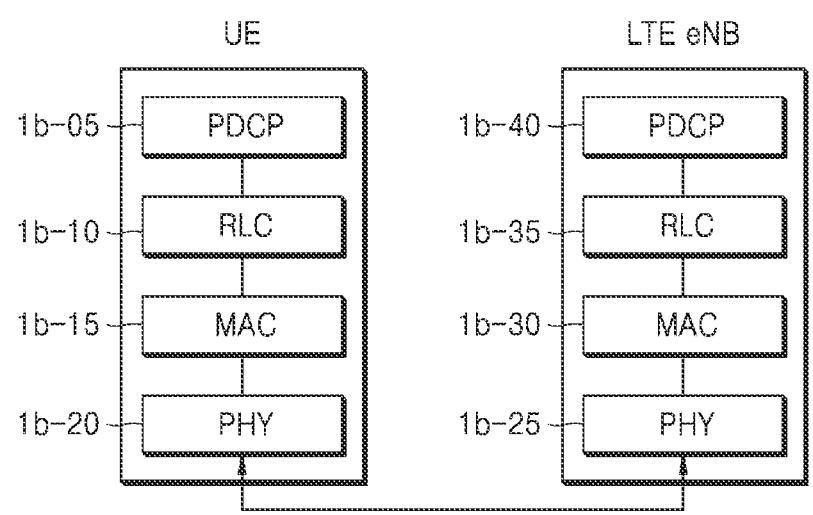
FIG. 2 is a diagram illustrating a radio protocol architecture of an LTE system according to an embodiment of the disclosure.

FIG. 2 is a diagram illustrating a radio protocol architecture of an LTE system according to an embodiment of the disclosure.

Referring to FIG. 2, radio protocols of the LTE system may include packet data convergence protocol (PDCP) layers 1b-05 and 1b-40, RLC layers 1b-10 and 1b-35, and medium access control (MAC) layers 1b-15 and 1b-30 respectively in a UE and an eNB. The PDCP layer 1b-05 or 1b-40 may perform, for example, IP header compression/decompression. Main functions of the PDCP layer 1b-05 or 1b-40 are summarized as shown below.

Header compression and decompression: robust header compression (ROHC) only

Transfer of user data

In-sequence delivery of upper layer packet data units (PDUs) at PDCP re-establishment procedure for RLC acknowledged mode (AM)

For split bearers in DC (only support for RLC AM): PDCP PDU routing for transmission and PDCP PDU reordering for reception Duplicate detection of lower layer service data units (SDUs) at PDCP re-establishment procedure for RLC AM Retransmission of PDCP SDUs at handover and, for split bearers in DC, of PDCP PDUs at PDCP data-recovery procedure, for RLC AM Ciphering and deciphering Timer-based SDU discard in uplink The RLC layer 1b-10 or 1b-35 may perform an automatic repeat request (ARQ) operation by reconfiguring Packet Data Convergence Protocol Packet Data Units (PDCP PDUs) to appropriate sizes. Main functions of the RLC layer may be summarized as shown below.

Transfer of upper layer PDUs

Error correction through ARQ (only for AM data transfer)

Concatenation, segmentation and reassembly of RLC SDUs (only for unacknowledged mode (UM) and AM data transfer)

Re-segmentation of RLC data PDUs (only for AM data transfer)

Reordering of RLC data PDUs (only for UM and AM data transfer)

Duplicate detection (only for UM and AM data transfer)

Protocol error detection (only for AM data transfer)

RLC SDU discard (only for UM and AM data transfer)

RLC re-establishment

The MAC layer 1b-15 or 1b-30 may be connected to a plurality of RLC layers configured for one UE and may multiplex RLC PDUs into a MAC PDU and may demultiplex the RLC PDUs from the MAC PDU. Main functions of the MAC layer may be summarized as shown below.

Mapping between logical channels and transport channels
  Multiplexing/demultiplexing of MAC SDUs belonging to one or different logical channels into/from transport blocks (TBs) delivered to/from the physical layer on transport channels Scheduling information reporting Error correction through hybrid ARQ (HARQ)

Priority handling between logical channels of one UE

Priority handling between UEs by means of dynamic scheduling

Multimedia broadcast/multicast service (MBMS) service identification

Transport format selection

Padding

A physical (PHY) layer 1b-20 or 1b-25 may channel-code and modulate upper layer data into OFDM symbols and transmit the OFDM symbols through a wireless channel, or may demodulate OFDM symbols received through a wireless channel and channel-decode and deliver the OFDM symbols to an upper layer.

Figure 3:
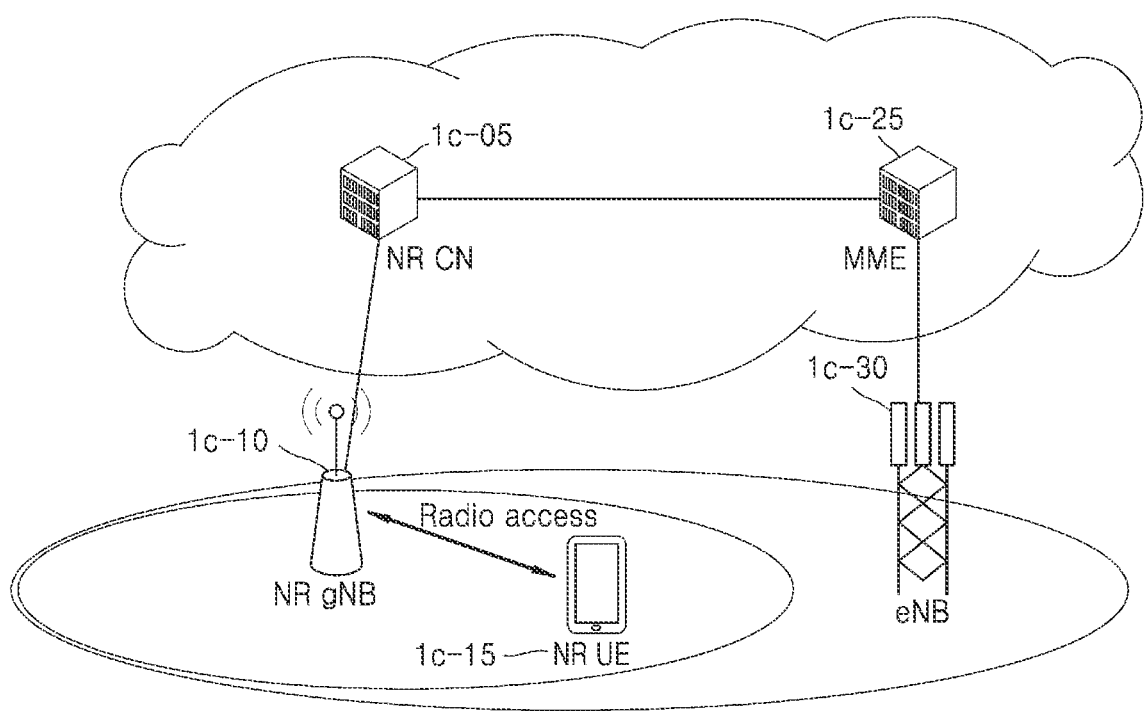
FIG. 3 is a diagram illustrating an applicable architecture of a next-generation mobile communication system according to an embodiment of the disclosure.

FIG. 3 is a diagram illustrating an applicable architecture of a next-generation mobile communication system according to an embodiment of the disclosure.

Referring to FIG. 3, as illustrated, a radio access network of the next-generation mobile communication system (hereinafter, referred to as the NR or 5G communication system) includes a new radio node B (NR gNB or NR BS) 1c-10 and a new radio core network (NR CN) 1c-05. A NR UE (or terminal) 1c-15 may access an external network via the NR gNB 1c-10 and the NR CN 1c-05.

In FIG. 3, the NR gNB 1c-10 may correspond to an existing eNB of the legacy LTE system. The NR gNB 1c-10 may be connected to the NR UE 1c-15 through radio channels and may provide superior services compared to an existing node B. All user traffic data may be serviced through shared channels in the NR or 5G mobile communication system, and thus, an entity for collating buffer status information of UEs, available transmission power status information, and channel state information and performing scheduling may be required and the NR gNB 1c-10 may operate as such an entity. One NR gNB may generally control a plurality of cells. In the NR or 5G communication system, a bandwidth greater than the maximum bandwidth of the existing LTE system may be used to achieve an ultra-high data rate, compared to the existing LTE system, and OFDM may be used as a radio access technology and a beamforming technology may be additionally applied thereto. Furthermore, AMC may be applied to determine a modulation scheme and a channel coding rate in accordance with a channel state of the UE. The NR CN 1c-05 may perform functions, such as mobility support, bearer configuration, and quality of service (QoS) configuration. The NR CN 1c-05 is an entity for performing a mobility management function and various control functions on the NR UE 1c-15 and may be connected to a plurality of base stations. The NR or 5G communication system may cooperate with the existing LTE system, and the NR CN 1c-05 may be connected to an MME 1c-25 through a network interface. The MME 1c-25 may be connected to an eNB 1c-30 that is an existing BS.

Figure 4:
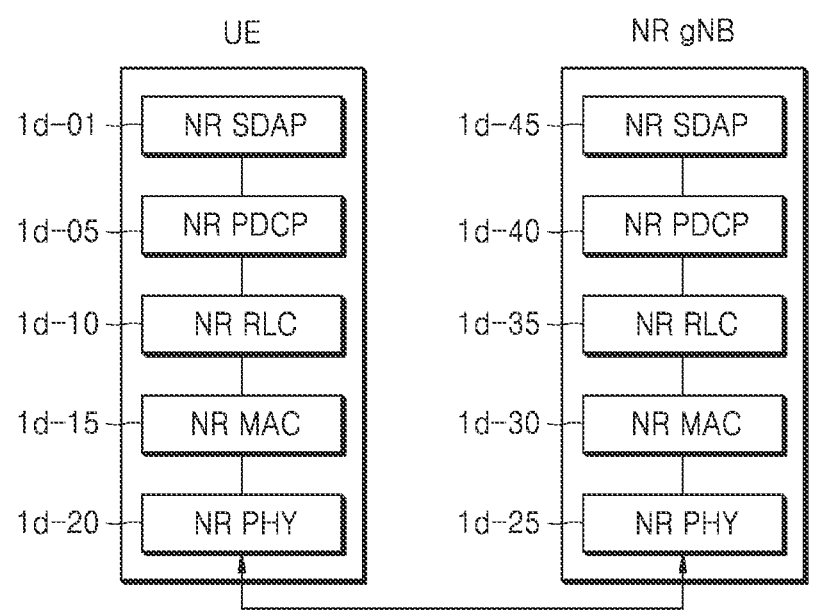
FIG. 4 is a diagram illustrating a radio protocol architecture of a new radio (NR) or $5^{th}$ generation (5G) communication system according to an embodiment of the disclosure.

FIG. 4 is a diagram illustrating a radio protocol architecture of a NR or 5G communication system according to an embodiment of the disclosure.

Referring to FIG. 4, the radio protocol architecture of the NR or 5G communication system may include NR service data adaptation protocol (SDAP) layers 1d-01 and 1d-45, NR PDCP layers 1d-05 and 1d-40, NR RLC layers 1d-10 and 1d-35, and NR MAC layers 1d-15 and 1d-30 respectively for a UE and an NR gNB.

Main functions of the NR SDAP layer 1d-01 or 1d-45 may include some of the following functions.

Transfer of user plane data

Mapping between a QoS flow and a DRB for both DL and UL

Marking QoS flow identifier (ID) in both DL and UL packets

Reflective QoS flow to DRB mapping for the UL SDAP PDUs

With regard to a SDAP layer, the UE may be configured with information about whether to use a header of the SDAP layer or to use functions of the SDAP layer, through a radio resource control (RRC) message per PDCP layer, per bearer, or per logical channel. In addition, when the SDAP header of the SDAP layer is configured, a 1-bit non access stratum (NAS) reflective QoS indicator and a 1-bit access stratum (AS) reflective QoS indicator of the SDAP header may indicate the UE to update or reconfigure UL and DL QoS flow and data bearer mapping information. The SDAP header may include QoS flow ID information indicating QoS. The QoS information may be used as data processing priority information or scheduling information for appropriately supporting a service.

Main functions of the NR PDCP layer 1d-05 or 1d-40 may include some of the following functions.

Header compression and decompression: ROHC only

Transfer of user data

In-sequence delivery of upper layer PDUs

Out-of-sequence delivery of upper layer PDUs

PDCP PDU reordering for reception

Duplicate detection of lower layer SDUs

Retransmission of PDCP SDUs

Ciphering and deciphering

Timer-based SDU discard in uplink.

In the above descriptions, the reordering function of the NR PDCP layer may include a function of reordering PDCP PDUs received from a lower layer, on a PDCP sequence number (SN) basis, and a function of delivering the reordered data to an upper layer in order. Alternatively, the reordering function of the NR PDCP layer may include a function of delivering the reordered data to an upper layer out of order, a function of recording missing PDCP PDUs by reordering the received PDCP PDUs, a function of reporting status information of the missing PDCP PDUs to a transmitter, and a function of requesting to retransmit the missing PDCP PDUs.

Main functions of the NR RLC layer 1d-10 or 1d-35 may include some of the following functions.

Transfer of upper layer PDUs

In-sequence delivery of upper layer PDUs

Out-of-sequence delivery of upper layer PDUs

Error correction through ARQ

Concatenation, segmentation and reassembly of RLC SDUs

Re-segmentation of RLC data PDUs

Reordering of RLC data PDUs

Duplicate detection

Protocol error detection

RLC SDU discard

RLC re-establishment

In the above descriptions, the in-sequence delivery function of the NR RLC layer indicates a function of delivering RLC SDUs received from a lower layer to an upper layer in order. The in-sequence delivery function of the NR RLC layer may include a function of reassembling the RLC SDUs and delivering the reassembled RLC SDU when a plurality of RLC SDUs segmented from one RLC SDU are received, a function of reordering received RLC PDUs on an RLC SN or PDCP SN basis, a function of recording missing RLC PDUs by reordering the received RLC PDUs, a function of reporting status information of the missing RLC PDUs to a transmitter, a function of requesting to retransmit the missing RLC PDUs, a function of delivering only RLC SDUs prior to a missing RLC SDU, to an upper layer in order when the missing RLC SDU exists, or a function of delivering all RLC SDUs received before a timer starts, to an upper layer in order although a missing RLC SDU exists when a certain timer expires. Furthermore, the out-of-sequence delivery function of the NR RLC layer may process the RLC PDUs in order of reception and deliver the RLC PDUs to the NR PDCP layer regardless of SNs (out-of-sequence delivery), and when a received RLC PDU is a segment, the NR RLC layer may reassemble the segment with other segments stored in a buffer or subsequently received, into a whole RLC PDU and may transmit the RLC PDU to the NR PDCP layer. The NR RLC layer may not have a concatenation function, and the function may be performed by the NR MAC layer or be replaced with a multiplexing function of the NR MAC layer.

In the above descriptions, the out-of-sequence delivery function of the NR RLC layer may include a function of directly delivering RLC SDUs received from a lower layer to an upper layer out of order, a function of reassembling a plurality of RLC SDUs segmented from one RLC SDU and delivering the reassembled RLC SDU when the segmented RLC SDUs are received, and a function of recording missing RLC PDUs by storing RLC SNs or PDCP SNs of received RLC PDUs and reordering the received RLC PDUs.

The NR MAC layer 1d-15 or 1d-30 may be connected to a plurality of NR RLC layers configured for one UE, and main functions of the NR MAC layer may include some of the following functions.

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding An NR PHY layer 1d-20 or 1d-25 may channel-code and modulate upper layer data into OFDM symbols and may transmit the OFDM symbols through a wireless channel, or may demodulate OFDM symbols received through a wireless channel and channel-decode and may deliver the OFDM symbols to an upper layer.

Figure 5:
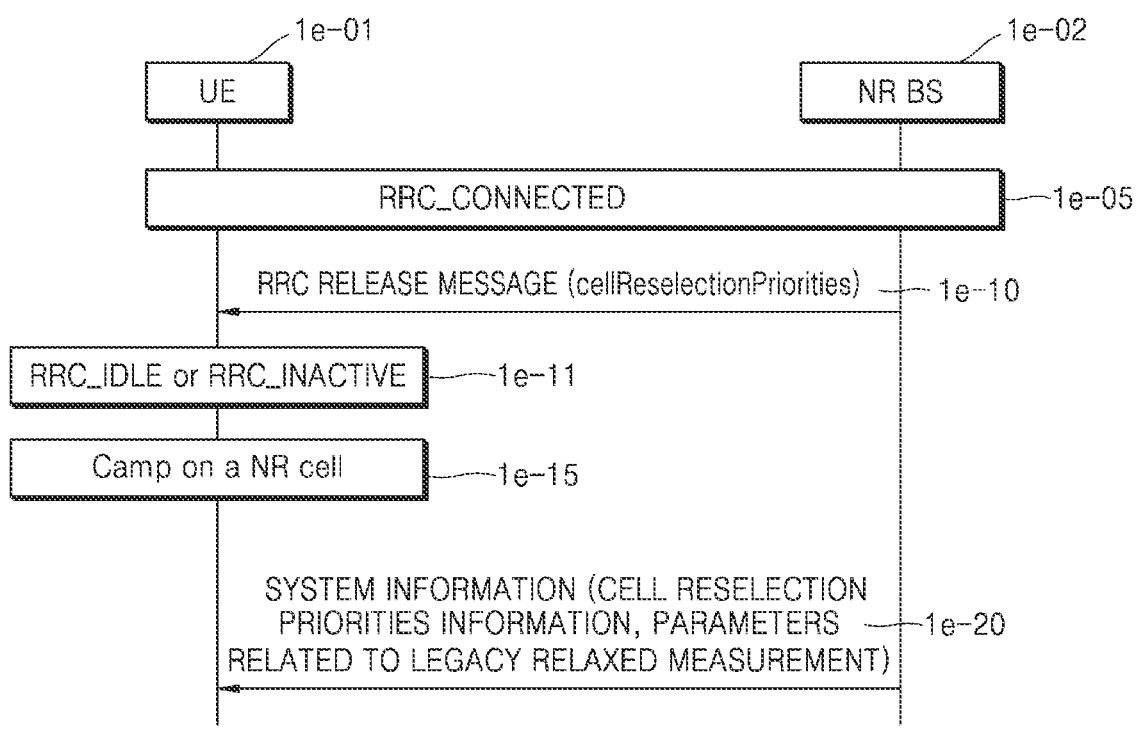
FIG. 5 is a diagram for describing a procedure in which a releases connection to a user equipment (UE), and thus the UE switches from an RRC_CONNECTED mode to an RRC_IDLE mode or an RRC_INACTIVE mode, and a procedure in which a new radio base station (NR BS) broadcasts system information including cell reselection information according to an embodiment of the disclosure.

FIG. 5 is a diagram for describing a procedure in which a releases connection to a UE 1e-01, and thus the UE 1e-01 switches from an RRC_CONNECTED mode to an RRC_IDLE mode or an RRC_INACTIVE mode, and a procedure in which the NR BS 1e-02 broadcasts system information including cell reselection information according to an embodiment of the disclosure.

Referring to FIG. 5, the UE 1e-01 may be in the RRC_CONNECTED mode (operation 1e-05).

In operation 1e-10, the UE 1e-01 in the RRC_CONNECTED mode may receive an RRC release message (RRCRelease) from the NR BS 1e-02. According to whether or not the received RRC release message includes suspend configuration information (suspendConfig), the UE 1e-01 in the RRC_CONNECTED mode may transition to the RRC_INACTIVE mode or the RRC_IDLE mode. For example, when the RRC release message includes the suspend configuration information, the UE 1e-01 in the RRC_CONNECTED mode may transition to the RRC_INACTIVE mode, and if not, may transition to the RRC_IDLE mode (operation 1e-11).

In operation 1e-10, the NR BS 1e-02 may add cellReselectionPriorities including cell reselection priorities information to the RRC release message. When the RRC release message includes the cellReselectionPriorities, the UE 1e-01 may store the cell reselection priorities information provided in the cellReselectionPriorities. When the RRC release message includes t320 value, the UE 1e-01 may set a timer value as the t320 value and then may start T320 timer. When the RRC release message does not include the cellReselectionPriorities, the UE 1e-01 in the RRC_IDLE mode or the RRC_INACTIVE mode may apply cell reselection priorities information broadcast in system information (operation 1e-20). For example, when the RRC release message includes the cellReselectionPriorities, the UE 1e-01 may ignore the cell reselection priorities information provided in the system information. For reference, when T320 timer expires, the UE 1e-01 may discard the cellReselectionPriorities included in the RRC release message, and may apply the cell reselection priorities information broadcast in the system information. Alternatively, in a case where T320 timer is running while the UE 1e-01 is in the RRC_IDLE mode, when inter-radio access technology (RAT) cell reselection (NR cell→E-UTRA cell) occurs, the UE 1e-01 inherits the cellReselectionPriorities included in the RRC release message, and inherits a remaining value of T320 timer.

The cellReselectionPriorities that may be included in the RRC release message in operation 1e-10 may include at least one information in the followings.

freqPriorityListEUTRA: may be a list of one or more evolved universal terrestrial radio access (EUTRA) frequencies, and may include a cell reselection priority value (CellReselectionPriority and/or CellReselectionSubPriority) for each of the EUTRA frequencies (absolute radio-frequency channel number (ARFCN)–ValueEUTRA). For reference, the cell reselection priority value may be derived as (i.e., calculated according to) CellReselectionPriority+CellReselectionSubPriority (if included/signaled), and may be equally applied to descriptions to be provided below. freqPriorityListEUTRA may have Abstract Syntax Notation (ASN). 1 structure below.

```
FreqPriorityListEUTRA ::=    SEQUENCE (SIZE (1..maxFreq)) OF FreqPriorityEUTRA
    FreqPriorityEUTRA ::=    SEQUENCE {
    carrierFreq        ARFCN-ValueEUTRA,
    cellReselectionPriority    CellReselectionPriority,
    cellReselectionSubPriority            CellReselectionSubPriority OPTIONAL    -- Need R        }
``` freqPriorityListNR: may be a list of one or more NR frequencies, and may include a cell reselection priority value for each of the NR frequencies (ARFCN-ValueNR). freqPriorityListNR may have abstract syntax notation (ASN). 1 structure below.

```
FreqPriorityListNR ::=    SEQUENCE (SIZE (1..maxFreq)) OF FreqPriorityNR
    FreqPriorityNR ::=     SEQUENCE {
    carrierFreq     ARFCN-ValueNR,
    cellReselectionPriority        ,
    cellReselectionSubPriority                OPTIONAL    -- Need R
}
```

T320 timer value: may be set as 5 minutes (min), 10 min., 20 min., 30 min., 60 min., 120 min., 180 min. or another value.

t320 ENUMERATED {min5, min10, min20, min30, min60, min120, min180, spare1} OPTIONAL, —Need R In operation 1e-15, the UE 1e-01 in the RRC_IDLE mode or the RRC_INACTIVE mode may discover a suitable NR cell by performing a cell selection procedure and may camp-on the suitable NR cell. A cell on which the UE 1e-01 in the RRC_IDLE mode or the RRC_INACTIVE mode camps by discovering a suitable cell may be referred to as a serving cell. In order to perform the cell selection procedure, the UE 1e-01 may receive system information (e.g., MIB and SIB1) broadcast from the cell. In order to perform the cell selection procedure, the UE 1e-01 in the RRC_IDLE mode or the RRC_INACTIVE mode may measure absolute signal power (reference signal received power (RSRP, Qrxlevmeas) of the cell and relative signal quality (reference signal received quality (RSRQ, Qqualmeas)) of the cell. For example, the UE 1e-01 may calculate a reception level (Srxlev) and a reception quality (Squal) of the cell by using parameters included in the system information received in operation 1e-15. For example, the reception level and the reception quality of the cell may be calculated by using Equation 1 below.

$$\text{Srxlev} = Q_{rxlevmeas} - (Q_{rxlevmin} + Q_{rxlevminoffset}) - P_{compensation} - Q_{offsettemp},$$

$$\text{Squal} = Q_{qualmeas} - (Q_{qualmin} + Q_{qualminoffset}) - Q_{offsettemp}. \quad \text{Equation 1}$$

Definitions of the parameters used in Equation 1 may be referred to 3GPP standard specification "38.304: user equipment (UE) procedures in Idle mode and RRC Inactive state". Hereinafter, contents of the 3GPP standard specification may be equally applied to embodiments of the disclosure to which Equation 1 is applied.

In operation 1e-20, the UE 1e-01 in the RRC_IDLE mode or the RRC_INACTIVE mode may receive system information (e.g., SIB2, SIB3, SIB4 and/or SIB5) including cell reselection information. For example, with respect to the cell reselection information, the NR BS 1e-02 may add, to the system information, cell reselection priorities information associated with frequencies for each RAT, and parameters associated with legacy relaxed measurement. Moreover, with respect to the cell reselection priorities information associated with frequencies for each RAT, the UE 1e-01 may receive through SIB2, a cell reselection priority value (cellReselectionPriority and/or cellReselectionSubPriority) for a NR intra-frequency to which a current serving cell belongs, through SIB4, cell reselection priority values (cellReselectionPriority and/or cellReselectionSubPriority) for other NR inter-frequencies different from a frequency to which the current serving cell belongs, and through SIB5, cell reselection priority values (cellReselectionPriority and/or cellReselectionSubPriority) for inter-RAT frequencies used in a RAT other than a RAT for the current serving cell, and with respect to the parameters associated with legacy relaxed measurement, the UE 1e-01 may receive through SIB2, Srxlev threshold value (s-IntraSearchP) and Squal threshold value (s-IntraSearchQ) about whether to relax NR intra-frequency measurement, and Srxlev threshold value (s-NonIntraSearchP) and Squal threshold value (s-NonIntraSearchQ) about whether to relax equal priority NR inter-frequency measurement, lower-priority NR inter-frequency measurement, and lower-priority inter-RAT frequency measurement.

Figure 6:
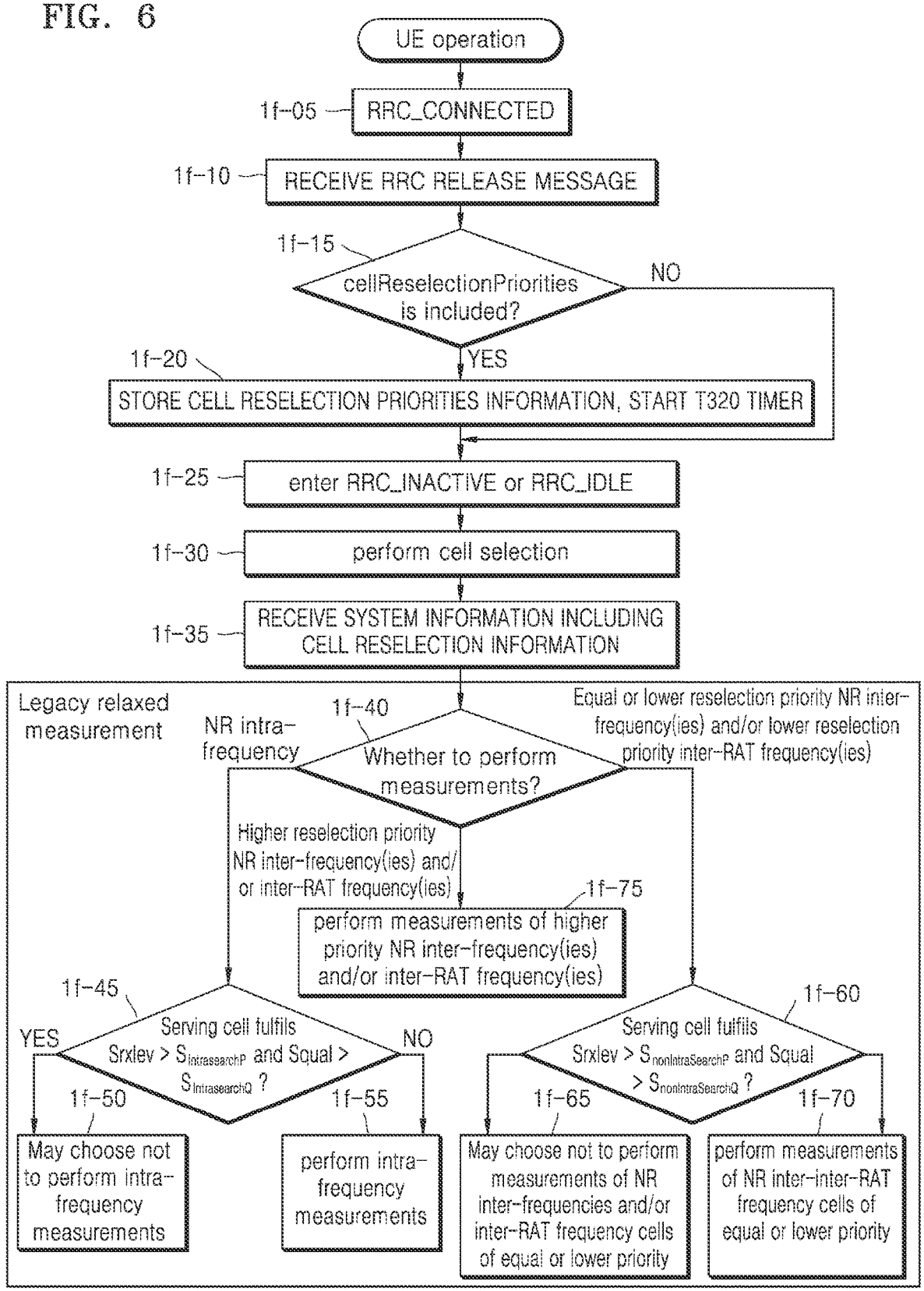
FIG. 6 is a diagram for describing operations of a UE in an RRC_IDLE mode or an RRC_INACTIVE mode, the UE measuring a neighboring cell by applying legacy relaxed measurement so as to perform a cell reselection evaluation procedure according to an embodiment of the disclosure.

FIG. 6 is a diagram for describing operations of a UE in an RRC_IDLE mode or an RRC_INACTIVE mode, the UE measuring a neighboring cell by applying legacy relaxed measurement so as to perform a cell reselection evaluation procedure according to an embodiment of the disclosure.

Referring to FIG. 6, the UE may be in an RRC_CONNECTED mode (operation 1f-05).

In operation 1f-10, the UE may receive an RRC release message (RRCRelease) from a BS.

In operation 1f-15, the UE may determine whether cellReselectionPriorities are included in the RRC release message. Information included in the cellReselectionPriorities may be determined according to the aforedescribed embodiment of the disclosure. When the RRC release message includes the cellReselectionPriorities, the UE may perform operation 1f-20, and when the RRC release message does not include the cellReselectionPriorities, the UE may not perform operation 1f-20.

In operation 1f-20, the UE may store the cell reselection priorities information provided in the cellReselectionPriorities included in the RRC release message. When the RRC release message includes t320 value, the UE may set a timer value as the t320 value and then may start T320 timer.

In operation 1f-25, the UE may transition to an RRC_IDLE mode or an RRC_INACTIVE mode. Whether the UE is to transition to the RRC_IDLE mode or the RRC_INACTIVE mode may be determined according to the aforedescribed embodiment of the disclosure.

In operation 1f-30, the UE that transitioned to the RRC_IDLE mode or the RRC_INACTIVE mode may camp-on a suitable cell by performing a cell selection procedure. The cell selection procedure may be determined according to the aforedescribed embodiment of the disclosure.

In operation 1f-35, the UE may receive system information including cell reselection information. For example, the UE may receive, from the system information, cell reselection priority values associated with frequencies for each RAT, and parameters associated with relaxed measurement.

In operation 1f-40, the UE may determine whether to measure neighboring cells by applying legacy relaxed measurement thereto according to a preset condition by applying the cell reselection priority values associated with frequencies for each RAT, and the parameters associated with relaxed measurement. When the cellReselectionPriorities are included in the RRC release message received in operation 1f-10 and T320 timer is running, the UE may apply the legacy relaxed measurement, based on cell reselection priority values included in the cellReselectionPriorities provided in the RRC release message. When the cellReselectionPriorities are not included in the RRC release message received in operation 1f-10 or T320 timer is expired, the UE may apply the legacy relaxed measurement, based on the cell reselection priority values provided in the system information received in operation 1f-35. Alternatively, in a case where T320 timer is running while the UE is in the RRC_IDLE mode, when inter-RAT cell reselection (NR cell→E-UTRA cell) occurs, the UE may inherit the cellReselectionPriorities included in the RRC release message received in operation 1f-10, may inherit a remaining value of T320 timer, and may perform operations after operation 1f-40 (NR intra-frequency may be replaced with E-UTRAN intra-frequency, NR inter-frequency may be replaced with E-UTRAN inter-frequency, and inter-RAT frequency may be replaced with NR frequency). When inter-RAT cell reselection (E-UTRA cell→NR cell) occurs, the UE may inherit the cellReselectionPriorities, may inherit a remaining value of T320 timer, and may perform operations after operation 1f-40.

In operation 1f-45, the UE may determine whether Condition 1 below is fulfilled so as to determine whether to perform NR intra-frequency measurements.

Condition 1

A reception level (Srxlev) of a serving cell is greater than $S_{IntraSearchP}$, and a reception quality (Squal) of the serving cell is greater than $S_{IntrasearchQ}$.

When Condition 1 is fulfilled, the UE may not perform NR intra-frequency measurements (operation 1f-50). When Condition 1 is not fulfilled, the UE performs NR intra-frequency measurements (operation 1f-55).

In operation 1f-60, the UE may determine whether Condition 2 below is fulfilled so as to determine whether to perform measurement on each NR inter-frequency having a reselection priority value equal to or lower than a current NR frequency (i.e., a serving frequency) or each inter-RAT frequency having a reselection priority value lower than the current NR frequency.

A reception level (Srxlev) of a serving cell is greater than $S_{nonIntraSearchP}$, and a reception quality (Squal) of the serving cell is greater than $S_{nonIntraSearchQ}$.

When Condition 2 is fulfilled, the UE may not perform measurement on NR intra-frequencies having reselection priority values equal to or smaller than a current NR frequency (i.e., a serving frequency) or inter-RAT frequency cells having small reselection priority values (operation 1f-65). When Condition 2 is not fulfilled, the UE performs measurement on the NR intra-frequencies having reselection priority values equal to or smaller than the current NR frequency (i.e., the serving frequency) or the inter-RAT frequency cells having reselection priority values lower than the current NR frequency, according to 3GPP standard specification "38.133: NR; Requirements for Support of Radio Resource Management" (operation 1f-70). For example, a measurement cycle may be per n*DRX cycle (n=1 for FR1, n=1.5 for FR2).

In operation 1f-75, the UE performs measurement on each NR inter-frequency or each inter-RAT frequency which has a reselection priority value higher than the current NR frequency (i.e., the serving frequency), according to 3GPP standard specification "38.133: NR, Requirements for Support of Radio Resource Management". For example, a measurement cycle may be per n*DRX cycle (n=1 for FR1, n=1.5 for FR2). Regardless of whether Condition 2 is fulfilled, the UE may perform measurement on each NR inter-frequency or each inter-RAT frequency which has a reselection priority value higher than the current NR frequency (i.e., the serving frequency).

FIG. 7 is a diagram for describing a procedure in which a NR BS 1g-02 releases connection to a UE 1g-01, and thus the UE 1e-01 switches from an RRC_CONNECTED mode to an RRC_IDLE mode or an RRC_INACTIVE mode, and a procedure in which the NR BS 1g-02 broadcasts system information including cell reselection information according to an embodiment of the disclosure.

Referring to FIG. 7, the UE 1g-01 may be in the RRC_CONNECTED mode (operation 1g-05).

In operation 1g-10, the UE 1g-01 in the RRC_CONNECTED mode may receive an RRC release message (RRCRelease) from the NR BS 1g-02. According to whether or not the received RRC release message includes suspend configuration information (suspendConfig), the UE 1g-01 in the RRC_CONNECTED mode may transition to the RRC_INACTIVE mode or the RRC_IDLE mode. For example, when the RRC release message includes the suspend configuration information, the UE 1g-01 in the RRC_CONNECTED mode may transition to the RRC_I-NACTIVE mode (operation 1g-11), and if not, may transition to the RRC_IDLE mode (operation 1g-11).

In operation 1g-10, the NR BS 1g-02 may add cellReselectionPriorities including cell reselection priorities information to the RRC release message. When the RRC release message includes the cellReselectionPriorities, the UE 1g-01 may store the cell reselection priorities information provided in the cellReselectionPriorities. When the RRC release message includes t320 value, the UE 1g-01 may set a timer value as the t320 value and then may start T320 timer. When the RRC release message does not include the cellReselectionPriorities, the UE 1g-01 in the RRC_IDLE mode or the RRC_INACTIVE mode may apply cell reselection priorities information broadcast in system information (operation 1g-20). For example, when the RRC release message includes the cellReselectionPriorities, the UE 1g-01 may ignore the cell reselection priorities information provided in the system information. For reference, when T320 timer expires, the UE 1g-01 may discard the cellReselectionPriorities included in the RRC release message, and may apply the cell reselection priorities information broadcast in the system information. Alternatively, in a case where T320 timer is running while the UE 1g-01 is in the RRC_IDLE mode, when inter-RAT cell reselection (NR cell→E-UTRA cell) occurs, the UE 1g-01 may inherit the cellReselectionPriorities included in the RRC release message which is received in operation 1g-10, and may inherit a remaining value of T320 timer.

The cellReselectionPriorities that may be included in the RRC release message in operation 1g-10 may include at least one information in the followings.

freqPriorityListEUTRA: may be a list of one or more EUTRA frequencies, and may include a cell reselection priority value (CellReselectionPriority and/or CellReselectionSubPriority) for each of the EUTRA frequencies (ARFCN-ValueEUTRA). For reference, the cell reselection priority value may be derived as (i.e., calculated according to) CellReselectionPriority+CellReselectionSubPriority (if included/signaled), and may be equally applied to descriptions to be provided below. freqPriorityListEUTRA may have Abstract Syntax Notation (ASN). 1 structure below.

```
FreqPriorityListEUTRA ::=    SEQUENCE (SIZE (1..maxFreq)) OF
FreqPriorityEUTRA
    FreqPriorityEUTRA ::=    SEQUENCE {
    carrierFreq    ARFCN-ValueEUTRA,
    cellReselectionPriority    CellReselectionPriority,
    cellReselectionSubPriority              CellReselectionSubPriority
OPTIONAL     -- Need R      }
``` freqPriorityListNR: may be a list of one or more NR frequencies, and may include a cell reselection priority value for each of the NR frequencies (ARFCN-ValueNR). freqPriorityListNR may have ASN. 1 structure below.

```
FreqPriorityListNR ::=    SEQUENCE (SIZE (1..maxFreq)) OF
FreqPriorityNR
    FreqPriorityNR ::=    SEQUENCE {
    carrierFreq    ARFCN-ValueNR,
    cellReselectionPriority    CellReselectionPriority,
    cellReselectionSubPriority              CellReselectionSubPriority
OPTIONAL     -- Need R      }
```

T320 timer value: may be set as 5 min., 10 min., 20 min., 30 min., 60 min., 120 min., 180 min. or another value.

t320 ENUMERATED {min5, min10, min20, min30, min60, min120, min180, spare1} OPTIONAL, —Need R In operation 1g-15, the UE 1g-01 in the RRC_IDLE mode or the RRC_INACTIVE mode may discover a suitable NR cell by performing a cell selection procedure and may camp-on the suitable NR cell. The cell selection procedure may be performed according to the aforedescribed embodiment of the disclosure.

In operation 1g-20, the UE 1g-01 in the RRC_IDLE mode or the RRC_INACTIVE mode may receive system information (e.g., SIB2, SIB3, SIB4 and/or SIB5) including cell reselection information. For example, with respect to the cell reselection information, the NR BS 1g-02 may add, to the system information, cell reselection priorities information associated with frequencies for each RAT, parameters associated with legacy relaxed measurement, and parameters associated with new relaxed measurements. Moreover, with respect to the cell reselection priorities information associated with frequencies for each RAT, the UE 1g-01 may receive through SIB2, a cell reselection priority value (cellReselectionPriority and/or cellReselectionSubPriority) for a NR intra-frequency to which a current serving cell belongs, through SIB4, cell reselection priority values (cellReselectionPriority and/or cellReselectionSubPriority) for other NR inter-frequencies different from a frequency to which the current serving cell belongs, and through SIB5, cell reselection priority values (cellReselectionPriority and/or cellReselectionSubPriority) for inter-RAT frequencies used in a RAT other than a RAT for the current serving cell, with respect to the parameters associated with legacy relaxed measurement, the UE 1g-01 may receive through SIB2, Srxlev threshold value (s-IntraSearchP) and Squal threshold value (s-IntraSearchQ) about whether to relax NR intra-frequency measurement, and Srxlev threshold value (s-NonIntraSearchP) and Squal threshold value (s-NonIntraSearchQ) about whether to relax inter-RAT frequency measurement, and with respect to the parameters associated with new relaxed measurement, the UE 1g-01 may receive through SIB2, Srxlev difference threshold value (s-SearchDeltaP) to be applied to a preset equation, particular time period value (t-SearchDeltaP), Qrxlevmeas or Srxlev threshold value (s-SearchThresholdP) and Qqualmeas or Squal threshold value (s-SearchThresholdQ) which are to be applied to at least one preset equation, an indicator indicating whether to relax measurement of a higher reselection priority frequency, an indicator whether to apply new relaxed measurement according to a criterion satisfied when one of two criteria is satisfied in a case where all of a parameter for a low-mobility criterion and a parameter for a not-at-cell-edge condition to be described below are configured (e.g., when the indicator is configured, the UE 1g-01 may apply the new relaxed measurement even when only one criterion is satisfied, and when the indicator is not configured, the UE 1g-01 applies the new relaxed measurement only when the two criteria are all configured), and one or more integer values (m per FR, n1 per FR, k per FR, m1 per FR) for each of frequencies so as to adjust a measurement cycle.

Figure 8A:
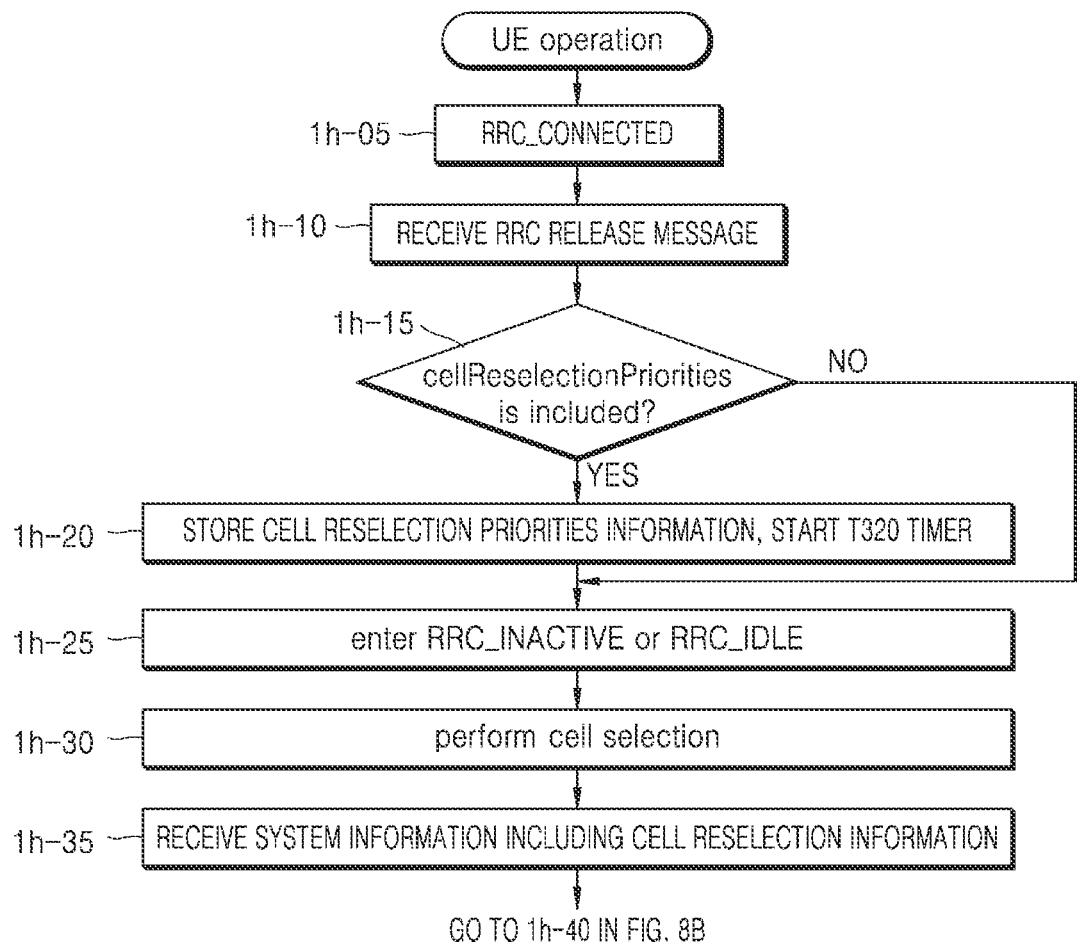
FIGS. 8A, 8B, and 8C are diagrams for describing operations of a UE in an RRC_IDLE mode or an RRC_INACTIVE mode, the UE measuring a neighboring cell by applying new relaxed measurement so as to perform a cell reselection evaluation procedure according to various embodiments of the disclosure.
Figure 8B:
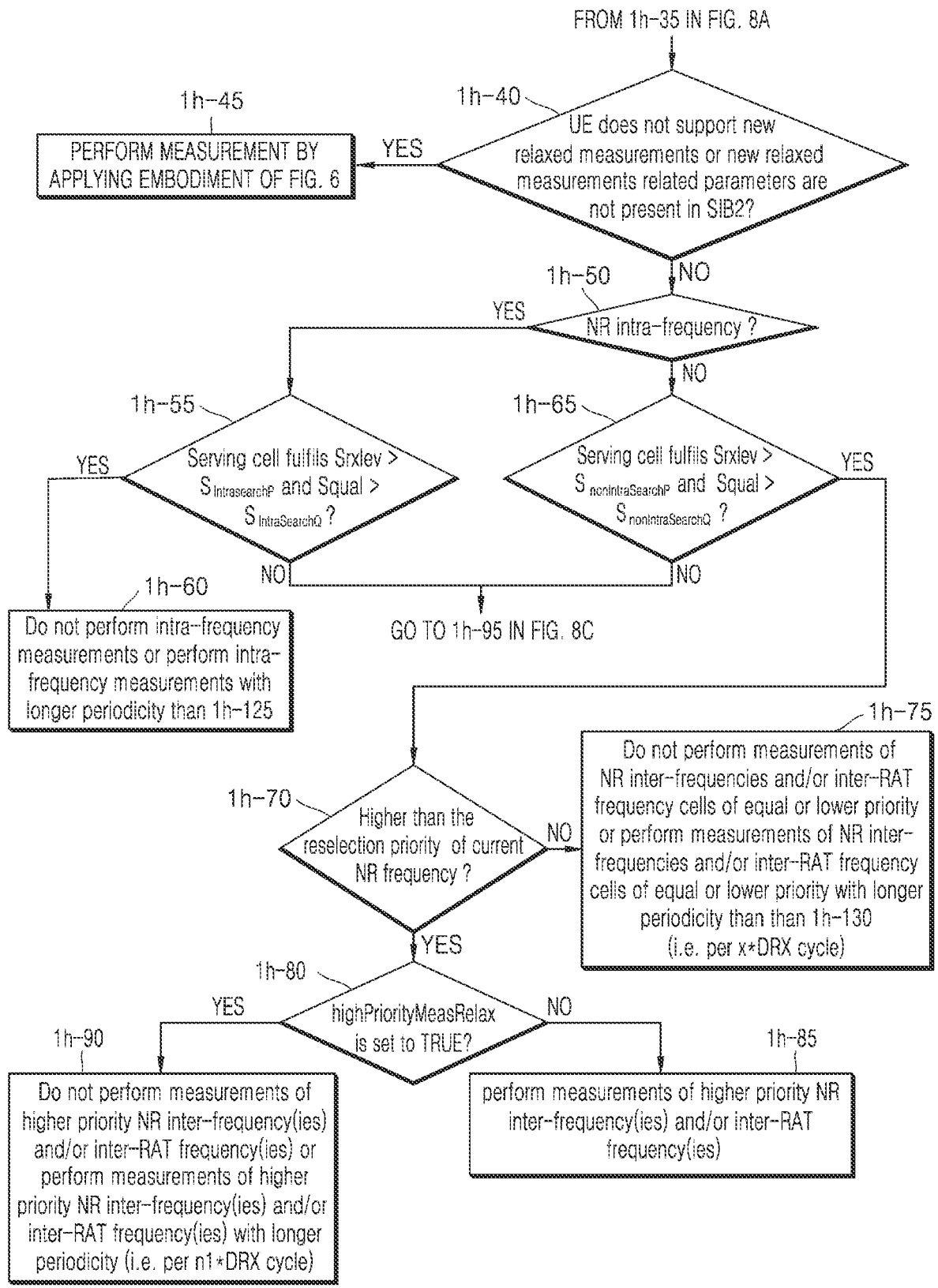
Figure 8C:
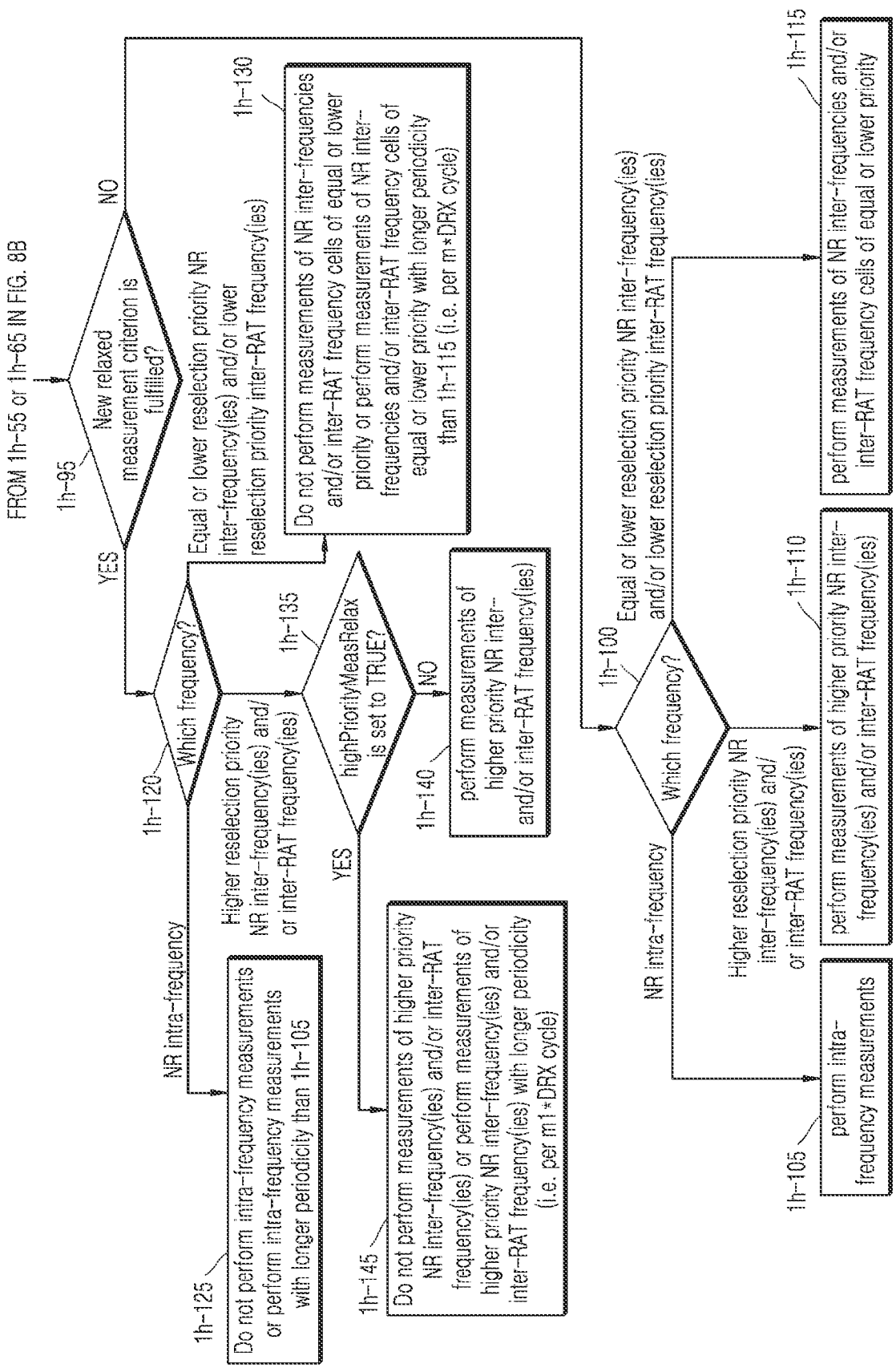

FIGS. 8A, 8B, and 8C are diagrams for describing operations of a UE in an RRC_IDLE mode or an RRC_INACTIVE mode, the UE measuring a neighboring cell by applying new relaxed measurement so as to perform a cell reselection evaluation procedure according to various embodiments of the disclosure.

Referring to FIG. 8A, the UE may be in an RRC_CONNECTED mode (operation 1h-05).

In operation 1h-10, the UE may receive an RRC release message (RRCRelease) from a BS.

In operation 1h-15, the UE may determine whether cellReselectionPriorities are included in the RRC release message. Information included in the cellReselectionPriorities provided in the RRC release message may be determined according to the aforedescribed embodiment of the disclosure. When the RRC release message includes the cellReselectionPriorities, the UE may perform operation 1h-20, and when the RRC release message does not include the cellReselectionPriorities, the UE may not perform operation 1h-20.

In operation 1h-20, the UE may store the cell reselection priorities information provided in the cellReselectionPriorities included in the RRC release message. When the RRC release message includes t320 value, the UE may set a timer value as the t320 value and then may start T320 timer.

In operation 1h-25, the UE may transition to an RRC_IDLE mode or an RRC_INACTIVE mode. Whether the UE is to transition to the RRC_IDLE mode or the RRC_INACTIVE mode may be determined according to the aforedescribed embodiment of the disclosure.

In operation 1h-30, the UE that transitioned to the RRC_IDLE mode or the RRC_INACTIVE mode may camp-on a suitable cell by performing a cell selection procedure. The cell selection procedure may be determined according to the aforedescribed embodiment of the disclosure.

In operation 1h-35, the UE may receive system information including cell reselection information. For example, the UE may receive, from the system information, cell reselection priority values associated with frequencies for each RAT, parameters associated with relaxed measurement, and parameters associated with new relaxed measurements.

Referring to FIG. 8B, in operation 1h-40, the UE may determine whether to measure neighboring cells by applying the new relaxed measurement thereto according to a preset condition by applying the cell reselection priority values associated with frequencies for each RAT, the parameters associated with relaxed measurement, and the parameters associated with new relaxed measurements. When the cellReselectionPriorities are included in the RRC release message received in operation 1h-10 and T320 timer is running, the UE may apply the new relaxed measurement, based on cell reselection priority values included in the cellReselectionPriorities provided in the RRC release message. When the cellReselectionPriorities are not included in the RRC release message received in operation 1h-10 or T320 timer is expired, the UE may apply the new relaxed measurement, based on the cell reselection priority values provided in the system information received in operation 1h-35. Alternatively, in a case where T320 timer is running while the UE is in the RRC_IDLE mode, when inter-RAT cell reselection (NR cell→E-UTRA cell) occurs, the UE may inherit the cellReselectionPriorities included in the RRC release message received in operation 1h-10, may inherit a remaining value of T320 timer, and may perform operations after operation 1h-40 (NR intra-frequency may be replaced with E-UTRAN intra-frequency, NR inter-frequency may be replaced with E-UTRAN inter-frequency, and inter-RAT frequency may be replaced with NR frequency). When inter-RAT cell reselection (E-UTRA cell→NR cell) occurs, the UE may inherit the cellReselectionPriorities, may inherit a remaining value of T320 timer, and may perform operations after operation 1h-40.

In operation 1h-40, when the UE does not support new relaxed measurements or parameters associated with the new relaxed measurements are not signaled through SIB2, the UE may perform measurement, based on the embodiment (described with reference to FIG. 6) of the disclosure (operation 1h-45).

In operation 1h-50, when the UE supports the new relaxed measurements and the parameters associated with the new relaxed measurements are signaled through SIB2, in operation 1h-55, the UE may determine whether Condition 1 below is fulfilled so as to determine whether to perform NR intra-frequency measurements.

Condition 1

A reception level (Srxlev) of a serving cell is greater than $S_{IntraSearchP}$, and a reception quality (Squal) of the serving cell is greater than $S_{IntrasearchQ}$.

When Condition 1 is fulfilled, the UE may not perform NR intra-frequency measurements (operation 1h-60). Alternatively, when Condition 1 is fulfilled, the UE may perform measurement with a cycle value equal to a cycle of measurement performed in operation 1h-125 or with a cycle value greater than the cycle of measurement performed in operation 1h-125. For example, the BS may signal, through the system information, frequency values (k1>k or k1>=k) for respective frequency range (FR). Based on a signaled value, the cycle of measurement by the UE may be determined as per k1*DRX cycle. Alternatively, the k1 value may be previously hard-coded into the UE.

In operation 1h-40, when the UE supports the new relaxed measurements and the parameters associated with the new relaxed measurements are signaled through SIB2, in operation 1h-65, the UE may determine whether Condition 2 below is fulfilled so as to determine whether to perform NR inter-frequency measurements or inter-RAT frequency measurements.

Condition 2

A reception level (Srxlev) of a serving cell is greater than $S_{nonIntraSearchP}$, and a reception quality (Squal) of the serving cell is greater than $S_{nonIntraSearchQ}$.

When Condition 2 is fulfilled, the UE may determine whether a cell reselection priority value of each NR inter-frequency or each inter-RAT frequency is greater than a cell reselection priority value of a current NR frequency (operation 1h-70).

In operation 1h-75, the UE may not perform measurement on each NR inter-frequency or each inter-RAT frequency whose cell reselection priority value is equal to or lower than the current NR frequency. Alternatively, the UE may perform measurement on each NR inter-frequency or each inter-RAT frequency whose cell reselection priority value is equal to or lower than the current NR frequency, according to 3GPP standard specification "38.133: NR; Requirements for Support of Radio Resource Management". In this regard, the UE may perform measurement with a measurement cycle value equal to a cycle of measurement performed in operation 1h-130 or with a measurement cycle value greater than the cycle of measurement performed in operation 1h-130. For example, the BS may signal, through the system information, frequency values (x>m or x>=m) for respective frequency range (FR). Based on a signaled value, the cycle of measurement by the UE may be determined as per x*DRX cycle. Alternatively, the x value may be previously hard-coded into the UE.

In operation 1h-80, the UE may determine whether highPriorityMeasRelax is set.

When highPriorityMeasRelax is not set (e.g., highPriorityMeas is not signaled or is set to FALSE), in operation 1h-85, the UE may perform measurement on each NR inter-frequency or each inter-RAT frequency whose cell reselection priority value is higher than the current NR frequency, according to the 3GPP standard specification "38.133: NR; Requirements for Support of Radio Resource Management". For example, a measurement cycle may be per n*DRX cycle (n=1 for FR1, n=1.5 for FR2).

When highPriorityMeasRelax is set (e.g., highPriorityMeas is signaled or is set to TRUE), in operation 1h-90, the UE may not perform measurement on each NR inter-frequency or each inter-RAT frequency whose cell reselection priority value is higher than the current NR frequency. Alternatively, when highPriorityMeasRelax is set, in operation 1h-90, in a case where configuration information related to a low-mobility criterion and configuration information related to a not-at-cell-edge condition are all broadcast through SIB2, when the low-mobility criterion and the not-at-cell-edge condition are all satisfied, the UE may not perform measurement on each NR inter-frequency or each inter-RAT frequency whose cell reselection priority value is higher than the current NR frequency. Alternatively, when highPriorityMeasRelax is set, in operation 1h-90, in a case where only the low-mobility criterion is broadcast through SIB2, when the low-mobility criterion is satisfied, the UE may not perform measurement on each NR inter-frequency or each inter-RAT frequency whose cell reselection priority value is higher than the current NR frequency. Alternatively, in operation 1h-90, when the low-mobility criterion is not satisfied or only the not-at-cell-edge condition is satisfied, the UE may perform measurement on each NR inter-frequency or each inter-RAT frequency whose cell reselection priority value is higher than the current NR frequency, according to the 3GPP standard TS 38.133. Alternatively, in operation 1h-90, the UE may perform measurement on each of NR inter-frequency(ies) or each of inter-RAT frequency(ies) whose cell reselection priority values are each higher than the current NR frequency, according to the 3GPP standard specification "38.133: NR, Requirements for Support of Radio Resource Management". Here, the UE may perform measurement with a cycle value equal to a cycle of measurement performed in operation 1h-85 or with a cycle value greater than the cycle of measurement performed in operation 1h-85. For example, the BS may signal, through the system information, frequency values (n1>n or n1>=n) for respective frequency range (FR). Based on a signaled value, the cycle of measurement by the UE may be determined as per n1*DRX cycle. Alternatively, the n1 value may be previously hard-coded into the UE.

When Condition 1 is not fulfilled in operation 1h-55 or Condition 2 is not fulfilled in operation 1h-65, the UE may determine whether a new relaxed measurement criterion is satisfied (operation 1h-95 in FIG. 8C). The new relaxed measurement criterion may be commonly applied, regardless of priority values of frequencies for each RAT. The new relaxed measurement criterion may indicate at least one of "not-at-cell-edge criterion" or "low-mobility criterion" below.

New Relaxed Measurement Criterion

1) Not-at-Cell-Edge Condition:

When $S_{SearchThresholdP}$ is configured, signal power (Qrxlevmeas) or reception quality (Srxlev) of a serving cell is greater than $S_{SearchThresholdP}$.

When $S_{SearchThresholdQ}$ is configured, signal quality (Qqualmeas) or reception quality (Squal) of a serving cell is greater than $S_{SearchThresholdQ}$.

When $S_{SearchThresholdP}$ and $S_{SearchThresholdQ}$ are all configured, signal power (Qrxlevmeas) or reception quality (Srxlex) of a serving cell is greater than $S_{SearchThresholdP}$, and signal quality (Qqualmeas) or reception quality (Squal) of the serving cell is greater than $S_{SearchThresholdQ}$.

2) Low-Mobility Condition:

When $S_{SearchDeltaP}$ is configured, (Srxlev$_{Ref}$−Srxlev)<$S_{SearchDeltaP}$ is satisfied during $T_{SearchDeltaP}$.

Srxlev=current Srxlev value of the serving cell (dB)

Srxlev$_{Ref}$=reference Srxlev value of the serving cell (dB), set as follows:

After selecting or reselecting a new cell, or

If the relaxed monitoring criterion has not been met for $T_{SearchDeltaP}$

The UE shall set the value of Srxlev$_{Ref}$ to the current Srxlev value of the serving cell Referring to FIG. 8C, when all conditions of the new relaxed measurement criterion are not satisfied or at least one of the conditions is not satisfied (e.g., when the not-at-cell edge condition is fulfilled but the low mobility criterion is not fulfilled, or when the not-at-cell edge condition is not fulfilled but the low mobility criterion is fulfilled), in operation 1h-100, the UE may determine measurement rules for the respective frequencies for the respective RATs as below. For reference, when a parameter for determining whether a particular condition is satisfied is not configured, the UE may not determine whether the condition is satisfied.

In operation 1h-105, the UE performs measurement on a NR intra-frequency. The measurement on the NR intra-frequency may be equal to that in the aforedescribed embodiment of the disclosure.

In operation 1h-110, the UE performs measurement on each NR inter-frequency or each inter-RAT frequency whose cell reselection priority value is higher than the current NR frequency (i.e., a serving frequency), according to the 3GPP standard specification "38.133: NR; Requirements for Support of Radio Resource Management". For example, a measurement cycle may be per n*DRX cycle (n=1 for FR1, n=1.5 for FR2).

In operation 1h-115, the UE performs measurement on each NR inter-frequency or each inter-RAT frequency whose cell reselection priority value is equal to or lower than the current NR frequency (i.e., the serving frequency), according to the 3GPP standard specification "38.133: NR; Requirements for Support of Radio Resource Management". For example, a measurement cycle may be per n*DRX cycle (n=1 for FR1, n=1.5 for FR2).

When all conditions of the new relaxed measurement criterion are satisfied or at least one of the conditions is satisfied (e.g., when the not-at-cell edge condition is fulfilled but the low mobility criterion is not fulfilled, or when the not-at-cell edge condition is not fulfilled but the low mobility criterion is fulfilled), in operation 1h-120, the UE may determine measurement rules for the respective frequencies for the respective RATs as below.

In operation 1h-125, the UE may not perform measurement on NR intra-frequency or the UE may perform measurement with a cycle value equal to a cycle of measurement performed in operation 1h-105 or with a cycle value greater than the cycle of measurement performed in operation 1h-105. The UE may determine whether to perform measurement, based on an indicator included in SIB2. For example, the BS may signal, through the system information, frequency values (k) for respective frequency range (FR). Based on a signaled value, the cycle of measurement by the UE may be determined as per k*DRX cycle. Alternatively, the k value may be previously hard-coded into the UE. The k value may be equal to an m value to be described below.

In operation 1h-130, the UE may not perform measurement on each NR inter-frequency or each inter-RAT frequency whose cell reselection priority value is equal to or lower than the current NR frequency (i.e., the serving frequency). Alternatively, in operation 1h-130, the UE may perform measurement on each NR inter-frequency or each inter-RAT frequency whose cell reselection priority value is equal to or lower than the current NR frequency (i.e., the serving frequency), according to the 3GPP standard specification "38.133: NR; Requirements for Support of Radio Resource Management". Here, the UE may perform measurement with a cycle value equal to a cycle of measurement performed in operation 1h-115 or with a cycle value greater than the cycle of measurement performed in operation 1h-115. The UE may determine whether to perform measurement, based on an indicator included in SIB2. For example, the BS may signal, through the system information, frequency values (m>n or m>=n) for respective frequency range (FR). Based on a signaled value, the cycle of measurement by the UE may be determined as per m*DRX cycle. Alternatively, the m value may be previously hard-coded into the UE.

In operation 1h-135, the UE may determine whether highPriorityMeasRelax is set. When highPriorityMeasRelax is not set (e.g., highPriorityMeas is not signaled or is set to FALSE), in operation 1h-140, the UE may perform measurement on each NR inter-frequency or each inter-RAT frequency whose cell reselection priority value is higher than the current NR frequency, according to the 3GPP standard specification "38.133: NR; Requirements for Support of Radio Resource Management". For example, a measurement cycle may be per n*DRX cycle (n=1 for FR1, n=1.5 for FR2). For example, the UE may perform measurement in a same measurement cycle (e.g., per m*DRX cycle) as operation 1h-130.

When highPriorityMeasRelax is set (e.g., highPriorityMeas is signaled or is set to TRUE), in operation 1h-145, the UE may not perform measurement on each NR inter-frequency or each inter-RAT frequency whose cell reselection priority value is higher than the current NR frequency. Alternatively, in operation 1h-145, the UE may perform measurement on each NR inter-frequency or each inter-RAT frequency whose cell reselection priority value is higher than the current NR frequency, according to the 3GPP standard specification "38.133: NR; Requirements for Support of Radio Resource Management". Here, the UE may perform measurement with a cycle value equal to a cycle of measurement performed in operation 1h-140 or with a cycle value greater than the cycle of measurement performed in operation 1h-140. The UE may determine whether to perform measurement, based on an indicator included in SIB2. For example, the BS may signal, through the system information, frequency values (m1>m or m1>=m) for respective frequency range (FR). Based on a signaled value, the cycle of measurement by the UE may be determined as per m1*DRX cycle. Alternatively, the m1 value may be previously hard-coded into the UE.

Figure 9:
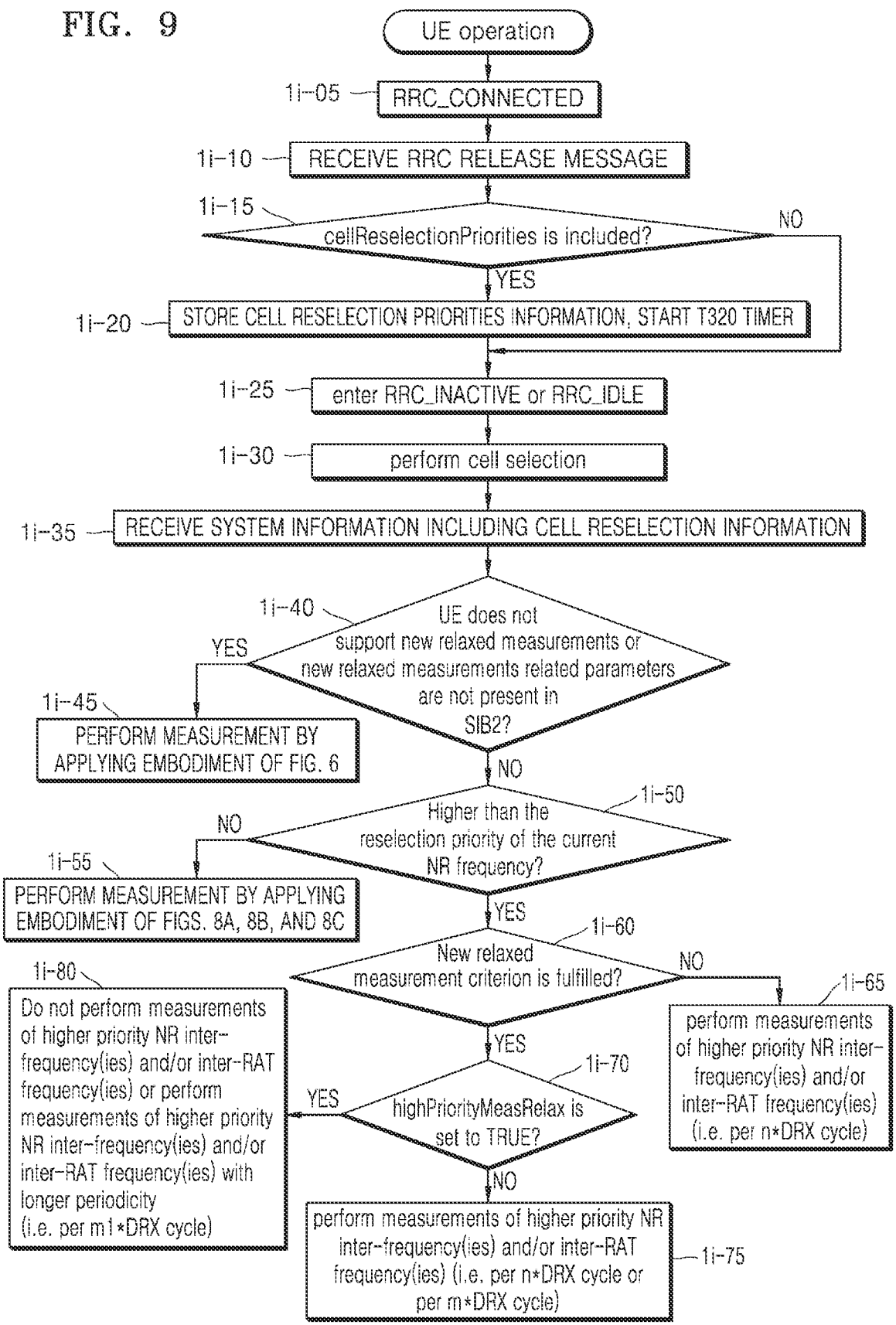
FIG. 9 is a diagram for describing operations of a UE in an RRC_IDLE mode or an RRC_INACTIVE mode, the UE measuring a neighboring cell with respect to each NR inter-frequency or each inter-RAT frequency whose cell reselection priority value is higher than a current NR frequency, by applying new relaxed measurement so as to perform a cell reselection evaluation procedure according to an embodiment of the disclosure.

FIG. 9 is a diagram for describing operations of a UE in an RRC_IDLE mode or an RRC_INACTIVE mode, the UE measuring a neighboring cell with respect to each NR inter-frequency or each inter-RAT frequency whose cell reselection priority value is higher than a current NR frequency, by applying new relaxed measurement so as to perform a cell reselection evaluation procedure according to an embodiment of the disclosure.

Referring to FIG. 9, the UE may be in an RRC_CONNECTED mode (operation 1*i*-05).

In operation 1*i*-10, the UE may receive an RRC release message (RRCRelease) from a BS.

In operation 1*i*-15, the UE may determine whether cellReselectionPriorities are included in the RRC release message. Information included in the cellReselectionPriorities provided in the RRC release message may be determined according to the aforedescribed embodiment of the disclosure. When the RRC release message includes the cellReselectionPriorities, the UE may perform operation 1*i*-20, and when the RRC release message does not include the cellReselectionPriorities, the UE may not perform operation 1*i*-20.

In operation 1*i*-20, the UE may store the cell reselection priorities information provided in the cellReselectionPriorities included in the RRC release message. When the RRC release message includes t320 value, the UE may set a timer value as the t320 value and then may start T320 timer.

In operation 1*i*-25, the UE may transition to an RRC_IDLE mode or an RRC_INACTIVE mode. Whether the UE is to transition to the RRC_IDLE mode or the RRC_INACTIVE mode may be determined according to the aforedescribed embodiment of the disclosure.

In operation 1*i*-30, the UE that transitioned to the RRC_IDLE mode or the RRC_INACTIVE mode may camp-on a suitable cell by performing a cell selection procedure. The cell selection procedure may be determined according to the aforedescribed embodiment of the disclosure.

In operation 1*i*-35, the UE may receive system information including cell reselection information. For example, the UE may receive, from the system information, cell reselection priority values associated with frequencies for each RAT, parameters associated with relaxed measurement, and parameters associated with new relaxed measurement.

In operation 1*i*-40, the UE may determine whether to measure neighboring cells by applying the new relaxed measurement thereto according to a preset condition by applying the cell reselection priority values associated with frequencies for each RAT, the parameters associated with relaxed measurement, and the parameters associated with new relaxed measurements. When the cellReselectionPriorities are included in the RRC release message received in operation 1*i*-10 and T320 timer is running, the UE may apply the new relaxed measurement, based on cell reselection priority values included in the cellReselectionPriorities provided in the RRC release message. When the cellReselectionPriorities are not included in the RRC release message received in operation 1*i*-10 or T320 timer is expired, the UE may apply the new relaxed measurement, based on the cell reselection priority values provided in the system information received in operation 1*i*-35. Alternatively, in a case where T320 timer is running while the UE is in the RRC_IDLE mode, when inter-RAT cell reselection (NR cell→E-UTRA cell) occurs, the UE may inherit the cellReselectionPriorities included in the RRC release message received in operation 1*i*-10, may inherit a remaining value of T320 timer, and may perform operations after operation 1*i*-40 (NR intra-frequency may be replaced with E-UTRAN intra-frequency, NR inter-frequency may be replaced with E-UTRAN inter-frequency, and inter-RAT frequency may be replaced with NR frequency). When inter-RAT cell reselection (E-UTRA cell→NR cell) occurs, the UE may inherit the cellReselectionPriorities, may inherit a remaining value of T320 timer, and may perform operations after operation 1*i*-40.

In operation 1*i*-40, when the UE does not support new relaxed measurements or parameters associated with the new relaxed measurements are not signaled through SIB2, the UE may perform measurement, based on the embodiment (described with reference to FIG. 6) of the disclosure (operation 1*i*-45).

In operation 1*i*-40, when the UE supports the new relaxed measurements and the parameters associated with the new relaxed measurements are signaled through SIB2, the UE may proceed to operation 1*i*-50 and may determine whether a NR inter-frequency or an inter-RAT frequency whose cell reselection priority value is higher than the current NR frequency is present.

In operation 1*i*-55, the UE may perform measurement on a NR intra-frequency or may perform measurement on each NR inter-frequency or each inter-RAT frequency whose cell reselection priority value is equal to or lower than the current NR frequency, based on the embodiment (described with reference to FIGS. 8A, 8B and 8C) of the disclosure.

In operation 1*i*-60, in order to apply measurement rules for the NR inter-frequency or the inter-RAT frequency whose cell reselection priority value is higher than the current NR frequency, the UE may determine whether a new relaxed measurement criterion described with reference to FIGS. 8A, 8B and 8C is satisfied. Whether the new relaxed measurement criterion described with reference to FIGS. 8A, 8B and 8C is satisfied may be determined according to the aforedescribed embodiment of the disclosure. The UE according to an embodiment of the disclosure may not determine whether the NR inter-frequency or the inter-RAT frequency whose cell reselection priority value is higher than the current NR frequency satisfies a condition below.

A reception level (Srxlev) of a serving cell is greater than $S_{nonIntraSearchP}$, and a reception quality (Squal) of the serving cell is greater than $S_{nonIntraSearchQ}$.

When the new relaxed measurement criterion described with reference to FIGS. 8A, 8B and 8C is not satisfied, in operation 1*i*-65, the UE performs measurement on the NR inter-frequency or the inter-RAT frequency whose cell reselection priority value is higher than the current NR frequency, according to 3GPP standard specification "38.133: NR; Requirements for Support of Radio Resource Management". For example, a measurement cycle may be per n*DRX cycle (n=1 for FR1, n=1.5 for FR2).

When the new relaxed measurement criterion described with reference to FIGS. 8A, 8B and 8C is satisfied, in operation 1*i*-70, the UE may determine whether highPriorityMeasRelax is set.

When highPriorityMeasRelax is not set (e.g., highPriorityMeas is not signaled or is set to FALSE), in operation 1*i*-75, the UE may perform measurement on each NR inter-frequency(ies) or each inter-RAT frequency(ies) whose cell reselection priority value is higher than the current NR frequency, according to the 3GPP standard specification "38.133: NR; Requirements for Support of Radio Resource Management". For example, a measurement cycle may be per n*DRX cycle (n=1 for FR1, n=1.5 for FR2). Alternatively, the UE may perform measurement with a measurement cycle (e.g., per m*DRX cycle) applied to the NR intra-frequency or to a NR inter-frequency or an inter-RAT frequency whose cell reselection priority value is equal to or lower than the current NR frequency.

When highPriorityMeasRelax is set (e.g., highPriorityMeas is signaled or is set to TRUE), in operation 1$i$-80, the UE may not perform measurement on each NR inter-frequency or each inter-RAT frequency whose cell reselection priority value is higher than the current NR frequency. Alternatively, in operation 1$i$-90, the UE may perform measurement on each NR inter-frequency or each inter-RAT frequency whose cell reselection priority value is higher than the current NR frequency, according to the 3GPP standard specification "38.133: NR; Requirements for Support of Radio Resource Management". Here, the UE may perform measurement with a cycle value equal to a cycle of measurement performed in operation 1$i$-85 or with a cycle value greater than the cycle of measurement performed in operation 1$i$-75. For example, the BS may signal, through the system information, frequency values (m1>n) for respective frequency range (FR). Based on a signaled value, the cycle of measurement by the UE may be determined as per m1*DRX cycle. Alternatively, the m1 value may be previously hard-coded into the UE.

Figure 10:
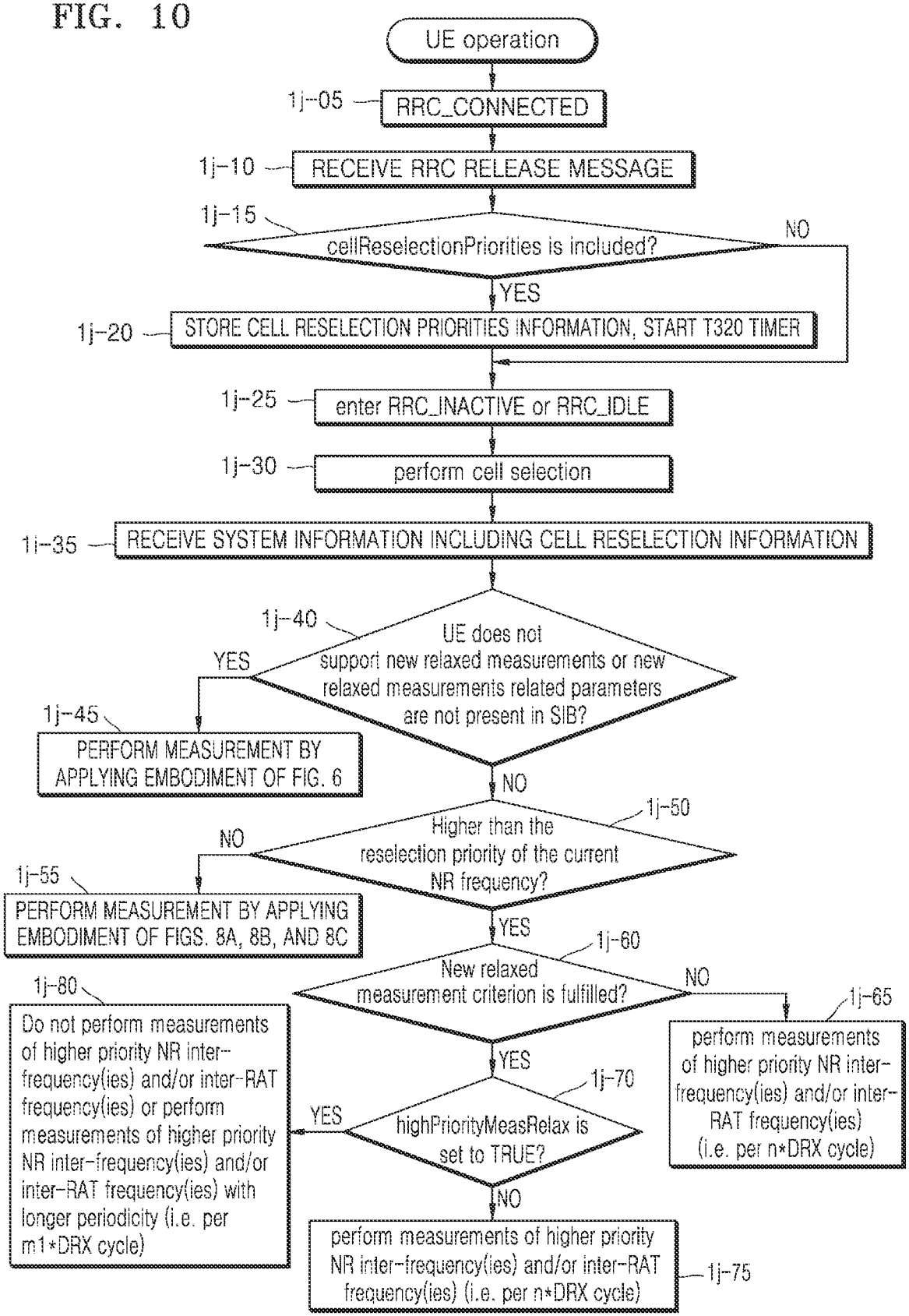
FIG. 10 is a diagram for describing operations of a UE in an RRC_IDLE mode or an RRC_INACTIVE mode, the UE measuring a neighboring cell with respect to each NR inter-frequency or each inter-RAT frequency whose cell reselection priority value is higher than a current NR frequency, by applying new relaxed measurement so as to perform a cell reselection evaluation procedure according to an embodiment of the disclosure.

FIG. 10 is a diagram for describing operations of a UE in an RRC_IDLE mode or an RRC_INACTIVE mode, the UE measuring a neighboring cell with respect to each NR inter-frequency or each inter-RAT frequency whose cell reselection priority value is higher than a current NR frequency, by applying new relaxed measurement so as to perform a cell reselection evaluation procedure according to an embodiment of the disclosure.

Referring to FIG. 10, the UE may be in an RRC_CONNECTED mode (operation 1$j$-05).

In operation 1$j$-10, the UE may receive an RRC release message (RRCRelease) from a BS.

In operation 1$j$-15, the UE may determine whether cellReselectionPriorities are included in the RRC release message. Information included in the cellReselectionPriorities provided in the RRC release message may be determined according to the aforedescribed embodiment of the disclosure. When the RRC release message includes the cellReselectionPriorities, the UE may perform operation 1$j$-20, and when the RRC release message does not include the cellReselectionPriorities, the UE may not perform operation 1$j$-20.

In operation 1$j$-20, the UE may store the cell reselection priorities information provided in the cellReselectionPriorities included in the RRC release message. When the RRC release message includes t320 value, the UE may set a timer value as the t320 value and then may start T320 timer.

In operation 1$j$-25, the UE may transition to an RRC_IDLE mode or an RRC_INACTIVE mode. Whether the UE is to transition to the RRC_IDLE mode or the RRC_INACTIVE mode may be determined according to the aforedescribed embodiment of the disclosure.

In operation 1$j$-30, the UE that transitioned to the RRC_IDLE mode or the RRC_INACTIVE mode may camp-on a suitable cell by performing a cell selection procedure. The cell selection procedure may be determined according to the aforedescribed embodiment of the disclosure.

In operation 1$j$-35, the UE may receive system information including cell reselection information. For example, the UE may receive, from the system information, cell reselection priority values associated with frequencies for each RAT, parameters associated with relaxed measurements, and parameters associated with new relaxed measurements. The parameters associated with new relaxed measurements according to an embodiment of the disclosure may include Qrxlevmeas or Srxlev threshold value (s-SearchThresholdP_h) or Qqualmeas or Squal threshold value (s-SearchThresholdQ_h), which is applied only to each NR inter-frequency or each inter-RAT frequency whose cell reselection priority value is higher than a current serving frequency. For example, s-SearchThresholdP_h and s-SearchThresholdQ_h may indicate parameters that are different respectively from s-SearchThresholdP and s-SearchThresholdQ in the aforedescribed embodiment of the disclosure.

In operation 1$j$-40, the UE may determine whether to measure neighboring cells by applying the new relaxed measurement thereto according to a preset condition by applying the cell reselection priority values associated with frequencies for each RAT, the parameters associated with relaxed measurement, and the parameters associated with new relaxed measurements. When the cellReselectionPriorities are included in the RRC release message received in operation 1$j$-10 and T320 timer is running, the UE may apply the new relaxed measurement, based on cell reselection priority values included in the cellReselectionPriorities provided in the RRC release message. When the cellReselectionPriorities are not included in the RRC release message received in operation 1$j$-10 or T320 timer is expired, the UE may apply the new relaxed measurement, based on the cell reselection priority values provided in the system information received in operation 1$j$-35. Alternatively, in a case where T320 timer is running while the UE is in the RRC_IDLE mode, when inter-RAT cell reselection (NR cell→E-UTRA cell) occurs, the UE may inherit the cellReselectionPriorities included in the RRC release message received in operation 1$j$-10, may inherit a remaining value of T320 timer, and may perform operations after operation 1$j$-40 (NR intra-frequency may be replaced with E-UTRAN intra-frequency, NR inter-frequency may be replaced with E-UTRAN inter-frequency, and inter-RAT frequency may be replaced with NR frequency). When inter-RAT cell reselection (E-UTRA cell→NR cell) occurs, the UE may inherit the cellReselectionPriorities, may inherit a remaining value of T320 timer, and may perform operations after operation 1$j$-40.

In operation 1$j$-40, when the UE does not support new relaxed measurements or parameters associated with the new relaxed measurements are not signaled through the system information, the UE may perform measurement, based on the embodiment (described with reference to FIG. 6) of the disclosure (operation 1$j$-45).

In operation 1$j$-40, when the UE supports the new relaxed measurements and the parameters associated with the new relaxed measurements are signaled through the system information, in operation 1$j$-50, the UE may determine whether a NR inter-frequency or an inter-RAT frequency whose cell reselection priority value is higher than the current NR frequency is present.

In operation 1$j$-55, the UE may perform measurement on a NR intra-frequency or may perform measurement on each NR inter-frequency or each inter-RAT frequency whose cell reselection priority value is equal to or lower than the current NR frequency, based on the embodiment (described with reference to FIGS. 8A, 8B, and 8C) of the disclosure.

In operation 1$j$-60, in order to apply measurement rules for NR inter-frequency(ies) or inter-RAT frequency(ies)

whose cell reselection priority value is higher than the current NR frequency, the UE may determine whether a new relaxed measurement criterion described is satisfied. The new relaxed measurement criterion may indicate at least one of "not-at-cell-edge criterion" or "low-mobility criterion" below. Unlike the aforedescribed embodiment, in an embodiment of the disclosure, the UE may determine whether the not-at-cell-edge criterion is fulfilled, by applying a new threshold value to a NR inter-frequency or inter-RAT frequency whose cell reselection priority value is higher than the current NR frequency.

New Relaxed Measurement Criterion

1) Not-at-Cell-Edge Condition:
   When $S_{SearchThresholdP\_h}$ is configured, signal power (Qrxlevmeas) or reception quality (Srxlev) of a serving cell is greater than $S_{SearchThresholdP\_h}$.
   When $S_{SearchThresholdQ\_h}$ is configured, signal quality (Qqualmeas) or reception quality (Squal) of a serving cell is greater than $S_{SearchThresholdQ\_h}$.
   When $S_{SearchThresholdP\_h}$ and $S_{SearchThresholdQ\_h}$ are all configured, signal power (Qrxlevmeas) or reception quality (Srxlex) of a serving cell is greater than $S_{SearchThresholdP\_h}$, and signal quality (Qqualmeas) or reception quality (Squal) of the serving cell is greater than $S_{SearchThresholdQ\_h}$.

2) Low-Mobility Condition:
   When $S_{SearchDeltaP}$ is configured, (Srxlev$_{Ref}$−Srxlev)<$S_{SearchDeltaP}$ is satisfied during $T_{SearchDeltaP}$.
   Srxlev=current Srxlev value of the serving cell (dB)
   Srxlev$_{Ref}$=reference Srxlev value of the serving cell (dB), set as follows:
   After selecting or reselecting a new cell, or
   If the relaxed monitoring criterion has not been met for $T_{SearchDeltaP}$
   The UE shall set the value of Srxlev$_{Ref}$ to the current Srxlev value of the serving cell When all conditions of the new relaxed measurement criterion are not satisfied or at least one of the conditions is not satisfied (e.g., when the not-at-cell edge condition is fulfilled but the low mobility criterion is not fulfilled, or when the not-at-cell edge condition is not fulfilled but the low mobility criterion is fulfilled), in operation 1j-65, the UE performs measurement on each NR inter-frequency or each inter-RAT frequency whose cell reselection priority value is higher than the current NR frequency, according to the 3GPP standard specification "38.133: NR; Requirements for Support of Radio Resource Management". The UE may determine whether to perform measurement, based on an indicator included in SIB2. For example, a cycle of measurement may be per n*DRX cycle (n=1 for FR1, n=1.5 for FR2).

When all conditions of the new relaxed measurement criterion are satisfied or at least one of the conditions is satisfied (e.g., when the not-at-cell edge condition is fulfilled but the low mobility criterion is not fulfilled, or when the not-at-cell edge condition is not fulfilled but the low mobility criterion is fulfilled), in operation 1j-70, the UE may determine whether highPriorityMeasRelax is set.

When highPriorityMeasRelax is not set (e.g., highPriorityMeas is not signaled or is set to FALSE), in operation 1j-75, the UE may perform measurement on each NR inter-frequency(ies) or each inter-RAT frequency(ies) whose cell reselection priority value is higher than the current NR frequency, according to the 3GPP standard specification "38.133: NR; Requirements for Support of Radio Resource Management". For example, a measurement cycle may be per n*DRX cycle (n=1 for FR1, n=1.5 for FR2). Alternatively, the UE may perform measurement with a measurement cycle (e.g., per m*DRX cycle) applied to the NR intra-frequency or to a NR inter-frequency or an inter-RAT frequency whose cell reselection priority value is equal to or lower than the current NR frequency.

When highPriorityMeasRelax is set (e.g., highPriorityMeas is signaled or is set to TRUE), in operation 1j-80, the UE may not perform measurement on each NR inter-frequency or each inter-RAT frequency whose cell reselection priority value is higher than the current NR frequency. Alternatively, in operation 1j-80, the UE may perform measurement on each NR inter-frequency or each inter-RAT frequency whose cell reselection priority value is higher than the current NR frequency, according to the 3GPP standard specification "38.133: NR; Requirements for Support of Radio Resource Management". Here, the UE may perform measurement with a cycle value equal to a cycle of measurement performed in operation 1j-75 or with a cycle value greater than the cycle of measurement performed in operation 1j-75. The UE may determine whether to perform measurement, based on an indicator included in SIB2. For example, the BS may signal, through the system information, frequency values (m1>n or m1>=n) for respective frequency range (FR). Based on a signaled value, the cycle of measurement by the UE may be determined as per m1*DRX cycle. Alternatively, the m1 value may be previously hard-coded into the UE.

When highPriorityMeasRelax is configured in the system information received in operation 1j-35 but $S_{SearchThresholdP\_h}$ and/or $S_{SearchThresholdQ\_h}$ is not configured, the UE may apply $S_{SearchThresholdP}$ and/or $S_{SearchThresholdQ}$ to the not-at-cell edge condition. For example, the UE may perform operation 1j-60, based on $S_{SearchThresholdP}$ and/or $S_{SearchThresholdQ}$.

Figure 11:
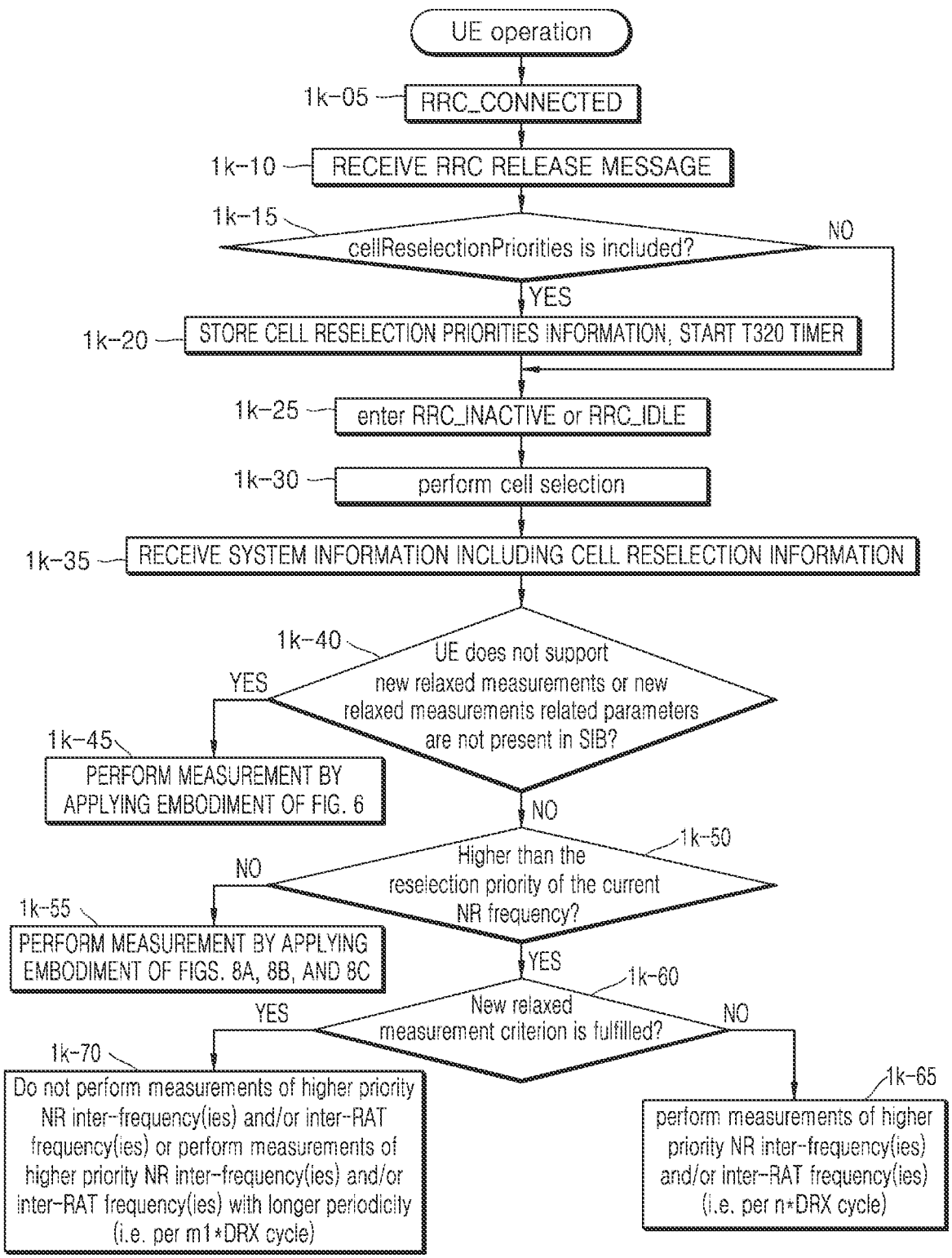
FIG. 11 is a diagram for describing operations of a UE in an RRC_IDLE mode or an RRC_INACTIVE mode, the UE measuring a neighboring cell with respect to each NR inter-frequency or each inter-RAT frequency whose cell reselection priority value is higher than a current NR frequency, by applying new relaxed measurement so as to perform a cell reselection evolution procedure according to an embodiment of the disclosure.

FIG. 11 is a diagram for describing operations of a UE in an RRC_IDLE mode or an RRC_INACTIVE mode, the UE measuring a neighboring cell with respect to each NR inter-frequency or each inter-RAT frequency whose cell reselection priority value is higher than a current NR frequency, by applying new relaxed measurement so as to perform a cell reselection evolution procedure according to an embodiment of the disclosure.

Referring to FIG. 11, the UE may be in an RRC_CONNECTED mode (operation 1k-05).

In operation 1k-10, the UE may receive an RRC release message (RRCRelease) from a BS.

In operation 1k-15, the UE may determine whether cellReselectionPriorities are included in the RRC release message. Information included in the cellReselectionPriorities provided in the RRC release message may be determined according to the aforedescribed embodiment of the disclosure. When the RRC release message includes the cellReselectionPriorities, the UE may perform operation 1k-20, and when the RRC release message does not include the cellReselectionPriorities, the UE may not perform operation 1k-20.

In operation 1k-20, the UE may store the cell reselection priorities information provided in the cellReselectionPriorities included in the RRC release message. When the RRC release message includes t320 value, the UE may set a timer value as the t320 value and then may start T320 timer.

In operation 1k-25, the UE may transition to an RRC_IDLE mode or an RRC_INACTIVE mode. Whether the UE is to transition to the RRC_IDLE mode or the RRC_INACTIVE mode may be determined according to the aforedescribed embodiment of the disclosure.

In operation 1k-30, the UE that transitioned to the RRC_IDLE mode or the RRC_INACTIVE mode may camp-on a suitable cell by performing a cell selection procedure. The cell selection procedure may be determined according to the aforedescribed embodiment of the disclosure.

In operation 1k-35, the UE may receive system information including cell reselection information. For example, the UE may receive, from the system information, cell reselection priority values associated with frequencies for each RAT, parameters associated with relaxed measurement, and parameters associated with new relaxed measurements. The parameters associated with new relaxed measurements according to an embodiment of the disclosure may include Qrxlevmeas or Srxlev threshold value (s-SearchThresholdP_h) or Qqualmeas or Squal threshold value (s-SearchThresholdQ_h), which is applied only to each NR inter-frequency or each inter-RAT frequency whose cell reselection priority value is higher than a current serving frequency. For example, s-SearchThresholdP_h and s-SearchThresholdQ_h may indicate parameters that are different respectively from s-SearchThresholdP and s-SearchThresholdQ in the aforedescribed embodiment of the disclosure. The parameters associated with new relaxed measurements according to an embodiment of the disclosure may not include a highPriorityMeasRelax indicator.

In operation 1k-40, the UE may determine whether to measure neighboring cells by applying the new relaxed measurement thereto according to a preset condition by applying the cell reselection priority values associated with frequencies for each RAT, the parameters associated with relaxed measurement, and the parameters associated with new relaxed measurements. When the cellReselectionPriorities are included in the RRC release message received in operation 1k-10 and T320 timer is running, the UE may apply the new relaxed measurement, based on cell reselection priority values included in the cellReselectionPriorities provided in the RRC release message. When the cellReselectionPriorities are not included in the RRC release message received in operation 1k-10 or T320 timer is expired, the UE may apply the new relaxed measurement, based on the cell reselection priority values provided in the system information received in operation 1k-35. Alternatively, in a case where T320 timer is running while the UE is in the RRC_IDLE mode, when inter-RAT cell reselection (NR cell→E-UTRA cell) occurs, the UE may inherit the cellReselectionPriorities included in the RRC release message received in operation 1k-10, may inherit a remaining value of T320 timer, and may perform operations after operation 1k-40 (NR intra-frequency may be replaced with E-UTRAN intra-frequency, NR inter-frequency may be replaced with E-UTRAN inter-frequency, and inter-RAT frequency may be replaced with NR frequency). When inter-RAT cell reselection (E-UTRA cell→NR cell) occurs, the UE may inherit the cellReselectionPriorities, may inherit a remaining value of T320 timer, and may perform operations after operation 1k-40.

In operation 1k-40, when the UE does not support new relaxed measurements or parameters associated with the new relaxed measurements are not signaled through the system information, the UE may perform measurement, based on the embodiment (described with reference to FIG. 6) of the disclosure (operation 1k-45).

In operation 1k-40, when the UE supports the new relaxed measurements and the parameters associated with the new relaxed measurements are signaled through the system information, in operation 1k-50, the UE may determine whether a NR inter-frequency or an inter-RAT frequency whose cell reselection priority value is higher than the current NR frequency is present.

In operation 1k-55, the UE may perform measurement on a NR intra-frequency or may perform measurement on each NR inter-frequency or each inter-RAT frequency whose cell reselection priority value is equal to or lower than the current NR frequency, based on the embodiment (described with reference to FIGS. 8A, 8B, and 8C) of the disclosure.

In operation 1k-60, in order to apply measurement rules for NR inter-frequency(ies) or inter-RAT frequency(ies) whose cell reselection priority value is higher than the current NR frequency, the UE may determine whether a new relaxed measurement criterion described with reference to FIGS. 8A, 8B, and 8C is satisfied. The new relaxed measurement criterion may indicate at least one of "not-at-cell-edge criterion" or "low-mobility criterion" below.

<New Relaxed Measurement Criterion>
1) Not-at-Cell-Edge Condition:
   When $S_{SearchThresholdP\_h}$ is configured, signal power (Qrxlevmeas) or reception quality (Srxlev) of a serving cell is greater than $S_{SearchThresholdP\_h}$.
   When $S_{SearchThresholdQ\_h}$ is configured, signal quality (Qqualmeas) or reception quality (Squal) of a serving cell is greater than $S_{SearchThresholdQ\_h}$.
   When $S_{SearchThresholdP\_h}$ and $S_{SearchThresholdQ\_h}$ are all configured, signal power (Qrxlevmeas) or reception quality (Srxlex) of a serving cell is greater than $S_{SearchThresholdP\_h}$, and signal quality (Qqualmeas) or reception quality (Squal) of the serving cell is greater than $S_{SearchThresholdQ\_h}$.
2) Low-Mobility Condition:
   When $S_{SearchDeltaP}$ is configured, $(Srxlev_{Ref} - Srxlev) < S_{SearchDeltaP}$ is satisfied during $T_{SearchDeltaP}$.
   Srxlev=current Srxlev value of the serving cell (dB)
   $Srxlev_{Ref}$=reference Srxlev value of the serving cell (dB), set as follows:
   After selecting or reselecting a new cell, or
   If the relaxed monitoring criterion has not been met for $T_{SearchDeltaP}$
   The UE shall set the value of $Srxlev_{Ref}$ to the current Srxlev value of the serving cell When all conditions of the new relaxed measurement criterion are not satisfied or at least one of the conditions is not satisfied (e.g., when the not-at-cell edge condition is fulfilled but the low mobility criterion is not fulfilled, or when the not-at-cell edge condition is not fulfilled but the low mobility criterion is fulfilled), in operation 1k-65, the UE performs measurement on each NR inter-frequency or each inter-RAT frequency whose cell reselection priority value is higher than the current NR frequency, according to the 3GPP standard specification "38.133: NR; Requirements for Support of Radio Resource Management". The UE may determine whether to perform measurement, based on an indicator included in SIB2. For example, a cycle of measurement may be per n*DRX cycle (n=1 for FR1, n=1.5 for FR2).

When all conditions of the new relaxed measurement criterion are satisfied or at least one of the conditions is satisfied (e.g., when the not-at-cell edge condition is fulfilled but the low mobility criterion is not fulfilled, or when the not-at-cell edge condition is not fulfilled but the low mobility criterion is fulfilled), in operation 1k-70, the UE may not perform measurement on each NR inter-frequency or each inter-RAT frequency whose cell reselection priority value is higher than the current NR frequency. Alternatively, in operation 1k-70, the UE may perform measurement on each NR inter-frequency or each inter-RAT frequency whose cell reselection priority value is higher than the current NR frequency, according to the 3GPP standard specification "38.133: NR; Requirements for Support of Radio Resource Management". Here, the UE may perform measurement with a cycle value equal to a cycle of measurement performed in operation 1*k*-65 or with a cycle value greater than the cycle of measurement performed in operation 1*k*-65. The UE may determine whether to perform measurement, based on an indicator included in SIB2. For example, the BS may signal, through the system information, frequency values (m1>n or m1>=n) for respective frequency range (FR). Based on a signaled value, the cycle of measurement by the UE may be determined as per m1*DRX cycle. Alternatively, the m1 value may be previously hard-coded into the UE.

Figure 12:
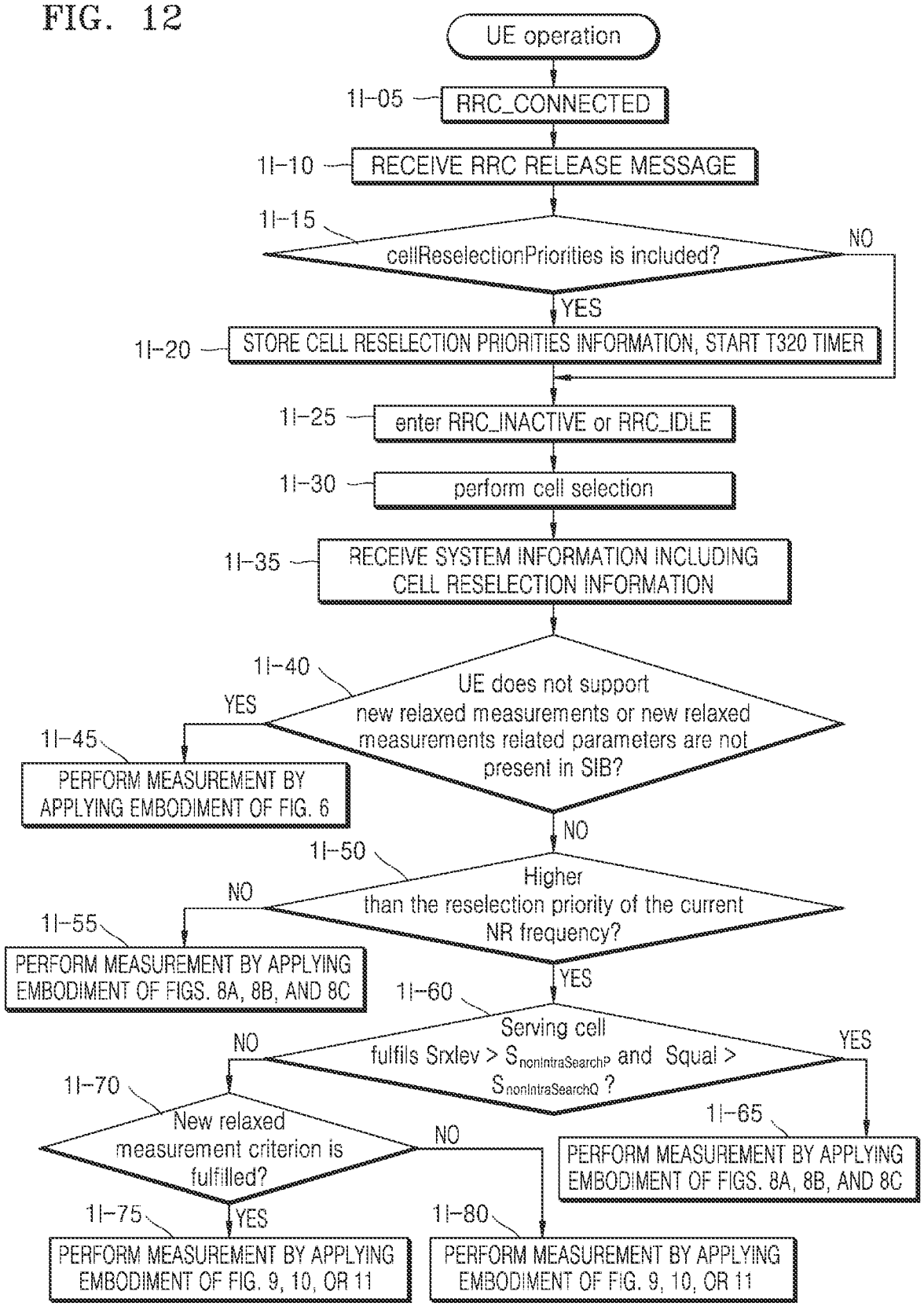
FIG. 12 is a diagram for describing operations of a UE in an RRC_IDLE mode or an RRC_INACTIVE mode, the UE measuring a neighboring cell with respect to each NR inter-frequency or each inter-RAT frequency whose cell reselection priority value is higher than a current NR frequency, by applying new relaxed measurement so as to perform a cell reselection evaluation procedure according to an embodiment of the disclosure.

FIG. 12 is a diagram for describing operations of a UE in an RRC_IDLE mode or an RRC_INACTIVE mode, the UE measuring a neighboring cell with respect to each NR inter-frequency or each inter-RAT frequency whose cell reselection priority value is higher than a current NR frequency, by applying new relaxed measurement so as to perform a cell reselection evaluation procedure according to an embodiment of the disclosure.

Referring to FIG. 12, the UE may be in an RRC_CONNECTED mode (operation 1*l*-05).

In operation 1*l*-10, the UE may receive an RRC release message (RRCRelease) from a BS.

In operation 1*l*-15, the UE may determine whether cellReselectionPriorities are included in the RRC release message. Information included in the cellReselectionPriorities provided in the RRC release message may be determined according to the aforedescribed embodiment of the disclosure. When the RRC release message includes the cellReselectionPriorities, the UE may perform operation 1*l*-20, and when the RRC release message does not include the cellReselectionPriorities, the UE may not perform operation 1*l*-20.

In operation 1*l*-20, the UE may store the cell reselection priorities information provided in the cellReselectionPriorities included in the RRC release message. When the RRC release message includes t320 value, the UE may set a timer value as the t320 value and then may start T320 timer.

In operation 1*l*-25, the UE may transition to an RRC_IDLE mode or an RRC_INACTIVE mode. Whether the UE is to transition to the RRC_IDLE mode or the RRC_INACTIVE mode may be determined according to the aforedescribed embodiment of the disclosure.

In operation 1*l*-30, the UE that transitioned to the RRC_IDLE mode or the RRC_INACTIVE mode may camp-on a suitable cell by performing a cell selection procedure. The cell selection procedure may be determined according to the aforedescribed embodiment of the disclosure.

In operation 1*l*-35, the UE may receive system information including cell reselection information. For example, the UE may receive, from the system information, cell reselection priority values associated with frequencies for each RAT, parameters associated with relaxed measurement, and parameters associated with new relaxed measurements. The parameters associated with new relaxed measurements according to an embodiment of the disclosure may include Qrxlevmeas or Srxlev threshold value (s-SearchThresholdP_h) or Qqualmeas or Squal threshold value (s-SearchThresholdQ_h), which is applied to each NR inter-frequency or each inter-RAT frequency whose cell reselection priority value is higher than a current serving frequency. For example, s-SearchThresholdP_h and s-SearchThresholdQ_h may indicate parameters that are different respectively from s-SearchThresholdP and s-SearchThresholdQ in the aforedescribed embodiment of the disclosure.

In operation 1*l*-40, the UE may determine whether to measure neighboring cells by applying the new relaxed measurement thereto according to a preset condition by applying the cell reselection priority values associated with frequencies for each RAT, the parameters associated with relaxed measurement, and the parameters associated with new relaxed measurements. When the cellReselectionPriorities are included in the RRC release message received in operation 1*l*-10 and T320 timer is running, the UE may apply the new relaxed measurement, based on cell reselection priority values included in the cellReselectionPriorities provided in the RRC release message. When the cellReselectionPriorities are not included in the RRC release message received in operation 1*l*-10 or T320 timer is expired, the UE may apply the new relaxed measurement, based on the cell reselection priority values provided in the system information received in operation 1*l*-35. Alternatively, in a case where T320 timer is running while the UE is in the RRC_IDLE mode, when inter-RAT cell reselection (NR cell→E-UTRA cell) occurs, the UE may inherit the cellReselectionPriorities included in the RRC release message received in operation 1*l*-10, may inherit a remaining value of T320 timer, and may perform operations after operation 1*l*-40 (NR intra-frequency may be replaced with E-UTRAN intra-frequency, NR inter-frequency may be replaced with E-UTRAN inter-frequency, and inter-RAT frequency may be replaced with NR frequency). When inter-RAT cell reselection (E-UTRA cell→NR cell) occurs, the UE may inherit the cellReselectionPriorities, may inherit a remaining value of T320 timer, and may perform operations after operation 1*l*-40.

In operation 1*l*-40, when the UE does not support new relaxed measurements or parameters associated with the new relaxed measurements are not signaled through the system information, the UE may perform measurement, based on the embodiment (described with reference to FIG. 6) of the disclosure (operation 1*l*-45).

In operation 1*l*-40, when the UE supports the new relaxed measurements and the parameters associated with the new relaxed measurements are signaled through the system information, in operation 1*l*-50, the UE may determine whether NR inter-frequency(ies) or inter-RAT frequency(ies) whose cell reselection priority value is higher than the current NR frequency is present.

In operation 1*l*-55, the UE may perform measurement on a NR intra-frequency or may perform measurement on each NR inter-frequency or each inter-RAT frequency whose cell reselection priority value is equal to or lower than the current NR frequency, based on the embodiment (described with reference to FIGS. 8A, 8B, and 8C) of the disclosure.

In operation 1*l*-60, the UE may determine whether Condition 1 below is fulfilled so as to apply measurement rules for NR inter-frequency(ies) or inter-RAT frequency(ies) whose cell reselection priority value is higher than the current NR frequency.

Condition 1: A reception level (Srxlev) of a serving cell is greater than $S_{nonIntraSearchP}$, and a reception quality (Squal) of the serving cell is greater than $S_{nonIntraSearchQ}$.

When Condition 1 above is fulfilled, in operation 1*l*-65, the UE may perform measurement based on the embodiment (described with reference to FIGS. 8A, 8B, and 8C) of the disclosure. Alternatively, in operation 1*l*-65, in a case where configuration information related to a low-mobility criterion and configuration information related to a not-at-cell-edge condition are all broadcast through SIB2, when the low-mobility criterion and the not-at-cell-edge condition are all satisfied, the UE may not perform measurement on each NR inter-frequency or each inter-RAT frequency whose cell reselection priority value is higher than the current NR frequency. Alternatively, in operation 1*l*-65, in a case where only the low-mobility criterion is broadcast through SIB2, when the low-mobility criterion is satisfied, the UE may not perform measurement on each NR inter-frequency or each inter-RAT frequency whose cell reselection priority value is higher than the current NR frequency. Alternatively, in operation 1*l*-65, when the low-mobility criterion is not satisfied or only the not-at-cell-edge condition is satisfied, the UE may perform measurement on each NR inter-frequency or each inter-RAT frequency whose cell reselection priority value is higher than the current NR frequency, according to the 3GPP standard TS 38.133.

When Condition 1 above is not fulfilled, in operation 1*l*-70, the UE may determine whether a new relaxed measurement criterion is satisfied. The new relaxed measurement criterion may be based on the aforedescribed embodiment (the new relaxed measurement criterion described with reference to FIG. 9, 1J, or 1K) of the disclosure. When the new relaxed measurement criterion is not satisfied, in operation 1*l*-75, the UE may perform measurement based on the aforedescribed embodiment (the embodiment described with reference to FIG. 9, 1J, or 1K) of the disclosure. For example, the UE may perform at least one of operation 1*i*-65 of FIG. 9, operation 1*j*-65 of FIG. 10, or operation 1*k*-65 of FIG. 11.

When the new relaxed measurement criterion is satisfied, in operation 1*l*-80, the UE may perform measurement based on the aforedescribed embodiment (the embodiment described with reference to FIG. 9, 1J, or 1K) of the disclosure. For example, the UE may perform at least one of operation 1*i*-70 of FIG. 9, operation 1*j*-70 of FIG. 10, or operation 1*k*-70 of FIG. 11. In addition, when the low-mobility criterion and the not-at-cell-edge condition are all satisfied, the UE may not perform measurement on each NR inter-frequency or each inter-RAT frequency whose cell reselection priority value is higher than the current NR frequency. Alternatively, when the low-mobility criterion or the not-at-cell-edge condition is only satisfied, the UE may perform measurement with a measurement cycle longer than a measurement cycle according to the 3GPP standard TS 38.133.

Figure 13:
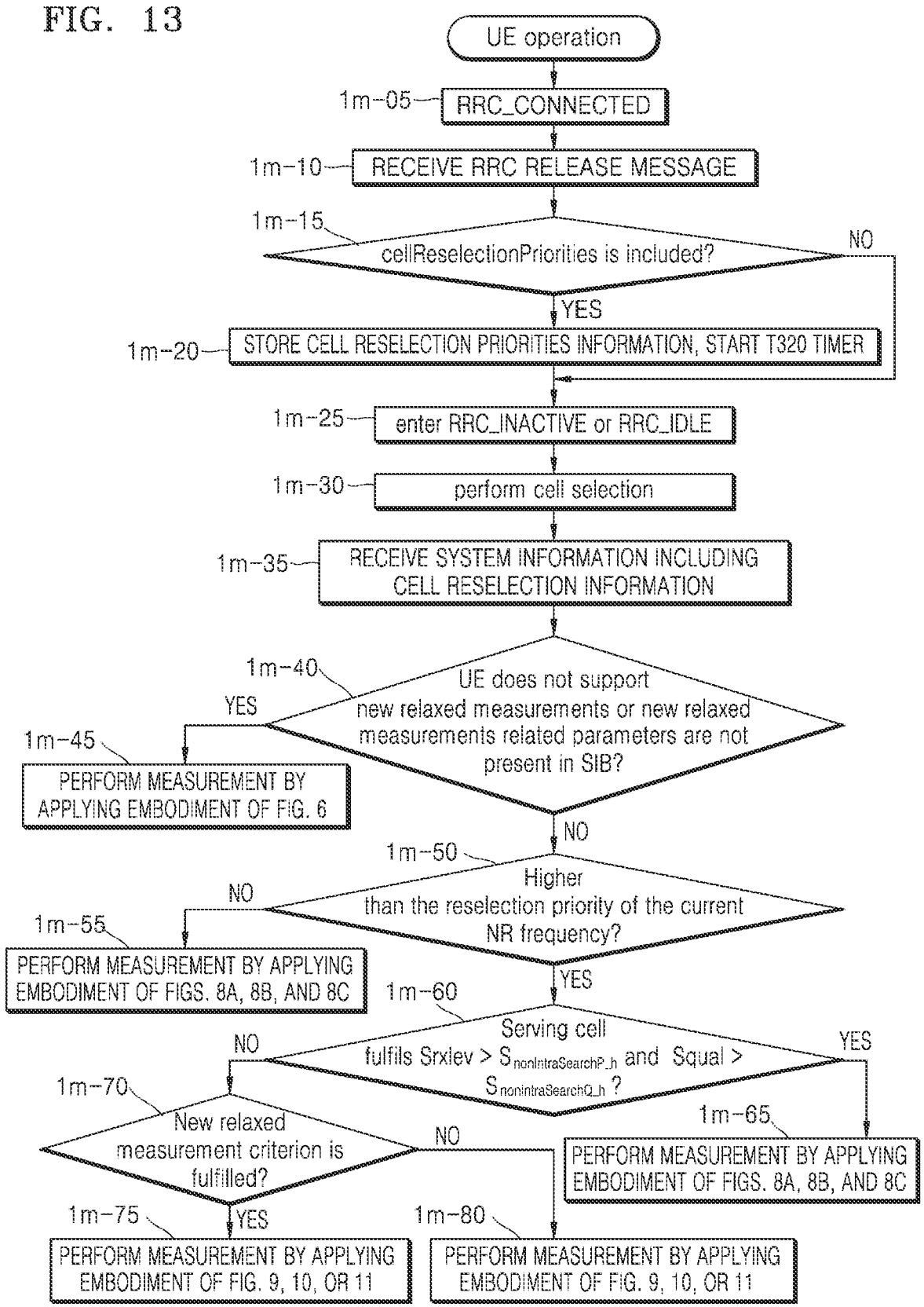
FIG. 13 is a diagram for describing operations of a UE in an RRC_IDLE mode or an RRC_INACTIVE mode, the UE measuring a neighboring cell with respect to each NR inter-frequency or each inter-RAT frequency whose cell reselection priority value is higher than a current NR frequency, by applying new relaxed measurement so as to perform a cell reselection evaluation procedure according to an embodiment of the disclosure.

FIG. 13 is a diagram for describing operations of a UE in an RRC_IDLE mode or an RRC_INACTIVE mode, the UE measuring a neighboring cell with respect to each NR inter-frequency or each inter-RAT frequency whose cell reselection priority value is higher than a current NR frequency, by applying new relaxed measurement so as to perform a cell reselection evaluation procedure according to an embodiment of the disclosure.

Referring to FIG. 13, the UE may be in an RRC_CONNECTED mode (operation 1*m*-05).

In operation 1*m*-10, the UE may receive an RRC release message (RRCRelease) from a BS.

In operation 1*m*-15, the UE may determine whether cellReselectionPriorities are included in the RRC release message. Information included in the cellReselectionPriorities provided in the RRC release message may be determined according to the aforedescribed embodiment of the disclosure. When the RRC release message includes the cellReselectionPriorities, the UE may perform operation 1*m*-20, and when the RRC release message does not include the cellReselectionPriorities, the UE may not perform operation 1*m*-20.

In operation 1*m*-20, the UE may store the cell reselection priorities information provided in the cellReselectionPriorities included in the RRC release message. When the RRC release message includes t320 value, the UE may set a timer value as the t320 value and then may start T320 timer.

In operation 1*m*-25, the UE may transition to an RRC_IDLE mode or an RRC_INACTIVE mode. Whether the UE is to transition to the RRC_IDLE mode or the RRC_INACTIVE mode may be determined according to the aforedescribed embodiment of the disclosure.

In operation 1*m*-30, the UE that transitioned to the RRC_IDLE mode or the RRC_INACTIVE mode may camp-on a suitable cell by performing a cell selection procedure. The cell selection procedure may be determined according to the aforedescribed embodiment of the disclosure.

In operation 1*m*-35, the UE may receive system information including cell reselection information. For example, the UE may receive, from the system information, cell reselection priority values associated with frequencies for each RAT, parameters associated with relaxed measurement, and parameters associated with new relaxed measurements. The parameters associated with new relaxed measurements according to an embodiment of the disclosure may include Qrxlevmeas or Srxlev threshold value (s-SearchThresholdP_h) or Qqualmeas or Squal threshold value (s-SearchThresholdQ_h), which is applied to each NR inter-frequency or each inter-RAT frequency whose cell reselection priority value is higher than a current serving frequency. For example, s-SearchThresholdP_h and s-SearchThresholdQ_h may indicate parameters that are different respectively from s-SearchThresholdP and s-SearchThresholdQ in the aforedescribed embodiment of the disclosure. The parameters associated with new relaxed measurements according to an embodiment of the disclosure may additionally include Srxlev threshold value (s-IntraSearchP_h) and Squal threshold value (s-IntraSearchQ_h) about whether to relax measurement of a NR inter-frequency or measurement of an inter-RAT frequency, which has a cell reselection priority value higher than a current NR frequency (that is, the serving frequency).

In operation 1*m*-40, the UE may determine whether to measure neighboring cells by applying the new relaxed measurement thereto according to a preset condition by applying the cell reselection priority values associated with frequencies for each RAT, the parameters associated with relaxed measurement, and the parameters associated with new relaxed measurements. When the cellReselectionPriorities are included in the RRC release message received in operation 1*m*-10 and T320 timer is running, the UE may apply the new relaxed measurement, based on cell reselection priority values included in the cellReselectionPriorities provided in the RRC release message. When the cellReselectionPriorities are not included in the RRC release message received in operation 1*m*-10 or T320 timer is expired, the UE may apply the new relaxed measurement, based on the cell reselection priority values provided in the system information received in operation 1*m*-35. Alternatively, in a case where T320 timer is running while the UE is in the RRC_IDLE mode, when inter-RAT cell reselection (NR cell→E-UTRA cell) occurs, the UE may inherit the cellReselectionPriorities included in the RRC release message received in operation 1*m*-10, may inherit a remaining value of T320 timer, and may perform operations after operation 1m-40 (NR intra-frequency may be replaced with E-UTRAN intra-frequency, NR inter-frequency may be replaced with E-UTRAN inter-frequency, and inter-RAT frequency may be replaced with NR frequency). When inter-RAT cell reselection (E-UTRA cell→NR cell) occurs, the UE may inherit the cellReselectionPriorities, may inherit a remaining value of T320 timer, and may perform operations after operation 1m-40.

In operation 1m-40, when the UE does not support new relaxed measurements or parameters associated with the new relaxed measurements are not signaled through the system information, the UE may perform measurement, based on the embodiment (described with reference to FIG. 6) of the disclosure (operation 1m-45).

In operation 1m-40, when the UE supports the new relaxed measurements and the parameters associated with the new relaxed measurements are signaled through the system information, in operation 1m-50, the UE may determine whether a NR inter-frequency or an inter-RAT frequency whose cell reselection priority value is higher than the current NR frequency is present.

In operation 1m-55, the UE may perform measurement on a NR intra-frequency or may perform measurement on each NR inter-frequency or each inter-RAT frequency whose cell reselection priority value is equal to or lower than the current NR frequency, based on the embodiment (described with reference to FIGS. 8A, 8B, and 8C) of the disclosure.

In operation 1m-60, the UE may determine whether a condition below is fulfilled so as to apply measurement rules for a NR inter-frequency or an inter-RAT frequency whose cell reselection priority value is higher than the current NR frequency.

A reception level (Srxlev) of a serving cell is greater than $S_{nonIntraSearchP\_h}$, and a reception quality (Squal) of the serving cell is greater than $S_{nonIntraSearchQ\_h}$.

When the condition is fulfilled, in operation 1m-65, the UE may perform measurement based on the embodiment (described with reference to FIGS. 8A, 8B, and 8C) of the disclosure. When the condition is not fulfilled, in operation 1m-70, the UE may determine whether a new relaxed measurement criterion is satisfied. The new relaxed measurement criterion may be based on the aforedescribed embodiment (the new relaxed measurement criterion described with reference to FIG. 9, 1J, or 1K) of the disclosure.

When the new relaxed measurement criterion is not satisfied, in operation 1m-75, the UE may perform measurement based on the aforedescribed embodiment (the embodiment described with reference to FIG. 9, 1J, or 1K) of the disclosure. For example, the UE may perform at least one of operation 1i-65 of FIG. 9, operation 1j-65 of FIG. 10, or operation 1k-65 of FIG. 11.

When the new relaxed measurement criterion is satisfied, in operation 1m-80, the UE may perform measurement based on the aforedescribed embodiment (the embodiment described with reference to FIG. 9, 1J, or 1K) of the disclosure. For example, the UE may perform at least one of operation 1i-70 of FIG. 9, operation 1j-70 of FIG. 10, or operation 1k-70 of FIG. 11.

Figure 14:
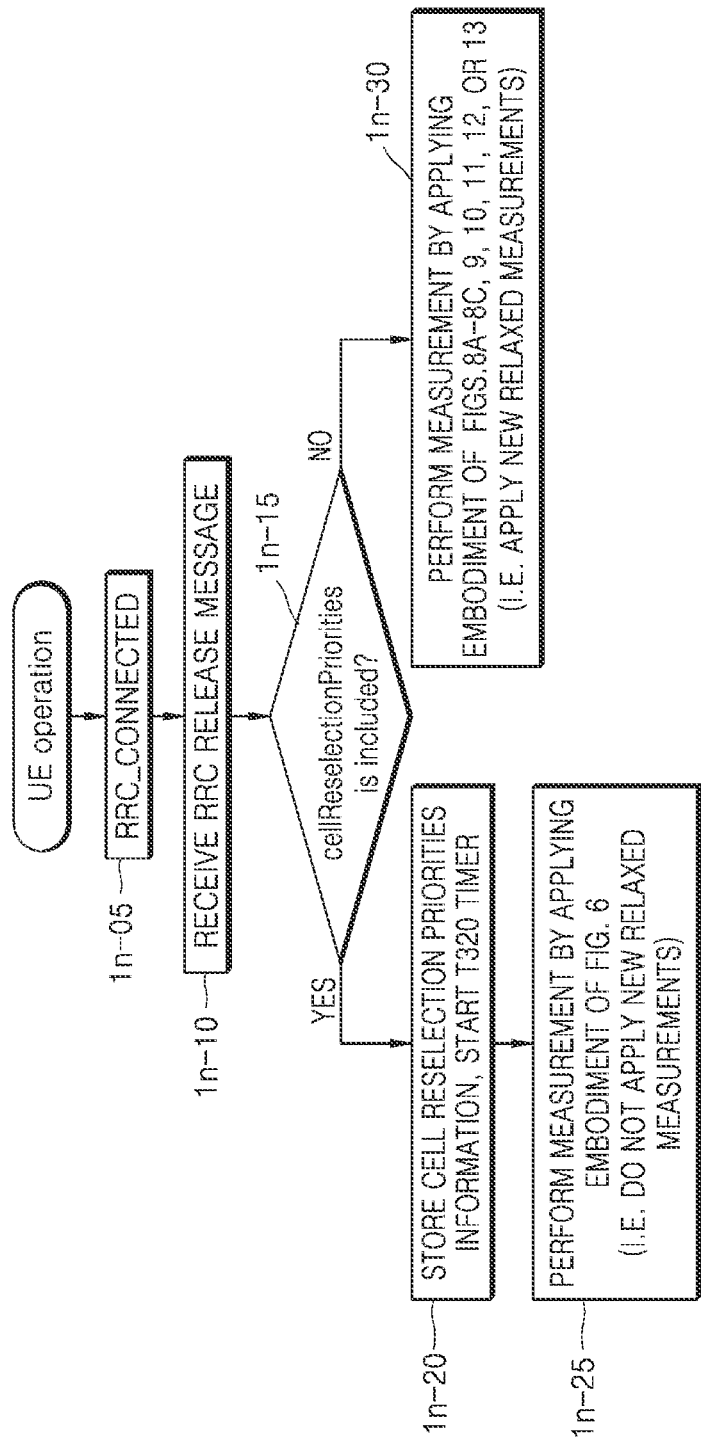
FIG. 14 is a diagram for describing a procedure in which a BS releases connection to a UE, and thus the UE switches from an RRC_CONNECTED mode to an RRC_IDLE mode or an RRC_INACTIVE mode, and operations of the UE in the RRC_IDLE mode or the RRC_INACTIVE mode, the UE determining whether to apply legacy relaxed measurement or new relaxed measurements so as to perform a cell reselection evaluation procedure according to an embodiment of the disclosure.

FIG. 14 is a diagram for describing a procedure in which a BS releases connection to a UE, and thus the UE switches from an RRC_CONNECTED mode to an RRC_IDLE mode or an RRC_INACTIVE mode, and operations of the UE in the RRC_IDLE mode or the RRC_INACTIVE mode, the UE determining whether to apply legacy relaxed measurement or new relaxed measurements so as to perform a cell reselection evaluation procedure according to an embodiment of the disclosure.

Referring to FIG. 14, the UE may be in the RRC_CONNECTED mode (operation 1n-05).

In operation 1n-10, the UE may receive an RRC release message (RRCRelease) from a BS.

In operation 1n-15, the UE may determine whether cellReselectionPriorities are included in the RRC release message. Information included in the cellReselectionPriorities provided in the RRC release message may be determined according to the aforedescribed embodiment of the disclosure. When the RRC release message includes the cellReselectionPriorities, the UE may perform operation 1n-20 and operation 1n-25. When the RRC release message does not include the cellReselectionPriorities, the UE may perform operation 1n-30.

In operation 1n-20, the UE may store the cell reselection priorities information provided in the cellReselectionPriorities included in the RRC release message. When the RRC release message includes t320 value, the UE may set a timer value as the t320 value and then may start T320 timer.

In operation 1n-25, the UE may perform measurement by applying the embodiment of the disclosure which is described with reference to FIG. 6. The UE according to an embodiment of the disclosure may measure a neighboring cell by applying legacy relaxed measurements while T320 timer is running.

In operation 1n-30, the UE may perform measurement by applying at least one embodiment from among the embodiments described with reference to FIG. 8A, 8B, 8C, 9, 10, 11, 12, or 13. The UE according to an embodiment of the disclosure may measure a neighboring cell by applying new relaxed measurements only when T320 timer is not running.

Figure 15:
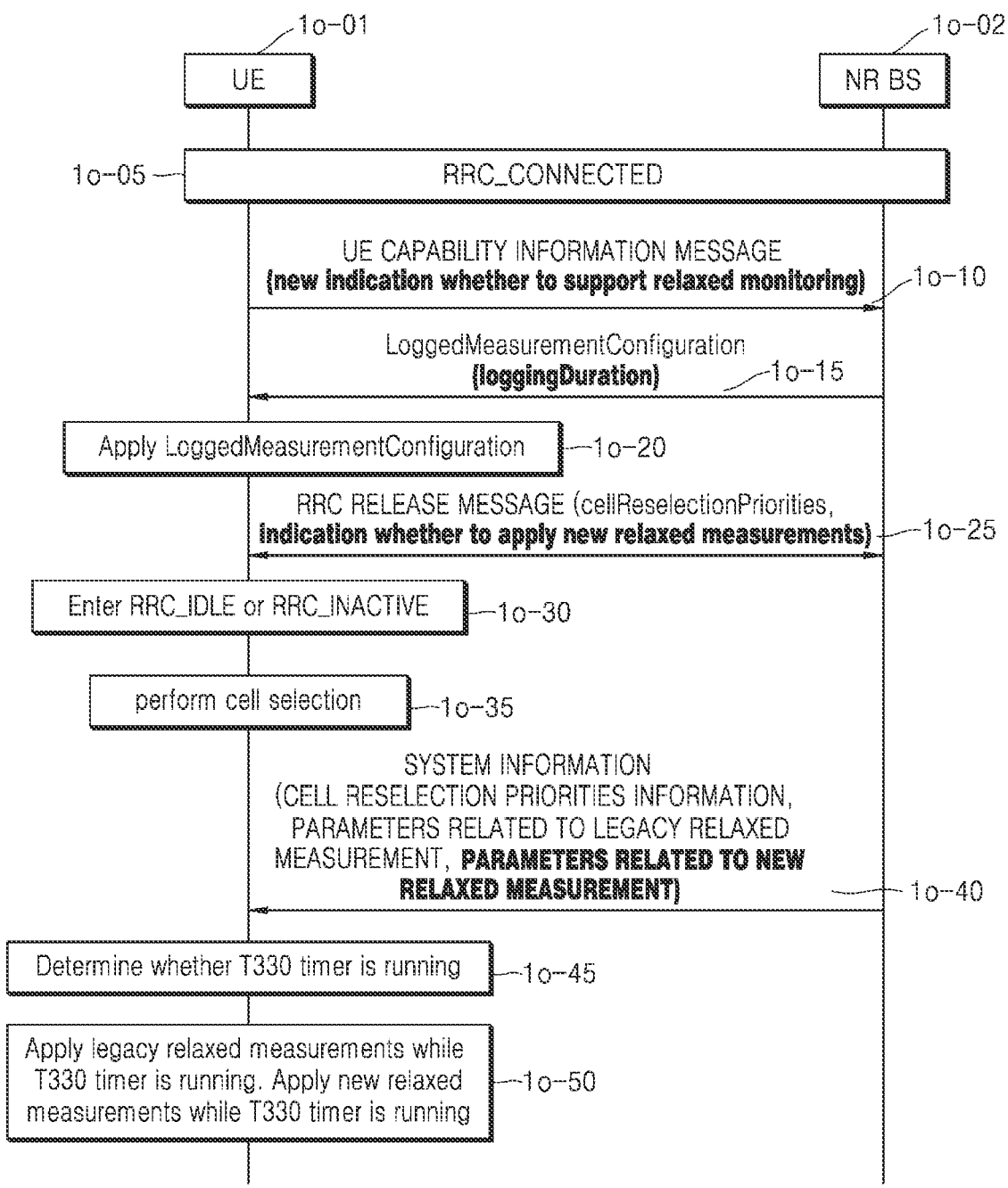
FIG. 15 is a diagram for describing a procedure in which a NR BS releases connection to a UE, and thus the UE switches from an RRC_CONNECTED mode to an RRC_IDLE mode or an RRC_INACTIVE mode, and operations of the UE in the RRC_IDLE mode or the RRC_INACTIVE mode, the UE determining whether to apply legacy relaxed measurement or new relaxed measurements so as to perform a cell reselection evaluation procedure according to an embodiment of the disclosure.

FIG. 15 is a diagram for describing a procedure in which a NR BS 1o-02 releases connection to a UE 1o-01, and thus the UE 1o-01 switches from an RRC_CONNECTED mode to an RRC_IDLE mode or an RRC_INACTIVE mode, and operations of the UE 1o-01 in the RRC_IDLE mode or the RRC_INACTIVE mode, the UE 1o-01 determining whether to apply legacy relaxed measurement or new relaxed measurements so as to perform a cell reselection evaluation procedure according to an embodiment of the disclosure.

Referring to FIG. 15, the UE 1o-01 may be in the RRC_CONNECTED mode (operation 1o-05).

In operation 1o-10, the UE 1o-01 in the RRC_CONNECTED mode may transmit a UE capability information message (UECapabilityInformation) to the NR BS 1o-02. The UE capability information message (UECapabilityInformation) may include at least one parameter in the followings.

An indicator indicating whether the UE 1o-01 in the RRC_IDLE mode or the RRC_INACTIVE mode supports new relaxed measurement.

The indicator may indicate whether the UE 1o-01 in the RRC_IDLE mode or the RRC_INACTIVE mode supports new relaxed measurements with respect to an E-UTRA frequency and a NR frequency. In addition, the indicator may include a separate indicator, according to cell reselection priorities for respective frequencies. For example, the indicator may separately include an indicator as to whether new relaxed measurements are supported for a neighboring frequency whose cell reselection priority is higher than a cell reselection priority of a current serving frequency, and an indicator as to whether the new relaxed measurements are supported for a neighboring frequency whose cell reselection priority is equal to or lower than the cell reselection priority of the current serving frequency.

The indicator may separately indicate whether the new relaxed measurements are supported for the E-UTRA frequency and the NR frequency.

The indicator may denote an indicator indicating whether the UE 1o-01 in the RRC_IDLE mode or the RRC_INACTIVE mode supports the new relaxed measurements only when T330 timer is running (T330 timer indicates a timer that is set to a loggingDuration value included in a LoggedMeasurementConfiguration message and runs).

In operation 1o-15, the UE 1o-01 in the RRC_CONNECTED mode may receive the LoggedMeasurementConfiguration message from the NR BS 1o-02. The LoggedMeasurementConfiguration message may include at least one parameter in the followings.

loggingDuration value (t330 timer value)
loggingInterval value
areaConfiguration information element
plmn-IdentityList
absoluteTimeInfo, traceReferece, traceRecordingSessionRef, trace-Id
an indicator indicating whether to perform new relaxed measurement only when T330 timer is running In operation 1o-20, the UE 1o-01 in the RRC_CONNECTED mode may apply LoggedMeasurementConfiguration indicated via the message. For example, the UE may perform at least one of operations below.

The UE may discard logged measurement configuration and logged measurement information.

When the LoggedMeasurementConfiguration message includes loggingDuration, loggingInterval, and areaConfiguration, the UE may store them in VarLogMeasConfig. areaConfiguration may include at least one information from among area configuration information on serving cell (areaConfigForServing) and/or area configuration information on neighboring cell (areaConfigForNeighbour). The area configuration information on serving cell (areaConfigForServing) may be configured by at least one of cellGlobalList, trackingAreaCodeList, or tackingArealdentityList. The area configuration information on neighboring cell (areaConfigForNeighbour) may be configured of at least one of DL carrier frequency (absolute radio-frequency channel number (ARFNC)-ValueNR), a frequency band list of DL carrier frequency(ies), or a cell list (e.g., physical cell ID (PCI) or cell identity).

When the LoggedMeasurementConfiguration message includes plmn-IdentityList, the UE may set, in VarLogMeasReport, the plmn-IdentityList to include PLMNs included in the plmn-IdentityList and registered PLMN (RPLMN).

Alternatively, the UE may set, in the VarLogMeasReport, the plmn-IdentityList to include RPLMN.

The UE may store, in the VarLogMeasReport, absoluteTimeInfo, traceReferece, traceRecordingSessionRef, and trace-Id.

The UE may start T330 timer by setting it with a loggingDuration value.

In operation 1o-25, the UE 1o-01 in the RRC_CONNECTED mode may receive an RRC release message (RRCRelease) from the NR BS 1o-02. In operation 1o-25, the UE 1o-01 may determine whether the received RRC release message includes cellReselectionPriorities. Information included in the cellReselectionPriorities provided in the RRC release message may be determined according to the aforedescribed embodiment of the disclosure. When the RRC release message includes the cellReselectionPriorities, the UE 1o-01 may store the cell reselection priorities information provided in the cellReselectionPriorities included in the RRC release message. When the RRC release message includes t320 value, the UE 1o-01 may set a timer value as the t320 value and then may start T320 timer. The RRC release message may include an indicator indicating whether to apply new relaxed measurements.

In operation 1o-30, the UE 1o-01 may transition to an RRC_IDLE mode or an RRC_INACTIVE mode. Whether the UE 1o-01 is to transition to the RRC_IDLE mode or the RRC_INACTIVE mode may be determined according to the aforedescribed embodiment of the disclosure.

In operation 1o-35, the UE 1o-01 that transitioned to the RRC_IDLE mode or the RRC_INACTIVE mode may camp-on a suitable cell by performing a cell selection procedure. The cell selection procedure may be determined according to the aforedescribed embodiment of the disclosure.

In operation 1o-40, the UE 1o-01 may receive system information including cell reselection information. The cell reselection information included in the system information may be determined according to the aforedescribed embodiment of the disclosure. When the RRC release message does not include the cellReselectionPriorities, the UE 1o-01 in the RRC_IDLE mode or the RRC_INACTIVE mode may apply cell reselection priorities information broadcast in the system information (operation 1o-40). For example, when the RRC release message includes the cellReselectionPriorities, the UE 1o-01 may ignore the cell reselection priorities information provided in the system information. For reference, when T320 timer expires, the UE 1o-01 may discard the cellReselectionPriorities included in the RRC release message, and may apply the cell reselection priorities information broadcast in the system information.

In operation 1o-45, the UE 1o-01 in the RRC_IDLE mode or the RRC_INACTIVE mode may determine whether T330 timer is running.

In operation 1o-50, in a case where T330 timer is running, the UE 1o-01 in the RRC_IDLE mode or the RRC_INACTIVE mode may measure neighboring cells by applying legacy relaxed measurement (e.g., the embodiment of the disclosure which is described with reference to FIG. 6), or may measure neighboring cells by applying legacy relaxed measurement (e.g., the embodiment of the disclosure which is described with reference to FIG. 6) only to areaConfiguration included in loggedMeasurementConfiguration and by applying new relaxed measurement (e.g., at least one embodiment from among the embodiments described with reference to FIG. 8A, 8B, 8C, 9, 10, 11, 12, or 13) to area or cell that is not indicated in areaConfiguration.

In operation 1o-50, in a case where T330 timer is running but the RRC release message received in operation 1o-15 or operation 1o-25 indicates to apply new relaxed measurements, the UE 1o-01 may measure neighboring cells by applying new relaxed measurements (e.g., at least one embodiment from among the embodiments described with reference to FIG. 8A, 8B, 8C, 9, 10, 11, 12, or 13).

In operation 1o-50, in a case where T330 timer expires or is not running, the UE 1o-01 may measure neighboring cells by applying new relaxed measurements (e.g., at least one embodiment from among the embodiments described with reference to FIG. 8A, 8B, 8C, 9, 10, 11, 12, or 13).

In operation 1o-50, in a case where the UE 1o-01 camps on a suitable NR cell, and RPLMN is included in the plmn-IdentityList stored in the VarLogMeasReport and the suitable NR cell belongs to areaConfiguration configured in the VarLogsMeasConfig, when T330 timer is running, the UE 1*o*-01 may measure neighboring cells by applying legacy relaxed measurement (e.g., the embodiment of the disclosure which is described with reference to FIG. 6). Alternatively, the UE 1*o*-01 may measure neighboring cells by applying new relaxed measurement (e.g., at least one embodiment from among the embodiments described with reference to. FIG. 8A, 8B, 8C, 9, 10, 11, 12, or 13).

Figure 16:
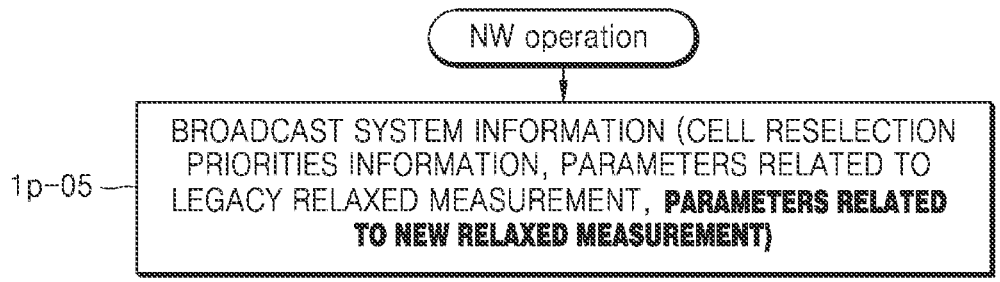
FIG. 16 is a diagram for describing operations of a BS that broadcasts parameters associated with new relaxed measurement through system information according to an embodiment of the disclosure.

FIG. 16 is a diagram for describing operations of a BS that broadcasts parameters associated with new relaxed measurement through system information according to an embodiment of the disclosure.

Referring to FIG. 16, the BS may broadcast the system information by adding the parameters associated with new relaxed measurement (operation 1*p*-05). The BS may broadcast the parameters associated with new relaxed measurement by using at least one method in the followings.

When a s-SearchThresholdP value corresponds to a Srxlev threshold value, the BS may signal the s-SearchThresholdP value as a value equal to or smaller than s-IntraSearchP and/or may signal the s-SearchThresholdP value as a value equal to or smaller than s-NonIntraSearchP. In this regard, the s-SearchThresholdP value may be signaled as a value equal to or greater than 0.

When a s-SearchThresholdQ value corresponds to a Squal threshold value, the BS may signal the s SearchThresholdQ value as a value equal to or smaller than s-IntraSearchQ and/or may signal the SearchThresholdQ value as a value equal to or smaller than s-NonIntraSearchQ. In this regard, the s-SearchThresholdQ value may be signaled as a value equal to or greater than 0.

When a s-SearchThresholdP_h value corresponds to a Srxlev threshold value, the BS may signal the s-SearchThresholdP_h value as a value equal to or smaller than s-IntraSearchP and/or may signal the s-SearchThresholdP_h value as a value equal to or smaller than s-NonIntraSearchP. In this regard, the s-SearchThresholdP_h value may be signaled as a value equal to or greater than 0.

When a s-SearchThresholdQ_h value corresponds to a Squal threshold value, the BS may signal the SearchThresholdQ_h value as a value equal to or smaller than s-IntraSearchQ and/or may signal the SearchThresholdQ_h value as a value equal to or smaller than s-NonIntraSearchQ. In this regard, the s-SearchThresholdQ_h value may be signaled as a value equal to or greater than 0.

When an s-NonIntraSearchP_h value corresponds to a Srxlev threshold value, the BS may signal the s-NonIntraSearch_P value as a value equal to or smaller than s-SearchThresholdP or s-SearchThresholdP_h. In this regard, the s-NonIntraSearchP_h value may be signaled as a value equal to or greater than 0.

When an s-NonIntraSearchQ_h value corresponds to a Squal threshold value, the BS may signal the s-NonIntraSearchQ_h value as a value equal to or smaller than s-SearchThresholdQ or s-SearchThresholdQ_h. In this regard, the s-NonIntraSearchQ_h value may be signaled as a value equal to or greater than 0.

When the s-SearchThresholdP value corresponds to a Qrxlevmeas threshold value, the BS may signal the s-SearchThresholdP value as a value equal to or smaller than s-IntraSearchP+alpha and/or a value equal to or smaller than s-NonIntraSearchP+alpha. alpha=Srxlev−Qrxlevmeas<=0 or alpha=Srxlev−Qrxlevmeas<0 may be fulfilled.

When the s-SearchThresholdQ value corresponds to a Qqualmeas threshold value, the BS may signal the SearchThresholdQ value as a value equal to or smaller than s-IntraSearchQ+beta and/or a value equal to or smaller than s-NonIntraSearchQ+beta. beta=Squal−Qqualvmeas<=0 or beta=Squal−Qqualvmeas<0 may be fulfilled.

When the s-SearchThresholdP_h value corresponds to a Qrxlevmeas threshold value, the BS may signal the s-SearchThresholdP_h value as a value equal to or smaller than s-NonIntraSearchP+alpha. alpha=Srxlev—Qrxlevmeas<=0 or alpha=Srxlev—Qrxlevmeas<0 may be fulfilled.

When the s-SearchThresholdQ_h value corresponds to a Qqualmeas threshold value, the BS may signal the s-SearchThresholdQ_h value as a value equal to or smaller than s-NonIntraSearchQ+beta. beta=Squal−Qqualvmeas<=0 or beta=Squal−Qqualvmeas<0 may be fulfilled.

Figure 17:
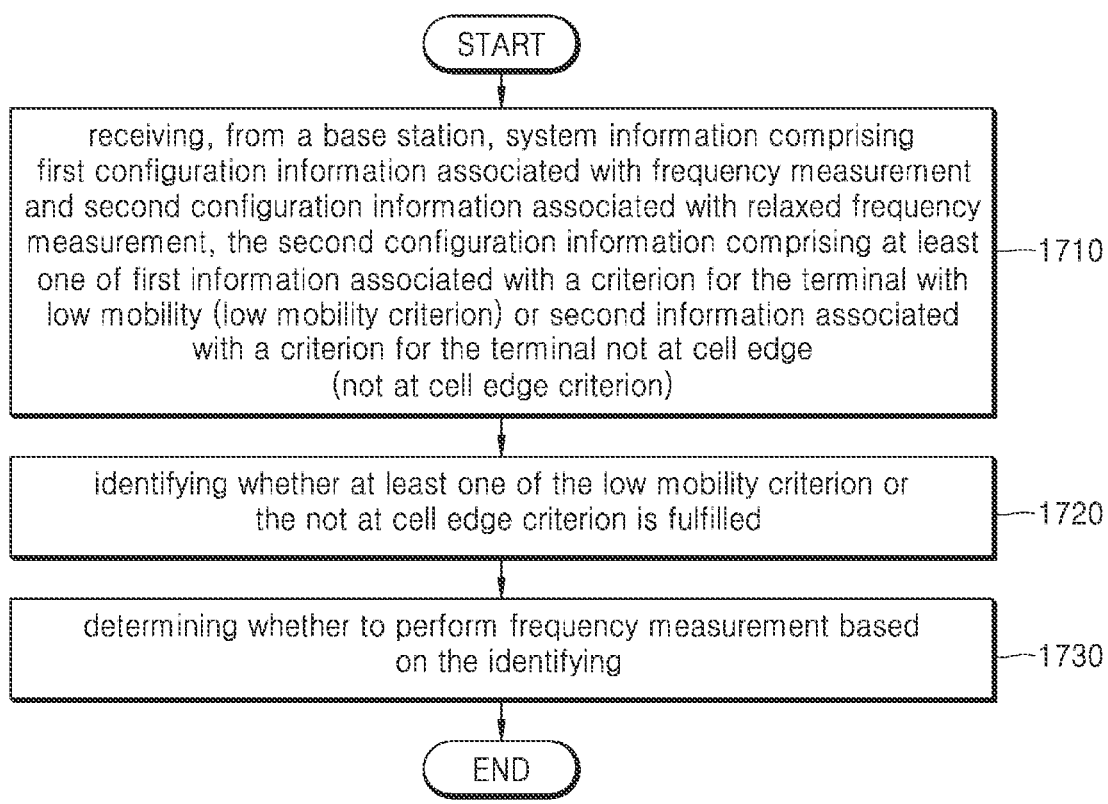
FIG. 17 is a diagram for describing a method of relaxing frequency measurement by a terminal according to an embodiment of the disclosure.

FIG. 17 is a diagram for describing a method of relaxing frequency measurement by a terminal according to an embodiment of the disclosure.

Referring to FIG. 17, in operation 1710, a terminal receives, from a base station, system information comprising first configuration information associated with frequency measurement and second configuration information associated with relaxed frequency measurement, the second configuration information comprising at least one of first information associated with a criterion for the terminal with low mobility (low mobility criterion) or second information associated with a criterion for the terminal not at cell edge (not at cell edge criterion).

The first configuration information may comprise at least one of a threshold value SIntraSearchP for a cell selection receive level value (Srxlev) for an intra-frequency, a threshold value SIntraSearchQ for a cell selection quality value (Squal) for the intra-frequency, a threshold value SnonIntraSearchP for the Srxlev for an inter-frequency or an inter-radio access technology (inter-RAT) frequency, or a threshold value SnonIntraSearchQ for the Squal for the inter-frequency or the inter-RAT frequency. The first information associated with the low mobility criterion may comprise a threshold value SsearchDeltaP for variation of the Srxlev and information of an evaluation time period TSearchDeltaP.

The second information associated with the not at cell edge criterion may comprise at least one of a threshold value SsearchThresholdP for the Srxlev for relaxed frequency measurement or a threshold value SsearchThresholdQ for the Squal for relaxed frequency measurement. The SsearchThresholdP may be less than or equal to the SIntraSearchP and the SnonIntraSearchP. The SsearchThresholdQ may be less than or equal to the SIntraSearchQ and the SnonIntraSearchQ.

In operation 1720, the terminal identifies whether at least one of the low mobility criterion or the not at cell edge criterion is fulfilled.

In operation 1730, the terminal determines whether to perform frequency measurement based on the identifying.

In an embodiment of the disclosure, the terminal may determine not to perform frequency measurement for measurements of intra-frequency, new radio (NR) inter-frequencies configured with equal or lower priority than a frequency of a serving cell of the terminal, and inter-RAT frequency cells configured with equal or lower priority than the frequency of a serving cell of the terminal, in case that the low mobility criterion is fulfilled for the time period TSearchDeltaP and the not cell edge criterion is fulfilled.

In an embodiment of the disclosure, the terminal may determine not to perform frequency measurement for measurements of new radio (NR) inter-frequencies and inter-RAT frequency cells configured with higher priority than a frequency of a serving cell of the terminal, in case that the low mobility criterion is fulfilled for the time period TSearchDeltaP, the not cell edge criterion is fulfilled, and an indicator (highPriorityMeasRelax) indicating whether a measurement for a high priority frequency can be relaxed is configured by the second configuration information.

In an embodiment of the disclosure, the terminal may determine not to perform frequency measurement for measurements of new radio (NR) inter-frequencies and inter-RAT frequency cells configured with higher priority than a frequency of a serving cell of the terminal, in case that the following conditions are satisfied: (i) the first information associated with the low mobility criterion is included and the second information associated with the not at cell edge criterion is not included in the second configuration information, (ii) an Srxlev of the serving cell of the terminal is greater than the SnonIntraSearchP and an Squal of the serving cell is greater than the SnonIntraSearchQ, (iii) the low mobility criterion is fulfilled, and (iv) an indicator (highPriorityMeasRelax) indicating whether a measurement for a high priority frequency can be relaxed is configured by the second configuration information.

In an embodiment of the disclosure, the low mobility criterion may be that a value obtained by subtracting an Srxlev of a serving cell of the terminal from a reference Srxlev (SrxlevRef) of the serving cell is less than the SsearchDeltaP. A current Srxlev of the serving cell may be determined as the SrxlevRef of the serving cell in case that the terminal selects or reselects a new cell, the current Srxlev of the serving cell is greater than a current reference SrxlevRef of the serving cell, or at least one criterion of the low mobility criterion or the not cell edge criterion is not fulfilled for the time period TSearchDeltaP.

In an embodiment of the disclosure, the not at cell edge criterion may be that an Srxlev of a serving cell of the terminal is greater than the SsearchThresholdP and that in case that the SsearchThresholdQ is included in the second configuration associated with the not at cell edge criterion, an Squal of the serving cell is greater than the SsearchThresholdQ.

Figure 18:
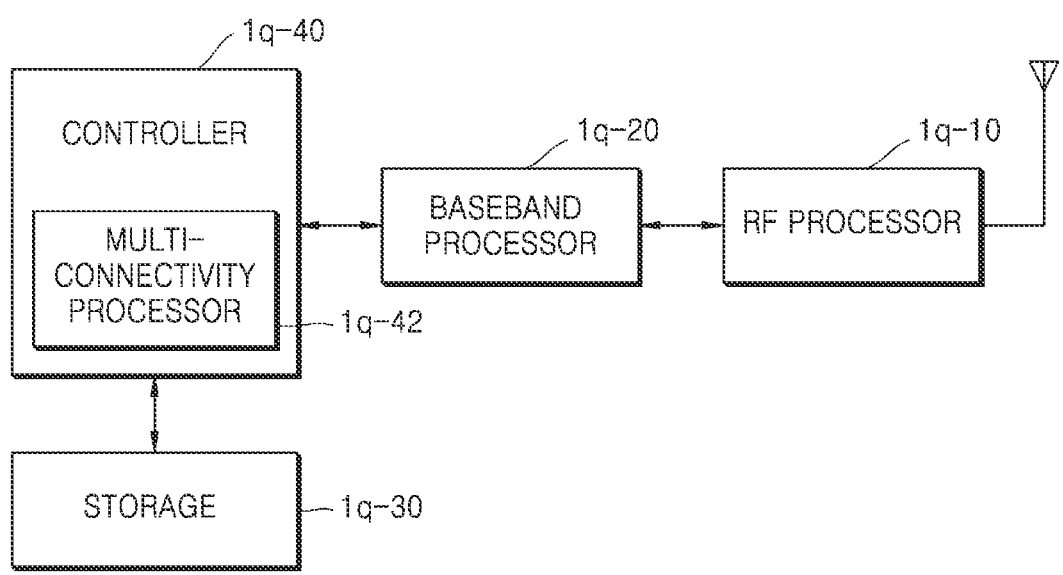
FIG. 18 illustrates an inner configuration of a UE according to an embodiment of the disclosure.

FIG. 18 illustrates an inner configuration of a UE according to an embodiment of the disclosure.

Referring to FIG. 18, the UE may include a radio frequency (RF) processor 1q-10, a baseband processor 1q-20, a storage 1q-30, and a controller 1q-40. However, the inner configuration of the UE is not limited to the example and may include more elements than the elements shown in FIG. 18 or may include less elements than the shown elements.

The RF processor 1q-10 performs functions for transmitting and receiving signals through radio channels, e.g., band conversion and amplification of the signals. For example, the RF processor 1q-10 may up-convert a baseband signal provided from the baseband processor 1q-20, into an RF band signal and then may transmit the RF band signal through an antenna, and may down-convert an RF band signal received through the antenna, into a baseband signal. For example, the RF processor 1q-10 may include a transmit filter, a receive filter, an amplifier, a mixer, an oscillator, a digital-to-analog convertor (DAC), an analog-to-digital convertor (ADC), or the like. Although only one antenna is illustrated in the FIG. 18, the UE may include a plurality of antennas. The RF processor 1q-10 may include a plurality of RF chains. Furthermore, the RF processor 1q-10 may perform beamforming. For the beamforming, the RF processor 1q-10 may adjust phases and intensities of signals to be transmitted or received through a plurality of antennas or antenna elements. The RF processor 1q-10 may perform a MIMO operation and may receive a plurality of layers in the MIMO operation.

The baseband processor 1q-20 converts between a baseband signal and a bit string based on physical layer specifications of a system. For example, for data transmission, the baseband processor 1q-20 generates complex symbols by encoding and modulating a transmit bit string. For data reception, the baseband processor 1q-20 reconstructs a received bit string by demodulating and decoding a baseband signal provided from the RF processor 1q-10. For example, according to an OFDM scheme, for data transmission, the baseband processor 1q-20 may generate complex symbols by encoding and modulating a transmit bit string, may map the complex symbols to subcarriers, and then may configure OFDM symbols by performing an inverse fast Fourier transform (IFFT) calculation and cyclic prefix (CP) insertion. For data reception, the baseband processor 1q-20 may segment a baseband signal provided from the RF processor 1q-10, into OFDM symbol units, may reconstruct signals mapped to subcarriers by performing a FFT calculation, and then may reconstruct a received bit string by demodulating and decoding the signals.

The baseband processor 1q-20 and the RF processor 1q-10 transmit and receive signals as described above. Accordingly, the baseband processor 1q-20 and the RF processor 1q-10 may be called a transmitter, a receiver, a transceiver, or a communicator. Furthermore, at least one of the baseband processor 1q-20 and the RF processor 1q-10 may include a plurality of communication modules to support a plurality of different radio access technologies. At least one of the baseband processor 1q-20 and the RF processor 1q-10 may include different communication modules to process signals of different frequency bands. For example, the different radio access technologies may include a wireless local area network (wireless LAN) (e.g., the institute of electrical and electronic engineers (IEEE) 802.11), a cellular network (e.g., LTE), or the like. The different frequency bands may include a super-high frequency (SHF) (e.g., 2.NRHz, NRhz) band and a millimeter wave (mmWave) (e.g., 60 GHz) band.

The storage 1q-30 stores basic programs, application programs, and data, e.g., configuration information, for operations of the UE. In particular, the storage 1q-30 may store information related to a second access node configured to perform wireless communication by using a second radio access technology, which is different from a first access node configured to perform wireless communication by using a first radio access technology. The storage 1q-30 may provide the stored data upon request by the controller 1q-40. The storage 1q-30 may include any or a combination of storage media, such as read-only memory (ROM), random access memory (RAM), a hard disk, a compact disc (CD)-ROM, and a digital versatile disc (DVD). In addition, the storage 1q-30 may include a plurality of memories.

The controller 1q-40 may control overall operations of the UE. For example, the controller 1q-40 transmits and receives signals through the baseband processor 1q-20 and the RF processor 1q-10. Furthermore, the controller 1q-40 records and reads data on or from the storage 1q-30. To this end, the controller 1*q*-40 may include at least one processor. For example, the controller 1*q*-40 may include a communication processor (CP) for controlling communications and an application processor (AP) for controlling an upper layer, such as an application program. In addition, the controller 1*q*-40 may control the UE to perform the method of relaxing RRM measurement. Furthermore, at least one element in the UE may be implemented as a chip.

Figure 19:
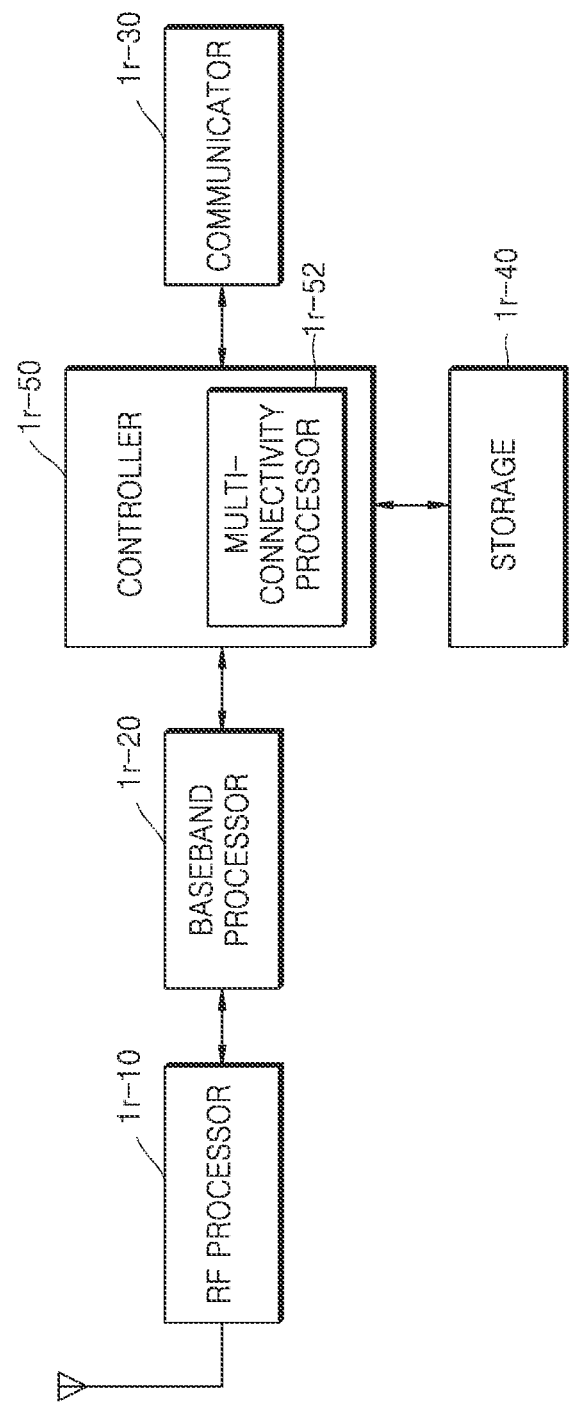
FIG. 19 illustrates a configuration of a BS of an NR according to an embodiment of the disclosure.

FIG. 19 illustrates a configuration of a BS of an NR according to an embodiment of the disclosure. The BS may also be called a first access node.

Referring to FIG. 19, the BS may include a RF processor 1*r*-10, a baseband processor 1*r*-20, a backhaul communicator 1*r*-30, a storage 1*r*-40, and a controller 1*r*-50. The controller 1*r*-50 may include a multi-connectivity processor 1*r*-52. However, an inner configuration the BS is not limited the example and may include more elements than the elements shown in FIG. 19 or may include less elements than the shown elements.

The RF processor 1*r*-10 may perform functions for transmitting and receiving signals through radio channels, e.g., band conversion and amplification of the signals. For example, the RF processor 1*r*-10 may up-convert a baseband signal provided from the baseband processor 1*r*-20, into an RF band signal and then may transmit the RF band signal through an antenna, and may down-convert an RF band signal received through an antenna, into a baseband signal. For example, the RF processor 1*r*-10 may include a transmit filter, a receive filter, an amplifier, a mixer, an oscillator, a DAC, an ADC, or the like. Although only one antenna is illustrated in the FIG. 19, the first access node (i.e., the BS) may include a plurality of antennas. In addition, the RF processor 1*r*-10 may include a plurality of RF chains. Furthermore, the RF processor 1*r*-10 may perform beamforming. For the beamforming, the RF processor 1*r*-10 may adjust phases and intensities of signals to be transmitted or received through a plurality of antennas or antenna elements. The RF processor 1*r*-10 may perform a DL MIMO operation by transmitting one or more layers.

The baseband processor 1*r*-20 may convert between a baseband signal and a bit string based on physical layer specifications of a first radio access technology. For example, for data transmission, the baseband processor 1*r*-20 generates complex symbols by encoding and modulating a transmit bit string. For data reception, the baseband processor 1*r*-20 reconstructs a received bit string by demodulating and decoding a baseband signal provided from the RF processor 1*r*-10. For example, according to an OFDM scheme, for data transmission, the baseband processor 1*r*-20 generates complex symbols by encoding and modulating a transmit bit string, maps the complex symbols to subcarriers, and then configures OFDM symbols by performing an IFFT calculation and CP insertion. For data reception, the baseband processor 1*r*-20 may segment a baseband signal provided from the RF processor 1*r*-10, into OFDM symbol units, may reconstruct signals mapped to subcarriers by performing a FFT calculation, and then may reconstruct a received bit string by demodulating and decoding the signals. The baseband processor 1*r*-20 and the RF processor 1*r*-10 transmit and receive signals in a manner described above. Accordingly, the baseband processor 1*r*-20 and the RF processor 1*r*-10 may also be called a transmitter, a receiver, a transceiver, a communicator, or a wireless communicator.

The backhaul communicator 1*r*-30 provides an interface for communicating with other nodes in a network. For example, the backhaul communicator 1*r*-30 converts a bit string into a physical signal, the bit string being transmitted from a primary BS to another node, e.g., a secondary BS, a core network, or the like, and converts a physical signal received from the other node to a bit string.

The storage 1*r*-40 stores basic programs, application programs, and data, e.g., configuration information, for operations of the primary BS. In particular, the storage 1*r*-40 may store information about bearers assigned for a connected UE and measurement results reported from the connected UE. In addition, the storage 1*r*-40 may store criteria information used to determine whether to provide or release multiple connections to or from the UE. The storage 1*i*-40 provides the stored data upon request by the controller 1*r*-50. The storage 1*r*-40 may include any or a combination of storage media, such as ROM, RAM, a hard disk, a CD-ROM, and a DVD. The storage 1*i*-40 may include a plurality of memories.

The controller 1*r*-50 controls overall operations of the primary BS. For example, the controller 1*r*-50 transmits and receives signals through the baseband processor 1*r*-20 and the RF processor 1*r*-10, or the backhaul communicator 1*r*-30. The controller 1*r*-50 records and reads data on or from the storage 1*r*-40. To this end, the controller 1*r*-50 may include at least one processor. In addition, the controller 1*r*-50 may control the BS to perform the method of relaxing RRM measurement. Furthermore, at least one element in the BS may be implemented as a chip.

The methods according to the embodiments of the disclosure as described herein or in the following claims may be implemented as hardware, software, or a combination of hardware and software.

When implemented as software, a computer-readable storage medium storing one or more programs (e.g., software modules) may be provided. The one or more programs stored in the computer-readable storage medium are configured for execution by one or more processors in an electronic device. The one or more programs include instructions directing the electronic device to execute the methods according to the embodiments of the disclosure as described herein or in the following claims.

The programs (e.g., software modules or software) may be stored in non-volatile memory including RAM or flash memory, ROM, electrically erasable programmable read only memory (EEPROM), a magnetic disc storage device, a CD-ROM, a DVD, another optical storage device, or a magnetic cassette. Alternatively, the programs may be stored in memory including a combination of some or all of the above-mentioned storage media. A plurality of such memories may be included.

In addition, the programs may be stored in an attachable storage device accessible through any or a combination of communication networks, such as the Internet, an intranet, a LAN, a wide LAN (WLAN), and a storage area network (SAN). Such a storage device may access, via an external port, the electronic device that performs embodiments of the disclosure. Furthermore, an additional storage device on the communication network may access the electronic device that performs embodiments of the disclosure.

According to embodiments of the disclosure, provided are an apparatus and a method for effectively providing a service in a mobile communication system.

While the disclosure has been shown and described with reference to various embodiments thereof, it will be understood by those skilled in the art that various changes in form and details may be made therein without departing from the spirit and scope of the disclosure as defined by the appended claims and their equivalents. In addition, the embodiments of the disclosure may be combined to be implemented, when required. For example, a BS and a UE may be operated in a manner that portions of an embodiment of the disclosure are combined with portions of another embodiment of the disclosure. The embodiments of the disclosure may also be applied to other communication systems, and various modifications based on the technical concept of the embodiments of the disclosure may be made.

What is claimed is:

1. A method of relaxing frequency measurement by a terminal in a wireless communication system, the method comprising:
receiving, from a base station, system information including first configuration information related to frequency measurement and second configuration information related to relaxed frequency measurement, wherein the second configuration information includes information related to a low mobility criterion; and
determining whether to perform frequency measurement based on the low mobility criterion,
wherein the first configuration information includes $S_{IntraSearchP}$ for a cell selection receive level value (Srxlev), $S_{IntraSearchQ}$ for a cell selection quality value (Squal), $S_{nonIntraSearchP}$ for the Srxlev, and $S_{nonIntraSearchQ}$ for the Squal, and
wherein the information related to the low mobility criterion includes $S_{SearchDeltaP}$ for variation of the Srxlev and information related to an evaluation time period $T_{SearchDeltaP}$.

2. The method of claim 1, further comprising:
determining whether to perform frequency measurement further based on a not at cell edge criterion,
wherein the second configuration information further includes other information related to the not at cell edge criterion including $S_{SearchThresholdP}$ for the Srxlev for relaxed frequency measurement which is less than or equal to both the $S_{IntraSearchP}$ and the $S_{nonIntraSearchP}$, and $S_{SearchThresholdQ}$ for the Squal for relaxed frequency measurement which is less than or equal to both the $S_{IntraSearchQ}$ and the $S_{nonIntraSearchQ}$.

3. The method of claim 2, wherein the determining whether to perform frequency measurement comprises determining not to perform frequency measurement for intra-frequency, in case that an Srxlev of a serving cell of the terminal is greater than the $S_{IntraSearchP}$ and an Squal of the serving cell is greater than the $S_{IntraSearchQ}$.

4. The method of claim 2, wherein the determining whether to perform frequency measurement comprises determining not to perform frequency measurement for new radio (NR) inter-frequencies configured with equal or lower priority than a frequency of a serving cell of the terminal, and inter radio access technology (inter-RAT) frequencies configured with lower priority than the frequency of a serving cell of the terminal, in case that an Srxlev of the serving cell of the terminal is greater than the $S_{nonIntraSearchP}$ and an Squal of the serving cell is greater than the $S_{nonIntraSearchQ}$.

5. The method of claim 1,
wherein the low mobility criterion includes a value obtained by subtracting an Srxlev of a serving cell of the terminal from a reference Srxlev ($Srxlev_{Ref}$) of the serving cell being less than the $S_{SearchDeltaP}$, and
wherein a current Srxlev of the serving cell is determined as the $Srxlev_{Ref}$ of the serving cell in case that the terminal selects or reselects a new cell, the current Srxlev of the serving cell is greater than a current $Srxlev_{Ref}$ of the serving cell, or at least one of the low mobility criterion or the not at cell edge criterion is not fulfilled for the time period $T_{SearchDeltaP}$.

6. The method of claim 2, wherein the not at cell edge criterion includes an Srxlev of a serving cell of the terminal being greater than the $S_{SearchThresholdP}$ and in case that the $S_{SearchThresholdQ}$ is included in the information related to the not at cell edge criterion, an Squal of the serving cell is greater than the $S_{searchThresholdQ}$.

7. A terminal relaxing frequency measurement in a wireless communication system, the terminal comprising:
a transceiver; and
at least one processor operably coupled with the transceiver and configured to:
receive, from a base station, system information including first configuration information related to frequency measurement and second configuration information related to relaxed frequency measurement, wherein the second configuration information includes information related to a low mobility criterion, and
determine whether to perform frequency measurement based on the low mobility criterion,
wherein the first configuration information includes $S_{IntraSearchP}$ for a cell selection receive level value (Srxlev), $S_{IntraSearchQ}$ for a cell selection quality value (Squal), $S_{nonIntraSearchP}$ for the Srxlev, and $S_{nonIntraSearchQ}$ for the Squal, and
wherein the information related to the low mobility criterion includes $S_{SearchDeltaP}$ for variation of the Srxlev and information related to an evaluation time period $T_{SearchDeltaP}$.

8. The terminal of claim 7,
wherein the at least one processor is further configured to determine whether to perform frequency measurement further based on a not at cell edge criterion, and
wherein the second configuration information further includes other information related to the not at cell edge criterion including $S_{SearchThresholdP}$ for the Srxlev for relaxed frequency measurement which is less than or equal to both the $S_{IntraSearchP}$ and the $S_{nonIntraSearchP}$, and $S_{SearchThresholdQ}$ for the Squal for relaxed frequency measurement which is less than or equal to both the $S_{IntraSearchQ}$ and the $S_{nonIntraSearchQ}$.

9. The terminal of claim 8, wherein the at least one processor is further configured to determine not to perform frequency measurement for intra-frequency, in case that an Srxlev of a serving cell of the terminal is greater than the $S_{IntraSearchP}$ and an Squal of the serving cell is greater than the $S_{IntraSearchQ}$.

10. The terminal of claim 8, wherein the at least one processor is further configured to determine not to perform frequency measurement for new radio (NR) inter-frequencies configured with equal or lower priority than a frequency of a serving cell of the terminal, and inter radio access technology (inter-RAT) frequencies configured with lower priority than the frequency of a serving cell of the terminal, in case that an Srxlev of the serving cell of the terminal is greater than the $S_{nonIntraSearchP}$ and an Squal of the serving cell is greater than the $S_{nonIntraSearchQ}$.

11. The terminal of claim 7,
wherein the low mobility criterion includes a value obtained by subtracting an Srxlev of a serving cell of the terminal from a reference Srxlev ($Srxlev_{Ref}$) of the serving cell being less than the $S_{SearchDeltaP}$, and
wherein a current Srxlev of the serving cell is determined as the $Srxlev_{Ref}$ of the serving cell in case that the terminal selects or reselects a new cell, the current Srxlev of the serving cell is greater than a current $Srxlev_{Ref}$ of the serving cell, or at least one of the low mobility criterion or the not at cell edge criterion is not fulfilled for the time period $T_{SearchDeltaP}$.

12. The terminal of claim 8, wherein the not at cell edge criterion includes an Srxlev of a serving cell of the terminal being greater than the $S_{SearchThresholdP}$ and in case that the $S_{SearchThresholdQ}$ is included in the information related to the not at cell edge criterion, an Squal of the serving cell is greater than the $S_{searchThresholdQ}$.

13. A computer program product comprising a non-transitory computer readable storage medium having a computer readable program stored therein,
wherein the computer readable program, when executed on a computing device, causes the computing device to:
receive, from a base station, system information including first configuration information related to frequency measurement and second configuration information related to relaxed frequency measurement, wherein the second configuration information includes information related to a low mobility criterion, and
determine whether to perform frequency measurement based on the low mobility criterion,
wherein the first configuration information includes $S_{IntraSearchP}$ for a cell selection receive level value (Srxlev), $S_{IntraSearchQ}$ for a cell selection quality value (Squal), $S_{nonIntraSearchP}$ for the Srxlev, and $S_{nonIntraSearchQ}$ for the Squal, and
wherein the information related to the low mobility criterion includes $S_{SearchDeltaP}$ for variation of the Srxlev and information related to an evaluation time period $T_{SearchDeltaP}$.

* * * * *